(12) United States Patent
Huang

(10) Patent No.: US 10,935,760 B2
(45) Date of Patent: Mar. 2, 2021

(54) IMAGING LENS SYSTEM, IMAGE CAPTURING UNIT AND ELECTRONIC DEVICE

(71) Applicant: LARGAN PRECISION CO.,LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 37 days.

(21) Appl. No.: 16/267,256

(22) Filed: Feb. 4, 2019

(65) Prior Publication Data
US 2020/0073085 A1  Mar. 5, 2020

(30) Foreign Application Priority Data

Sep. 5, 2018 (TW) ................................. 107131165

(51) Int. Cl.
*G02B 9/64* (2006.01)
*G02B 13/00* (2006.01)
*G02B 15/173* (2006.01)

(52) U.S. Cl.
CPC ............. *G02B 9/64* (2013.01); *G02B 13/006* (2013.01); *G02B 15/173* (2013.01)

(58) Field of Classification Search
CPC ............................. G02B 9/64; G02B 13/0045
USPC .................................. 359/708, 745, 754, 755
See application file for complete search history.

(56) References Cited

U.S. PATENT DOCUMENTS

| 7,880,981 | B2 | 2/2011 | Do |
| 8,599,495 | B1 | 12/2013 | Tsai et al. |
| 9,366,845 | B2 | 6/2016 | Huang |
| 9,366,847 | B2 | 6/2016 | Chen |
| 9,753,258 | B2 | 9/2017 | Hashimoto |
| 10,739,567 | B2 * | 8/2020 | Kubota ................... G02B 9/64 |
| 2015/0268448 | A1 * | 9/2015 | Kubota ............. G02B 27/0025 359/755 |
| 2016/0124191 | A1 | 5/2016 | Hashimoto |
| 2016/0170180 | A1 | 6/2016 | Son |
| 2016/0282587 | A1 | 9/2016 | Hashimoto |
| 2017/0184820 | A1 * | 6/2017 | Shi ..................... G02B 27/0025 |
| 2018/0164553 | A1 | 6/2018 | Son |

(Continued)

FOREIGN PATENT DOCUMENTS

| CN | 101421658 A | 4/2009 |
| CN | 105116519 A | 12/2015 |

(Continued)

*Primary Examiner* — Darryl J Collins
(74) *Attorney, Agent, or Firm* — Maschoff Brennan

(57) ABSTRACT

An imaging lens system includes seven lens elements. The seven lens elements are, in order from an object side to an image side: a first lens element, a second lens element, a third lens element, a fourth lens element, a fifth lens element, a sixth lens element and a seventh lens element. The first lens element with positive refractive power has an object-side surface being convex in a paraxial region thereof. The second lens element with negative refractive power has an object-side surface being concave in a paraxial region thereof. The sixth lens element has positive refractive power. The seventh lens element has an image-side surface being concave in a paraxial region thereof, and the image-side surface of the seventh lens element has at least one inflection point in an off-axis region thereof.

33 Claims, 29 Drawing Sheets

(56) References Cited

U.S. PATENT DOCUMENTS

| | | | |
|---|---|---|---|
| 2018/0188487 A1 | 7/2018 | Hsieh et al. | |
| 2018/0239117 A1* | 8/2018 | Lee | G02B 9/64 |
| 2019/0049698 A1 | 2/2019 | Chen | |
| 2019/0179117 A1* | 6/2019 | Kim | G02B 9/64 |
| 2019/0361196 A1 | 11/2019 | Chang et al. | |
| 2020/0018935 A1 | 1/2020 | Uchida | |

FOREIGN PATENT DOCUMENTS

| | | | |
|---|---|---|---|
| CN | 204832662 U | 12/2015 | |
| CN | 205003345 U | 1/2016 | |
| CN | 205091499 U | 3/2016 | |
| CN | 106990510 A | 7/2017 | |
| CN | 107957619 A | 4/2018 | |
| CN | 108318998 A | 7/2018 | |
| JP | 2012-155223 A | 8/2012 | |
| JP | 2016-071115 A | 5/2016 | |
| JP | 2016-085431 A | 5/2016 | |
| WO | 2020/010878 A1 | 1/2020 | |
| WO | 2020/029613 A1 | 2/2020 | |

* cited by examiner

IMAGING LENS SYSTEM, IMAGE CAPTURING UNIT AND ELECTRONIC DEVICE

RELATED APPLICATIONS

This application claims priority to Taiwan Application 107131165, filed on Sep. 5, 2018, which is incorporated by reference herein in its entirety.

BACKGROUND

Technical Field

The present disclosure relates to an imaging lens system, an image capturing unit and an electronic device, more particularly to an imaging lens system and an image capturing unit that are applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a desirable aperture size, miniaturization and a sufficient field of view.

SUMMARY

According to one aspect of the present disclosure, an imaging lens system includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The first lens element has positive refractive power. The object-side surface of the first lens element is convex in a paraxial region thereof. The second lens element has negative refractive power. The object-side surface of the second lens element is concave in a paraxial region thereof. The sixth lens element has positive refractive power. The image-side surface of the seventh lens element is concave in a paraxial region thereof. The image-side surface of the seventh lens element has at least one inflection point in an off-axis region thereof.

When a curvature radius of the object-side surface of the first lens element is R1, a curvature radius of the object-side surface of the second lens element is R3, a curvature radius of the image-side surface of the second lens element is R4, a curvature radius of the image-side surface of the seventh lens element is R14, an axial distance between the third lens element and the fourth lens element is T34, and an axial distance between the fourth lens element and the fifth lens element is T45, the following conditions are satisfied:

$(R3+R4)/(R3-R4)<0;$ $0<T34/T45<10.0;$ and $0.45<R1/R14<5.0.$

According to another aspect of the present disclosure, an image capturing unit includes the aforementioned imaging lens system and an image sensor. The image sensor is disposed on an image surface of the imaging lens system.

According to another aspect of the present disclosure, an electronic device includes a first image capturing unit and a second image capturing unit. The first image capturing unit includes the aforementioned imaging lens system and a first image sensor. The first image sensor is disposed on an image surface of the imaging lens system. The second image capturing unit includes an optical lens assembly and a second image sensor. The second image sensor is disposed on an image surface of the optical lens assembly.

According to another aspect of the present disclosure, an imaging lens system includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The first lens element has positive refractive power. The second lens element has negative refractive power. The object-side surface of the second lens element is concave in a paraxial region thereof. The seventh lens element has negative refractive power. The image-side surface of the seventh lens element is concave in a paraxial region thereof. The image-side surface of the seventh lens element has at least one inflection point in an off-axis region thereof.

When a curvature radius of the object-side surface of the second lens element is R3, a curvature radius of the image-side surface of the second lens element is R4, a curvature radius of the image-side surface of the fifth lens element is R10, a curvature radius of the object-side surface of the seventh lens element is R13, a curvature radius of the image-side surface of the seventh lens element is R14, an axial distance between the third lens element and the fourth lens element is T34, an axial distance between the fourth lens element and the fifth lens element is T45, a focal length of the imaging lens system is f, and a focal length of the first lens element is f1, the following conditions are satisfied:

$(R3+R4)/(R3-R4)<0.50;$ $0<T34/T45<10.0;$ $0.15<(R13+R14)/(R13-R14)<2.80;$ $-1.80<f/R10<10.0;$ and $0.30<f/f1<3.50.$ According to another aspect of the present disclosure, an imaging lens system includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The object-side surface of the second lens element is concave in a paraxial region thereof. The image-side surface of the fifth lens element is concave in a paraxial region thereof. The seventh lens element has negative refractive power. The image-side surface of the seventh lens element is concave in a paraxial region thereof. The image-side surface of the seventh lens element has at least one inflection point in an off-axis region thereof.

When a curvature radius of the object-side surface of the second lens element is R3, a curvature radius of the image-side surface of the second lens element is R4, an axial distance between the third lens element and the fourth lens element is T34, an axial distance between the fourth lens element and the fifth lens element is T45, a focal length of the imaging lens system is f, a focal length of the seventh lens element is f7, a central thickness of the first lens element is CT1, and a central thickness of the second lens element is CT2, the following conditions are satisfied:

$-0.80 < R3/R4;$ $0 < T34/T45 < 10.0;$ $-3.80 < f/f7 < -0.25;$ and $1.35 < CT1/CT2 < 7.0.$ According to another aspect of the present disclosure, an imaging lens system includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The object-side surface of the second lens element is concave in a paraxial region thereof. The image-side surface of the seventh lens element is concave in a paraxial region thereof. The image-side surface of the seventh lens element has at least one inflection point in an off-axis region thereof.

When a curvature radius of the object-side surface of the second lens element is R3, a curvature radius of the image-side surface of the second lens element is R4, a curvature radius of the image-side surface of the fifth lens element is R10, an Abbe number of the fifth lens element is V5, half of a maximum field of view of the imaging lens system is HFOV, a focal length of the imaging lens system is f, and a focal length of the third lens element is f3, the following conditions are satisfied:

$-0.80 < R3/R4;$ $10.0 < V5 < 28.0;$ $30.0 \text{ [deg.]} < HFOV < 55.0 \text{ [deg.]};$ $-0.90 < f/R10 < 10.0;$ and $-3.0 < f/f3 < 1.0.$

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
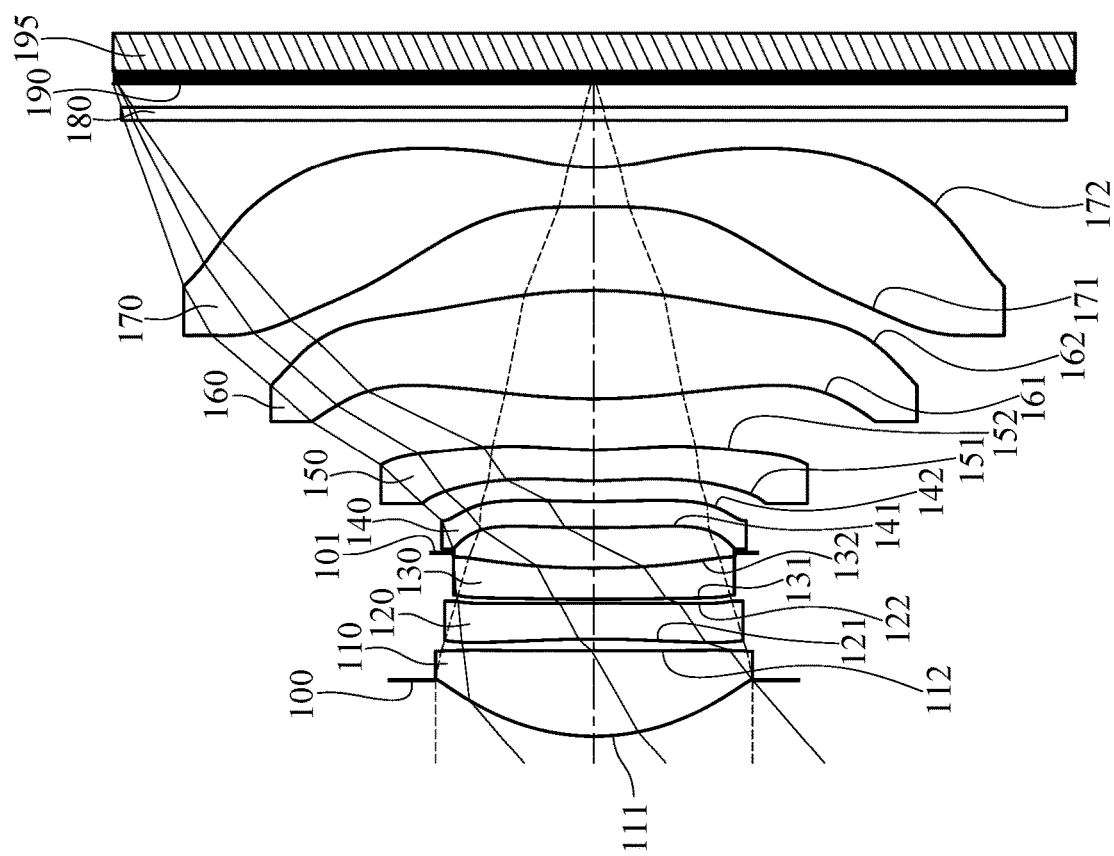
FIG. 1 is a schematic view of an image capturing unit according to the 1st embodiment of the present disclosure.

An imaging lens system includes seven lens elements. The seven lens elements are, in order from an object side to an image side, a first lens element, a second lens element, a third lens element, a fourth lens element, a fifth lens element, a sixth lens element and a seventh lens element.

The first lens element can have positive refractive power. Therefore, it is favorable for providing significant light converging power so as to minimize the required space of the imaging lens system, thereby achieving compactness. The first lens element can have an object-side surface being convex in a paraxial region thereof. Therefore, it is favorable for receiving light rays with a large incident angle from the off-axis region so as to reduce the incident angle on the object-side surface of the first lens element, thereby preventing total reflection.

The second lens element can have negative refractive power. Therefore, it is favorable for correcting aberrations generated by the first lens element so as to eliminate spherical and chromatic aberrations. The second lens element has an object-side surface being concave in a paraxial region thereof. Therefore, it is favorable for receiving light rays coming from the first lens element and correcting aberrations so as to improve image quality.

The fifth lens element can have an image-side surface being concave in a paraxial region thereof. Therefore, it is favorable for reducing the back focal length so as to control the total track length of the imaging lens system.

The sixth lens element can have positive refractive power. Therefore, it is favorable for providing light converging power on the image side and enhancing the symmetry of the imaging lens system so as to improve image quality. The sixth lens element can have an object-side surface being convex in a paraxial region thereof. Therefore, it is favorable for the object-side surface of the sixth lens element having sufficient light converging power so as to prevent light rays from overly diverging, thereby achieving compactness.

The seventh lens element can have negative refractive power. Therefore, it is favorable for reducing the back focal length so as to prevent an overly large size of the imaging lens system. The seventh lens element has an image-side surface being concave in a paraxial region thereof, and the image-side surface of the seventh lens element has at least one inflection point in an off-axis region thereof. Therefore, it is favorable for reducing the back focal length to achieve compactness and for flattening the Petzval surface to improve image quality.

When a curvature radius of the object-side surface of the second lens element is R3, and a curvature radius of an image-side surface of the second lens element is R4, the following condition can be satisfied: $(R3+R4)/(R3-R4)<0.50$. Therefore, it is favorable for controlling the shape of the second lens element so as to correct aberrations. Moreover, the following condition can be satisfied: $(R3+R4)/(R3-R4)<0$. Moreover, the following condition can be satisfied: $-5.0<(R3+R4)/(R3-R4)<0$. Moreover, the following condition can also be satisfied: $-3.0<(R3+R4)/(R3-R4)<-0.30$.

When an axial distance between the third lens element and the fourth lens element is T34, and an axial distance between the fourth lens element and the fifth lens element is T45, the following condition can be satisfied: $0<T34/T45<10.0$. Therefore, it is favorable for balancing the axial distances between adjacent lens elements in the middle part of the imaging lens system so as to prevent overly small spacing in a camera, thereby achieving compactness. Moreover, the following condition can also be satisfied: $0<T34/T45<6.0$.

When a curvature radius of the object-side surface of the first lens element is R1, and a curvature radius of the image-side surface of the seventh lens element is R14, the following condition can be satisfied: $0.45<R1/R14<5.0$. Therefore, it is favorable for balancing the surface shapes of lens elements on the object side and on the image side of the imaging lens system so as to obtain a compact configuration. Moreover, the following condition can also be satisfied: $0.45<R1/R14<2.50$.

When a curvature radius of an object-side surface of the seventh lens element is R13, and the curvature radius of the image-side surface of the seventh lens element is R14, the following condition can be satisfied: $0.15<(R13+R14)/(R13-R14)<2.80$. Therefore, it is favorable for controlling the shape of the seventh lens element and having a stronger light converging power on the image-side surface so as to improve image quality.

When a focal length of the imaging lens system is f, and a curvature radius of the image-side surface of the fifth lens element is R10, the following condition can be satisfied: $-1.80<f/R10<10.0$. Therefore, it is favorable for preventing the curvature of the image-side surface of the fifth lens element from being overly large so as to reduce aberrations and correct off-axis aberrations. Moreover, the following condition can be satisfied: $-0.90<f/R10<10.0$. Moreover, the following condition can also be satisfied: $0 \leq f/R10<5.0$.

When the focal length of the imaging lens system is f, and a focal length of the first lens element is f1, the following condition can be satisfied: $0.30<f/f1<3.50$. Therefore, it is favorable for obtaining proper refractive power of the first lens element so as to reduce aberrations.

When the curvature radius of the object-side surface of the second lens element is R3, and the curvature radius of the image-side surface of the second lens element is R4, the following condition can be satisfied: $-0.80<R3/R4$. Therefore, it is favorable for controlling the surface shape of the second lens element so as to prevent an overly large refraction angle, thereby preventing excessive divergence of light rays. Moreover, the following condition can be satisfied: $-0.50<R3/R4<5.0$. Moreover, the following condition can also be satisfied: $-0.30<R3/R4<3.0$.

When the focal length of the imaging lens system is f, and a focal length of the seventh lens element is f7, the following condition can be satisfied: $-3.80<f/f7<-0.25$. Therefore, it is favorable for controlling the refractive power distribution on the image side of the imaging lens system so as to meet the requirement of compactness. Moreover, the following condition can also be satisfied: $-3.0<f/f7<-0.50$.

When a central thickness of the first lens element is CT1, and a central thickness of the second lens element is CT2, the following condition can be satisfied: $1.35<CT1/CT2<7.0$. Therefore, it is favorable for controlling the ratio of central thicknesses of the first lens element and second lens element so as to better control the light path on the object side of the imaging lens system.

When an Abbe number of the fifth lens element is V5, the following condition can be satisfied: $10.0<V5<28.0$. Therefore, it is favorable for correcting chromatic aberration by the fifth lens element so as to improve image quality. Moreover, the following condition can also be satisfied: $10.0<V5<23.0$.

When half of a maximum field of view of the imaging lens system is HFOV, the following condition can be satisfied: $30.0 \text{ [deg.]}<HFOV<55.0 \text{ [deg.]}$. Therefore, it is favorable for controlling the field of view with a better imaging range so as to make the imaging lens system applicable to various applications. Moreover, the following condition can also be satisfied: 38.0 [deg.]<HFOV<50.0 [deg.].

When the focal length of the imaging lens system is f, and a focal length of the third lens element is f3, the following condition can be satisfied: −3.0<f/f3<1.0. Therefore, it is favorable for the third lens element to assist in correcting aberrations so as to achieve high image quality. Moreover, the following condition can also be satisfied: −1.80<f/f3<0.90.

When the focal length of the imaging lens system is f, and a curvature radius of the image-side surface of the fourth lens element is R8, the following condition can be satisfied: 0≤f/R8<10.0. Therefore, it is favorable for providing light divergence capability so as to correct aberrations of the imaging lens system. Moreover, the following condition can also be satisfied: 0.20<f/R8<2.80.

When a minimum value among Abbe numbers of all lens elements of the imaging lens system is Vmin, the following condition can be satisfied: 10.0<Vmin<22.0. Therefore, it is favorable for balancing the capability of converging light rays with different wavelengths so as to correct chromatic aberration. Moreover, the following condition can also be satisfied: 10.0<Vmin<20.0.

Figure 27:
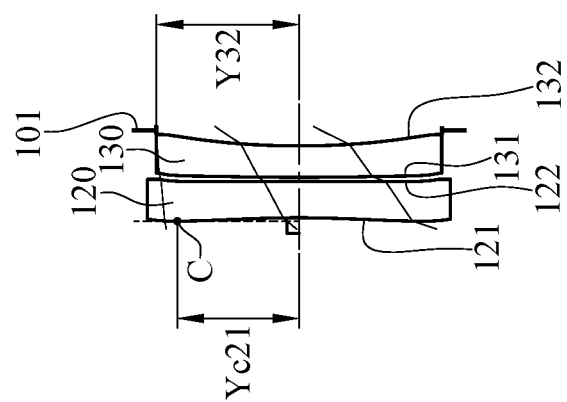
FIG. 27 shows a schematic view of Yc21, Y32 and a critical point of the second lens element according to the 1st embodiment of the present disclosure.

According to the present disclosure, the object-side surface of the second lens element can have at least one convex critical point in an off-axis region thereof. When a vertical distance between a critical point on the object-side surface of the second lens element and an optical axis is Yc21, and the central thickness of the second lens element is CT2, the following condition can be satisfied: 0.50<Yc21/CT2<8.50. Therefore, it is favorable for the second lens element to correct off-axis aberrations. Please refer to FIG. 27, which shows a schematic view of Yc21 and a convex critical point C of the second lens element 120 according to the 1st embodiment of the present disclosure.

When an Abbe number of the second lens element is V2, an Abbe number of the fourth lens element is V4, and the Abbe number of the fifth lens element is V5, the following condition can be satisfied: 30.0<V2+V4+V5<93.0. Therefore, it is favorable for increasing the density difference between each of the three lens elements (i.e., the second, the fourth and the fifth lens elements) and air so as to better control the light path within limited space. Moreover, the following condition can also be satisfied: 30.0<V2+V4+V5<78.0.

When an axial distance between the object-side surface of the first lens element and an image surface is TL, and an entrance pupil diameter of the imaging lens system is EPD, the following condition can be satisfied: 1.0<TL/EPD<2.35. Therefore, it is favorable for obtaining a short total length and large aperture configuration so as to capture high brightness images within limited space therein.

When the central thickness of the second lens element is CT2, a central thickness of the third lens element is CT3, a central thickness of the fourth lens element is CT4, a central thickness of the fifth lens element is CT5, and a central thickness of the sixth lens element is CT6, the following condition can be satisfied: 0.30<(CT2+CT3+CT4+CT5)/CT6<1.80. Therefore, it is favorable for balancing between thicknesses and effective radii of the lens elements so as to reduce the sensitivity of the imaging lens system. Moreover, the following condition can also be satisfied: 0.50<(CT2+CT3+CT4+CT5)/CT6<1.50.

When a focal length of the fifth lens element is f5, and a focal length of the seventh lens element is f7, the following condition can be satisfied: −0.40<f7/f5<0.40. Therefore, it is favorable for better controlling the light path on the image side of the imaging lens system and correcting aberrations by the fifth lens element.

When a maximum effective radius of an image-side surface of the third lens element is Y32, the axial distance between the object-side surface of the first lens element and the image surface is TL, and a maximum image height of the imaging lens system is ImgH, the following condition can be satisfied: 1.0<(Y32+TL)/ImgH<2.0. Therefore, it is favorable for controlling the dimensions of the lens elements in the middle part of the imaging lens system and meeting the requirements of miniaturization and a sufficient light receiving area. Moreover, the following condition can also be satisfied: 1.0<(Y32+TL)/ImgH<1.85. Please refer to FIG. 27, which shows a schematic view of Y32 according to the 1st embodiment of the present disclosure.

When the focal length of the imaging lens system is f, the focal length of the first lens element is f1, a focal length of the second lens element is f2, the focal length of the third lens element is f3, a focal length of the fourth lens element is f4, the focal length of the fifth lens element is f5, a focal length of the sixth lens element is f6, the focal length of the seventh lens element is f7, a focal length of the i-th lens element is fi, and a minimum absolute value of f/fi is |f/fi|min, the following condition can be satisfied: |f/fi|min<0.10, wherein i=1, 2, 3, 4, 5, 6, 7. Therefore, it is favorable for utilizing at least one correction lens in the imaging lens system so as to balance aberrations generated by the adjacent lens elements. Moreover, the following condition can also be satisfied: |f/fi|min<0.065, wherein i=1, 2, 3, 4, 5, 6, 7.

According to the present disclosure, the imaging lens system further includes an aperture stop. When an axial distance between the aperture stop and the image-side surface of the seventh lens element is SD, and an axial distance between the object-side surface of the first lens element and the image-side surface of the seventh lens element is TD, the following condition can be satisfied: 0.75<SD/TD<1.0. Therefore, the position of the aperture stop is favorable for optimizing the size of the imaging lens system.

When the focal length of the imaging lens system is f, and a curvature radius of the object-side surface of the sixth lens element is R11, the following condition can be satisfied: 0≤f/R11<2.50. Therefore, it is favorable for preventing the curvature of the object-side surface of the sixth lens element being overly large and balancing the refractive power of the sixth lens element. Moreover, the following condition can also be satisfied: 0.45<f/R11<2.0.

When the axial distance between the fourth lens element and the fifth lens element is T45, and an axial distance between the fifth lens element and the sixth lens element is T56, the following condition can be satisfied: 0<T45/T56<1.0. Therefore, it is favorable for reducing the distance between the fourth lens element and the fifth lens element so as to balance the total length of the imaging lens system.

When the focal length of the imaging lens system is f, and the entrance pupil diameter of the imaging lens system is EPD, the following condition can be satisfied: 1.0<f/EPD<2.0. Therefore, it is favorable for adjusting the entrance pupil so as to provide sufficient incident light and increase image brightness.

When the axial distance between the object-side surface of the first lens element and the image surface is TL, the maximum image height of the imaging lens system is ImgH, the focal length of the imaging lens system is f, and the entrance pupil diameter of the imaging lens system is EPD, the following condition can be satisfied: $1.50<(TL/ImgH)+(f/EPD)<3.40$. Therefore, it is favorable for providing good image quality and featuring a short total length and a large aperture configuration. Moreover, the following condition can also be satisfied: $1.70<(TL/ImgH)+(f/EPD)<3.20$.

When the axial distance between the fifth lens element and the sixth lens element is T56, and an axial distance between the sixth lens element and the seventh lens element is T67, the following condition can be satisfied: $0.6<T67/T56<2.80$. Therefore, it is favorable for balancing the distances among the fifth through seventh lens elements so as to achieve a high assembling yield rate and to reduce the sensitivity of the imaging lens system.

When the curvature radius of the image-side surface of the fifth lens element is R10, and the curvature radius of the object-side surface of the sixth lens element is R11, the following condition can be satisfied: $-0.70<(R10-R11)/(R10+R11)<2.0$. Therefore, it is favorable for balancing the shape variation of the adjacent surfaces of the fifth and sixth lens elements so as to control the light path and to improve image quality. Moreover, the following condition can also be satisfied: $-0.40<(R10-R11)/(R10+R11)<1.50$.

Figure 28:
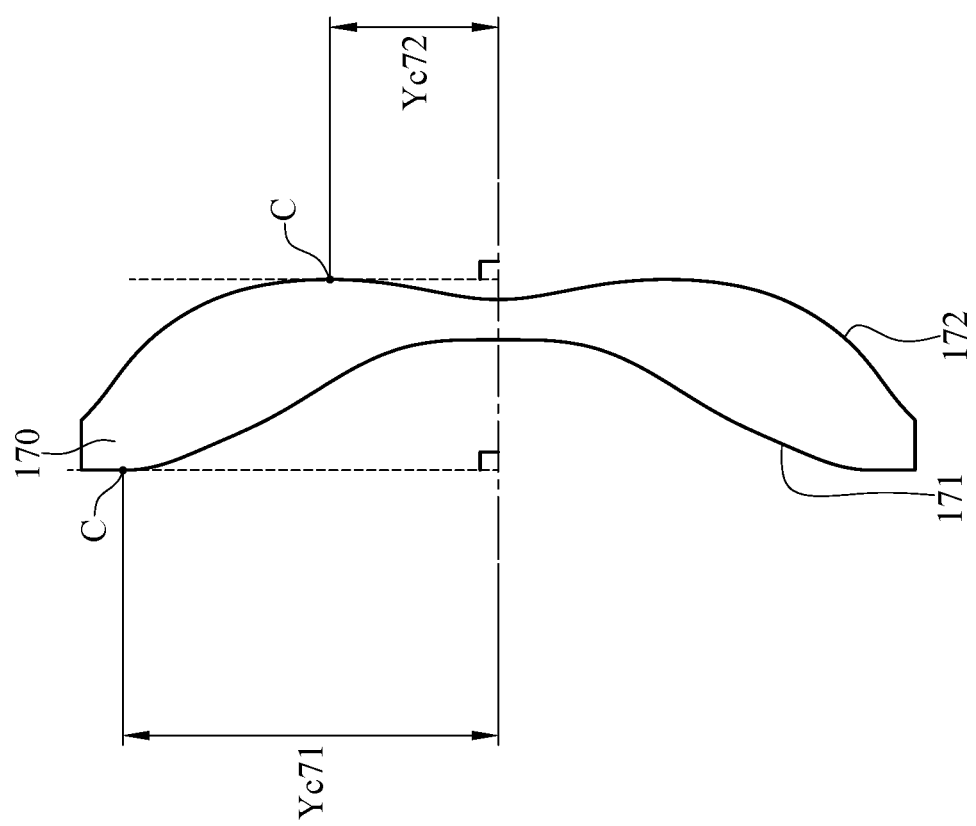
FIG. 28 shows a schematic view of Yc71, Yc72 and critical points of the seventh lens element according to the 1st embodiment of the present disclosure.

According to the present disclosure, the object-side surface of the seventh lens element can have at least one convex critical point in an off-axis region thereof. When a vertical distance between a critical point on the object-side surface of the seventh lens element and the optical axis is Yc71, and the focal length of the imaging lens system is f, the following condition can be satisfied: $0.20<Yc71/f<1.0$. Therefore, it is favorable for correcting off-axis aberrations on the image side while reducing distortion and field curvature. Please refer to FIG. 28, which shows a schematic view of Yc71 and a convex critical point C of the object-side surface 171 of the seventh lens element 170 according to the 1st embodiment of the present disclosure.

When a curvature radius of an object-side surface of the third lens element is R5 and, and a curvature radius of the image-side surface of the third lens element is R6, the following condition can be satisfied: $-40.0<(R5+R6)/(R5-R6)<3.0$. Therefore, it is favorable for balancing the surface shapes of the third lens element so as to correct aberrations generated by the first lens element and second lens element, thereby improving image quality.

When the axial distance between the object-side surface of the first lens element and the image surface is TL, and the maximum image height of the imaging lens system is ImgH, the following condition can be satisfied: $1.0<TL/ImgH<1.80$. Therefore, it is favorable for having a sufficient light receiving area in the imaging lens system so as to provide sufficient image brightness while achieving compactness.

According to the present disclosure, the image-side surface of the seventh lens element can have at least one convex critical point in an off-axis region thereof. When a vertical distance between a critical point on the image-side surface of the seventh lens element and the optical axis is Yc72, and a maximum effective radius of the image-side surface of the seventh lens element is Y72, the following condition can be satisfied: $0.10<Yc72/Y72<1.0$. Therefore, it is favorable for correcting off-axis aberrations such as field curvature. Please refer to FIG. 28, which shows a schematic view of Yc72 and a convex critical point C of the image-side surface 172 of the seventh lens element 170 according to the 1st embodiment of the present disclosure.

When the axial distance between the object-side surface of the first lens element and the image surface is TL, and the focal length of the imaging lens system is f, the following condition can be satisfied: $0.80<TL/f<1.40$. Therefore, it is favorable for balancing the total track length and the viewing angle of the imaging lens system.

When an axial distance between the image-side surface of the seventh lens element and the image surface is BL, and a maximum value among central thicknesses of all lens elements of the imaging lens system is CTmax, the following condition can be satisfied: $0<BL/CTmax<1.0$. Therefore, it is favorable for controlling the back focal length of the imaging lens system so as to prevent an overly long total track length.

Figure 29:
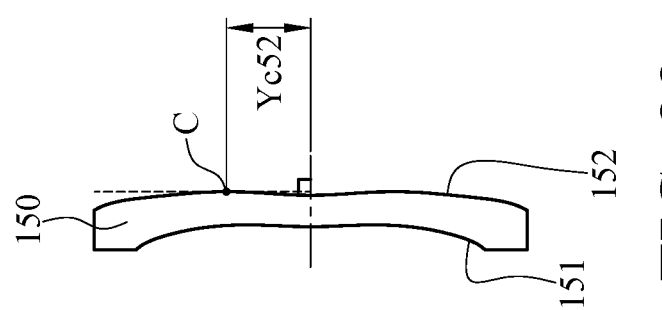
FIG. 29 shows a schematic view of Yc52 and a critical point of the fifth lens element according to the 1st embodiment of the present disclosure.

According to the present disclosure, the image-side surface of the fifth lens element can have at least one critical point in an off-axis region thereof, and the at least one critical point can be a convex critical point or a concave critical point. When a vertical distance between a critical point on the image-side surface of the fifth lens element and the optical axis is Yc52, and the focal length of the imaging lens system is f, the following condition can be satisfied: $0.05<Yc52/f<0.80$. Therefore, it is favorable for adjusting the light path of peripheral light rays so as to reduce astigmatism and coma. Please refer to FIG. 29, which shows a schematic view of Yc52 and a critical point C of the fifth lens element 150 according to the 1st embodiment of the present disclosure.

When the focal length of the imaging lens system is f, and the maximum image height of the imaging lens system is ImgH, the following condition can be satisfied: $0.55<f/ImgH<1.50$. Therefore, it is favorable for optimizing the view angle of the imaging lens system so that the imaging lens system is applicable to various applications.

According to the present disclosure, each of at least three lens elements of the imaging lens system can have an Abbe number ranging from 10.0 to 32.0. Therefore, it is favorable for having a sufficient capability to control the light path so as to balance the focusing positions of light with different wavelengths, thereby preventing image overlapping. Moreover, each of at least three lens elements of the imaging lens system can have an Abbe number ranging from 10.0 to 22.0.

According to the present disclosure, the aforementioned features and conditions can be utilized in numerous combinations so as to achieve corresponding effects.

According to the present disclosure, the lens elements of the imaging lens system can be made of either glass or plastic material. When the lens elements are made of glass material, the refractive power distribution of the imaging lens system may be more flexible. The glass lens element can either be made by grinding or molding. When the lens elements are made of plastic material, the manufacturing cost can be effectively reduced. Furthermore, surfaces of each lens element can be arranged to be aspheric, which allows more control variables for eliminating aberrations thereof, the required number of the lens elements can be reduced, and the total track length of the imaging lens system can be effectively shortened. The aspheric surfaces may be formed by plastic injection molding or glass molding.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, an image surface of the imaging lens system, based on the corresponding image sensor, can be flat or curved, especially a curved surface being concave facing towards the object side of the imaging lens system.

According to the present disclosure, an image correction unit, such as a field flattener, can be optionally disposed between the lens element closest to the image side of the imaging lens system and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the imaging lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging lens system and thereby provides a wider field of view for the same.

According to the present disclosure, the imaging lens system can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
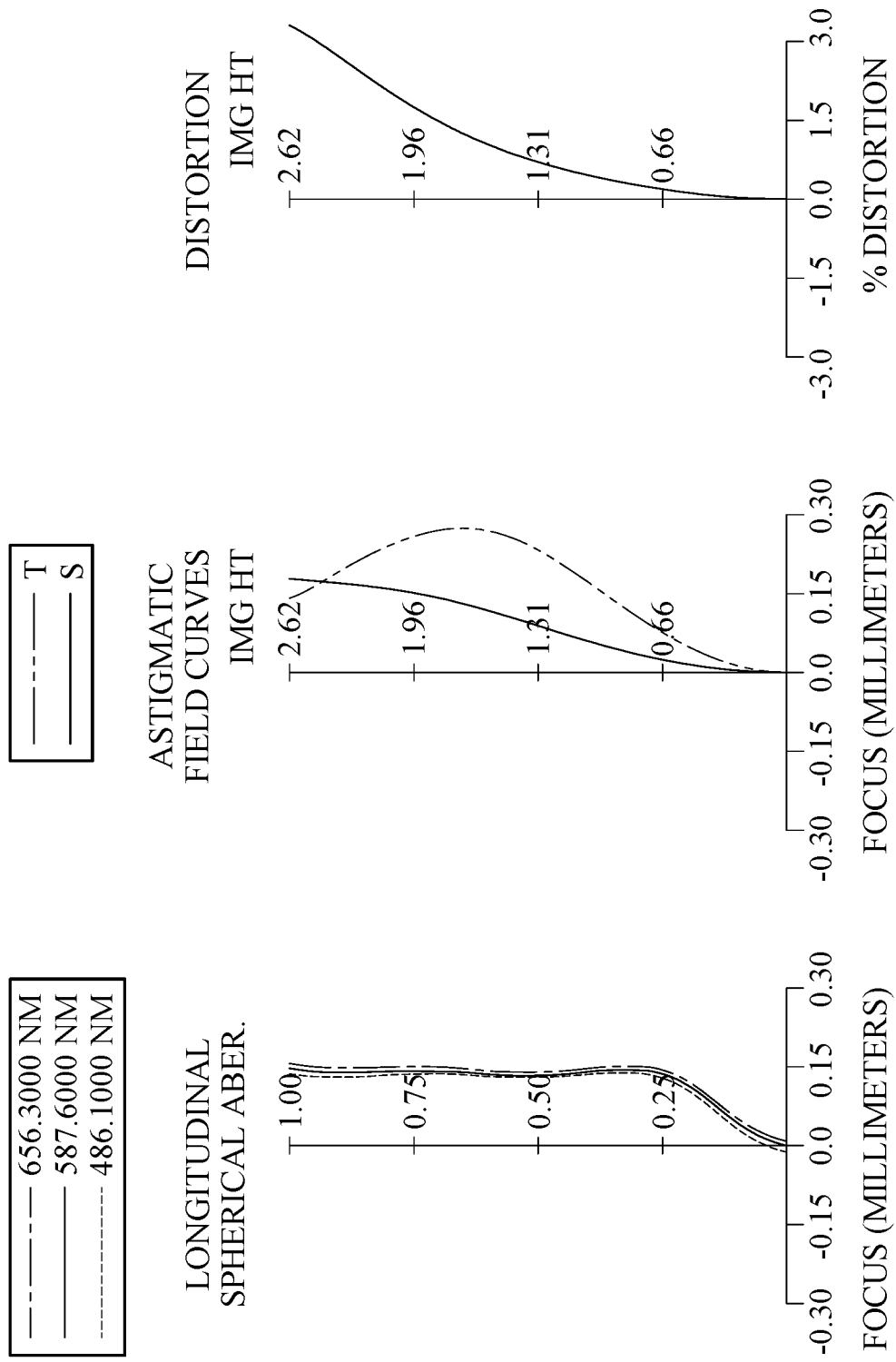
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging lens system (its reference numeral is omitted) of the present disclosure and an image sensor 195. The imaging lens system includes, in order from an object side to an image side, an aperture stop 100, a first lens element 110, a second lens element 120, a third lens element 130, a stop 101, a fourth lens element 140, a fifth lens element 150, a sixth lens element 160, a seventh lens element 170, a filter 180 and an image surface 190. The imaging lens system includes seven lens elements (110, 120, 130, 140, 150, 160 and 170) with no additional lens element disposed between each of the adjacent seven lens elements.

The first lens element 110 with positive refractive power has an object-side surface 111 being convex in a paraxial region thereof and an image-side surface 112 being convex in a paraxial region thereof. The first lens element 110 is made of plastic material and has the object-side surface 111 and the image-side surface 112 being both aspheric.

The second lens element 120 with negative refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric. The object-side 121 of the second lens element 120 has a convex critical point in an off-axis region thereof.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The image-side 152 of the fifth lens element 150 has a convex critical point in an off-axis region thereof.

The sixth lens element 160 with positive refractive power has an object-side surface 161 being convex in a paraxial region thereof and an image-side surface 162 being convex in a paraxial region thereof. The sixth lens element 160 is made of plastic material and has the object-side surface 161 and the image-side surface 162 being both aspheric.

The seventh lens element 170 with negative refractive power has an object-side surface 171 being concave in a paraxial region thereof and an image-side surface 172 being concave in a paraxial region thereof. The seventh lens element 170 is made of plastic material and has the object-side surface 171 and the image-side surface 172 being both aspheric. Each of the object-side surface 171 and the image-side surface 172 of the seventh lens element 170 has a convex critical point in an off-axis region thereof. The image-side 172 of the seventh lens element 170 has at least one inflection point in an off-axis region thereof.

The filter 180 is made of glass material and located between the seventh lens element 170 and the image surface 190, and will not affect the focal length of the imaging lens system. The image sensor 195 is disposed on or near the image surface 190 of the imaging lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the imaging lens system of the image capturing unit according to the 1st embodiment, when a focal length of the imaging lens system is f, an f-number of the imaging lens system is Fno, and half of a maximum field of view of the imaging lens system is HFOV, these parameters have the following values: f=4.54 millimeters (mm), Fno=1.71, HFOV=40.8 degrees (deg.). In addition, an entrance pupil diameter of the imaging lens system is EPD, and Fno is equal to f/EPD.

When a minimum value among Abbe numbers of all lens elements of the imaging lens system is Vmin, the following condition is satisfied: Vmin=19.5. In this embodiment, an Abbe number of the second lens element 120 is equal to an Abbe number of the fifth lens element 150, and the Abbe numbers of the second lens element 120 and the fifth lens element 150 are smaller than Abbe numbers of the other lens elements; thus, Vmin is equal to the Abbe numbers of the second lens element 120 and the fifth lens element 150.

When the Abbe number of the fifth lens element 150 is V5, the following condition is satisfied: V5=19.5.

When the Abbe number of the second lens element 120 is V2, an Abbe number of the fourth lens element 140 is V4, and the Abbe number of the fifth lens element 150 is V5, the following condition is satisfied: V2+V4+V5=65.0.

When a central thickness of the first lens element 110 is CT1, and a central thickness of the second lens element 120 is CT2, the following condition is satisfied: CT1/CT2=2.39.

When the central thickness of the second lens element 120 is CT2, a central thickness of the third lens element 130 is CT3, a central thickness of the fourth lens element 140 is CT4, a central thickness of the fifth lens element 150 is CT5, and a central thickness of the sixth lens element 160 is CT6, the following condition is satisfied: (CT2+CT3+CT4+CT5)/CT6=1.14.

When an axial distance between the image-side surface 172 of the seventh lens element 170 and the image surface 190 is BL, and a maximum value among central thicknesses of all lens elements of the imaging lens system is CTmax, the following condition is satisfied: BL/CTmax=0.78. In this embodiment, the central thickness of the sixth lens element 160 is larger than the central thicknesses of the other lens elements; thus, CTmax is equal to the central thickness of the sixth lens element 160.

When an axial distance between the third lens element 130 and the fourth lens element 140 is T34, and an axial distance between the fourth lens element 140 and the fifth lens element 150 is T45, the following condition is satisfied: T34/T45=1.94.

When the axial distance between the fourth lens element 140 and the fifth lens element 150 is T45, and an axial distance between the fifth lens element 150 and the sixth lens element 160 is T56, the following condition is satisfied: T45/T56=0.40.

When the axial distance between the fifth lens element 150 and the sixth lens element 160 is T56, and an axial distance between the sixth lens element 160 and the seventh lens element 170 is T67, the following condition is satisfied: T67/T56=1.63.

When the focal length of the imaging lens system is f, and a curvature radius of the image-side surface 142 of the fourth lens element 140 is R8, the following condition is satisfied: f/R8=0.62.

When the focal length of the imaging lens system is f, and a curvature radius of the image-side surface 152 of the fifth lens element 150 is R10, the following condition is satisfied: f/R10=1.43.

When the focal length of the imaging lens system is f, and a curvature radius of the object-side surface 161 of the sixth lens element 160 is R11, the following condition is satisfied: f/R11=0.93.

When a curvature radius of the object-side surface 121 of the second lens element 120 is R3, and a curvature radius of the image-side surface 122 of the second lens element 120 is R4, the following condition is satisfied: R3/R4=0.23.

When a curvature radius of the object-side surface 111 of the first lens element 110 is R1, and a curvature radius of the image-side surface 172 of the seventh lens element 170 is R14, the following condition is satisfied: R1/R14=1.20.

When the curvature radius of the object-side surface 121 of the second lens element 120 is R3, and the curvature radius of the image-side surface 122 of the second lens element 120 is R4, the following condition is satisfied: (R3+R4)/(R3−R4)=−1.60.

When a curvature radius of the object-side surface 131 of the third lens element 130 is R5, and a curvature radius of the image-side surface 132 of the third lens element 130 is R6, the following condition is satisfied: (R5+R6)/(R5−R6)=1.57.

When the curvature radius of the image-side surface 152 of the fifth lens element 150 is R10, and the curvature radius of the object-side surface 161 of the sixth lens element 160 is R11, the following condition is satisfied: (R10−R11)/(R10+R11)=−0.21.

When a curvature radius of the object-side surface 171 of the seventh lens element 170 is R13, and the curvature radius of the image-side surface 172 of the seventh lens element 170 is R14, the following condition is satisfied: (R13+R14)/(R13−R14)=0.96.

When the focal length of the imaging lens system is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, a focal length of the seventh lens element 170 is f7, a focal length of the i-th lens element is fi, and a minimum absolute value of f/fi is |f/fi|min, the following condition is satisfied: |f/fi|min=0.05. In this embodiment, |f/fi|min=|f/f4|.

When the focal length of the imaging lens system is f, and the focal length of the first lens element 110 is f1, the following condition is satisfied: f/f1=1.28.

When the focal length of the imaging lens system is f, and the focal length of the third lens element 130 is f3, the following condition is satisfied: f/f3=−0.32.

When the focal length of the imaging lens system is f, and the focal length of the seventh lens element 170 is f7, the following condition is satisfied: f/f7=−1.52.

When the focal length of the fifth lens element 150 is f5, and the focal length of the seventh lens element 170 is f7, the following condition is satisfied: f7/f5=0.10.

When an axial distance between the object-side surface 111 of the first lens element 110 and the image surface 190 is TL, and the focal length of the imaging lens system is f, the following condition is satisfied: TL/f=1.21.

When the axial distance between the object-side surface 111 of the first lens element 110 and the image surface 190 is TL, and the entrance pupil diameter of the imaging lens system is EPD, the following condition is satisfied: TL/EPD=2.06.

When the axial distance between the object-side surface 111 of the first lens element 110 and the image surface 190 is TL, and a maximum image height of the imaging lens system is ImgH (half of a diagonal length of an effective photosensitive area of the image sensor 195), the following condition is satisfied: TL/ImgH=1.37.

When the focal length of the imaging lens system is f, and the maximum image height of the imaging lens system is ImgH, the following condition is satisfied: f/ImgH=1.14.

When the focal length of the imaging lens system is f, and the entrance pupil diameter of the imaging lens system is EPD, the following condition is satisfied: f/EPD=1.71.

When an axial distance between the aperture stop 100 and the image-side surface 172 of the seventh lens element 170 is SD, and an axial distance between the object-side surface 111 of the first lens element 110 and the image-side surface 172 of the seventh lens element 170 is TD, the following condition is satisfied: SD/TD=0.90.

When the axial distance between the object-side surface 111 of the first lens element 110 and the image surface 190 is TL, the maximum image height of the imaging lens system is ImgH, the focal length of the imaging lens system is f, and the entrance pupil diameter of the imaging lens system is EPD, the following condition is satisfied: (TL/ImgH)+(f/EPD)=3.08.

When a maximum effective radius of the image-side surface 132 of the third lens element 130 is Y32, the axial distance between the object-side surface 111 of the first lens element 110 and the image surface 190 is TL, and the maximum image height of the imaging lens system is ImgH, the following condition is satisfied: (Y32+TL)/ImgH=1.67.

When a vertical distance between the critical point on the object-side surface 121 of the second lens element 120 and an optical axis is Yc21, and the central thickness of the second lens element 120 is CT2, the following condition is satisfied: Yc21/CT2=3.35.

When a vertical distance between the critical point on the image-side surface 152 of the fifth lens element 150 and the optical axis is Yc52, and the focal length of the imaging lens system is f, the following condition is satisfied: Yc52/f=0.15.

When a vertical distance between the critical point on the object-side surface 171 of the seventh lens element 170 and the optical axis is Yc71, and the focal length of the imaging lens system is f, the following condition is satisfied: Yc71/f=0.68.

When a vertical distance between the critical point on the image-side surface 172 of the seventh lens element 170 and the optical axis is Yc72, and a maximum effective radius of the image-side surface 172 of the seventh lens element 170 is Y72, the following condition is satisfied: Yc72/Y72=0.40.

In this embodiment, there are four lens elements (the second lens element 120, the third lens element 130, the fourth lens element 140 and the fifth lens element 150) each have an Abbe number ranging from 10.0 to 32.0.

The detailed optical data of the 1st embodiment are shown in Table 1 and the aspheric surface data are shown in Table 2 below.

TABLE 1

1st Embodiment
f = 4.54 mm, Fno = 1.71, HFOV = 40.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.469 | | | | |
| 2 | Lens 1 | 1.944 (ASP) | 0.718 | Plastic | 1.545 | 56.1 | 3.56 |
| 3 | | −1118.017 (ASP) | 0.097 | | | | |
| 4 | Lens 2 | −8.385 (ASP) | 0.300 | Plastic | 1.669 | 19.5 | −16.37 |
| 5 | | −36.333 (ASP) | 0.034 | | | | |
| 6 | Lens 3 | 31.755 (ASP) | 0.260 | Plastic | 1.634 | 23.8 | −14.37 |
| 7 | | 7.059 (ASP) | 0.128 | | | | |
| 8 | Stop | Plano | 0.210 | | | | |
| 9 | Lens 4 | 8.673 (ASP) | 0.221 | Plastic | 1.614 | 26.0 | −82.83 |

TABLE 1-continued

1st Embodiment
f = 4.54 mm, Fno = 1.71, HFOV = 40.8 deg.

| Surface # | | Curvature Radius | | Thickness | Material | Index | Abbe # | Focal Length |
|---|---|---|---|---|---|---|---|---|
| 10 | | 7.337 | (ASP) | 0.174 | | | | |
| 11 | Lens 5 | 3.883 | (ASP) | 0.260 | Plastic | 1.669 | 19.5 | −30.88 |
| 12 | | 3.181 | (ASP) | 0.430 | | | | |
| 13 | Lens 6 | 4.887 | (ASP) | 0.911 | Plastic | 1.544 | 56.0 | 4.06 |
| 14 | | −3.763 | (ASP) | 0.700 | | | | |
| 15 | Lens 7 | −87.461 | (ASP) | 0.332 | Plastic | 1.534 | 55.9 | −2.99 |
| 16 | | 1.627 | (ASP) | 0.400 | | | | |
| 17 | Filter | Plano | | 0.110 | Glass | 1.517 | 64.2 | — |
| 18 | | Plano | | 0.197 | | | | |
| 19 | Image | Plano | | — | | | | |

Note:
Reference wavelength is 587.6 nm (d-line).
An effective radius of the stop 101 (Surface 8) is 1.180 mm.

TABLE 2

Aspheric Coefficients

| | Surface # | | | | |
|---|---|---|---|---|---|
| | 2 | 3 | 4 | 5 | 6 |
| k = | −5.1302E−01 | −1.3693E−08 | 1.1266E+01 | 9.0000E+01 | 2.8957E+00 |
| A4 = | 1.0877E−02 | 8.5200E−03 | 4.7629E−02 | 3.9730E−02 | 1.9306E−02 |
| A6 = | −1.2365E−02 | 8.7870E−05 | −3.1256E−02 | −4.6802E−02 | −4.4596E−02 |
| A8 = | 1.8898E−02 | −7.7263E−03 | 3.5631E−02 | 1.4412E−02 | 1.5527E−02 |
| A10 = | −1.4245E−02 | 3.9025E−03 | −3.3140E−02 | 7.4957E−03 | 8.4175E−03 |
| A12 = | 4.9625E−03 | −8.6779E−04 | 1.9085E−02 | — | — |
| A14 = | −1.1026E−03 | — | −3.9596E−03 | — | — |

| | Surface # | | | | |
|---|---|---|---|---|---|
| | 7 | 9 | 10 | 11 | 12 |
| k = | −7.8601E+01 | 3.0798E+01 | 1.7941E+01 | −8.6556E+01 | −4.3108E+01 |
| A4 = | 3.9542E−02 | −9.6061E−02 | −2.1138E−01 | −2.0554E−01 | −1.5538E−01 |
| A6 = | −1.1649E−02 | 1.9920E−01 | 4.2265E−01 | 1.7584E−01 | 1.1143E−01 |
| A8 = | −5.1735E−03 | −5.2004E−01 | −7.2693E−01 | −7.3632E−02 | −5.3636E−02 |
| A10 = | −1.1303E−02 | 5.9934E−01 | 6.6895E−01 | −1.3209E−02 | 2.4362E−02 |
| A12 = | 2.5652E−02 | −3.8278E−01 | −3.4866E−01 | 2.3591E−02 | −8.7680E−03 |
| A14 = | −1.2963E−02 | 9.6780E−02 | 7.8807E−02 | −6.0632E−03 | 1.7743E−03 |
| A16 = | — | — | — | — | −1.4811E−04 |

| | Surface # | | | |
|---|---|---|---|---|
| | 13 | 14 | 15 | 16 |
| k = | −1.6222E+00 | −3.4556E+01 | 9.0000E+01 | −8.3694E+00 |
| A4 = | −2.3849E−02 | −2.4245E−02 | −2.2988E−01 | −1.0598E−01 |
| A6 = | −8.3401E−03 | 2.2770E−02 | 1.3257E−01 | 6.0031E−02 |
| A8 = | 1.1212E−02 | −1.6756E−02 | −5.1445E−02 | −2.4221E−02 |
| A10 = | −5.0300E−03 | 1.0231E−02 | 1.4831E−02 | 6.8406E−03 |
| A12 = | 9.9720E−04 | −3.9473E−03 | −2.9495E−03 | −1.3192E−03 |
| A14 = | −8.0668E−05 | 8.9683E−04 | 3.7903E−04 | 1.6633E−04 |
| A16 = | −6.7118E−07 | −1.1825E−04 | −2.9746E−05 | −1.2950E−05 |
| A18 = | 4.7604E−07 | 8.4058E−06 | 1.2934E−06 | 5.6071E−07 |
| A20 = | −1.9966E−08 | −2.4924E−07 | −2.3878E−08 | −1.0277E−08 |

In Table 1, the curvature radius, the thickness and the focal length are shown in millimeters (mm). Surface numbers 0-19 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
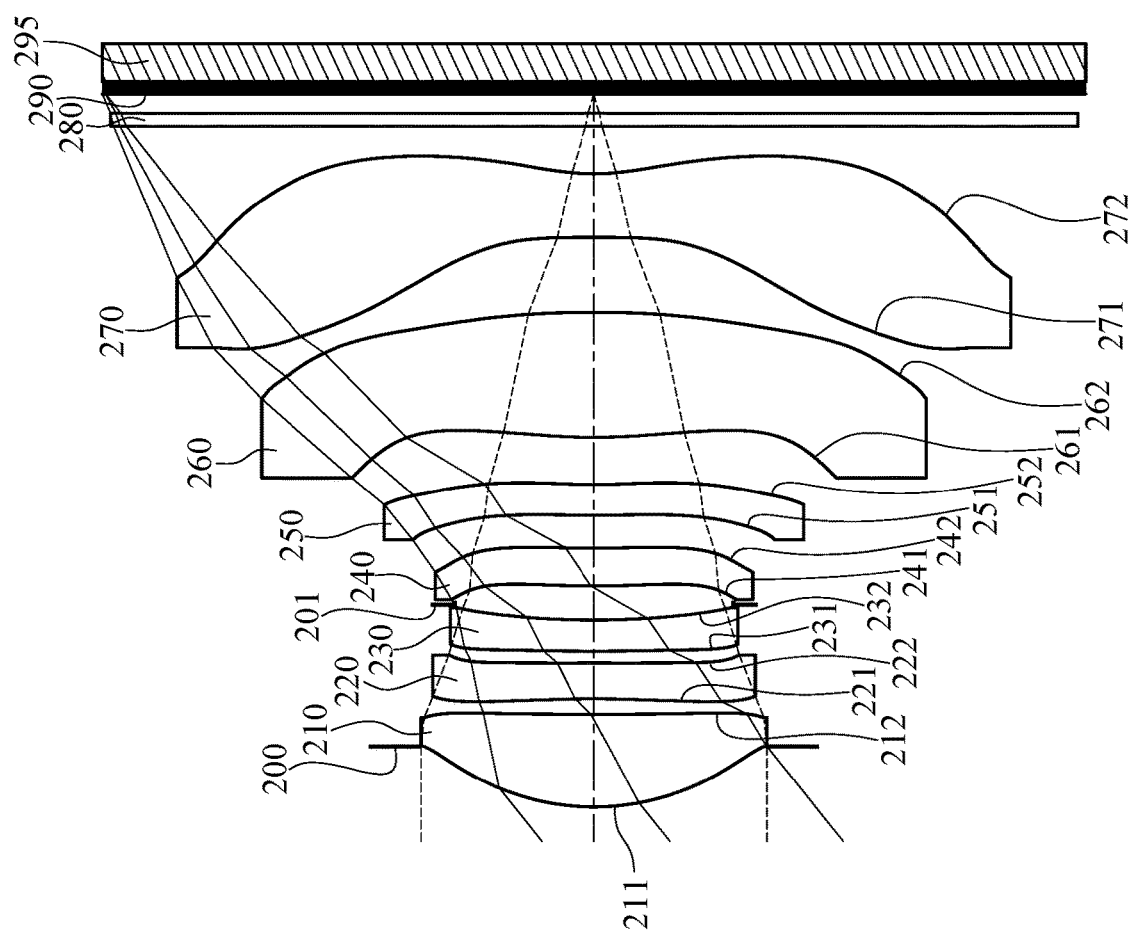
FIG. 3 is a schematic view of an image capturing unit according to the 2nd embodiment of the present disclosure.
Figure 4:
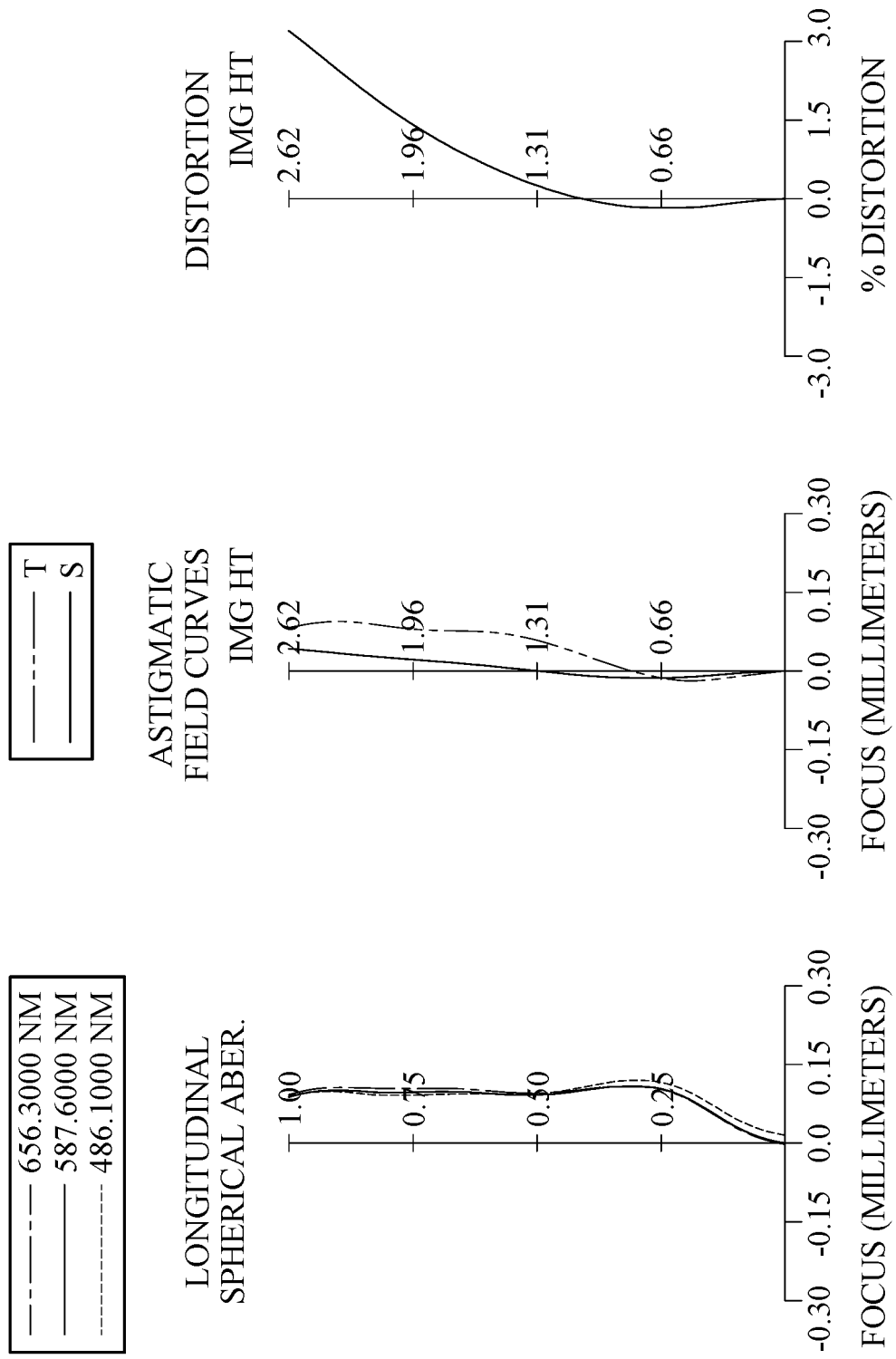
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging lens system (its reference numeral is omitted) of the present disclosure and an image sensor 295. The imaging lens system includes, in order from an object side to an image side, an aperture stop 200, a first lens element 210, a second lens element 220, a third lens element 230, a stop 201, a fourth lens element 240, a fifth lens element 250, a sixth lens element 260, a seventh lens element 270, a filter 280 and an image surface 290. The imaging lens system includes seven lens elements (210, 220, 230, 240, 250, 260 and 270) with no additional lens element disposed between each of the adjacent seven lens elements.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric.

The second lens element 220 with negative refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric. The object-side 221 of the second lens element 220 has a convex critical point in an off-axis region thereof.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The image-side 252 of the fifth lens element 250 has a convex critical point in an off-axis region thereof.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric.

The seventh lens element 270 with negative refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. Each of the object-side surface 271 and the image-side surface 272 of the seventh lens element 270 has a convex critical point in an off-axis region thereof. The image-side 272 of the seventh lens element 270 has at least one inflection point in an off-axis region thereof.

The filter 280 is made of glass material and located between the seventh lens element 270 and the image surface 290, and will not affect the focal length of the imaging lens system. The image sensor 295 is disposed on or near the image surface 290 of the imaging lens system.

In this embodiment, there are three lens elements (the second lens element 220, the third lens element 230 and the fifth lens element 250) each have an Abbe number ranging from 10.0 to 32.0.

The detailed optical data of the 2nd embodiment are shown in Table 3 and the aspheric surface data are shown in Table 4 below.

TABLE 3

2nd Embodiment
f = 5.02 mm, Fno = 1.73, HFOV = 38.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.510 | | | | |
| 2 | Lens 1 | 2.069 (ASP) | 0.782 | Plastic | 1.545 | 56.1 | 3.80 |
| 3 | | −4344.064 (ASP) | 0.129 | | | | |
| 4 | Lens 2 | −8.814 (ASP) | 0.300 | Plastic | 1.670 | 17.2 | −14.49 |
| 5 | | −96.947 (ASP) | 0.100 | | | | |
| 6 | Lens 3 | 20.266 (ASP) | 0.260 | Plastic | 1.634 | 23.8 | −16.58 |
| 7 | | 6.886 (ASP) | 0.130 | | | | |
| 8 | Stop | Plano | 0.157 | | | | |
| 9 | Lens 4 | 7.585 (ASP) | 0.319 | Plastic | 1.530 | 55.8 | 41.97 |
| 10 | | 11.339 (ASP) | 0.274 | | | | |
| 11 | Lens 5 | 8.781 (ASP) | 0.260 | Plastic | 1.669 | 19.4 | −23.66 |
| 12 | | 5.581 (ASP) | 0.397 | | | | |
| 13 | Lens 6 | 4.800 (ASP) | 1.050 | Plastic | 1.544 | 56.0 | 6.02 |
| 14 | | −9.537 (ASP) | 0.630 | | | | |
| 15 | Lens 7 | 332.331 (ASP) | 0.535 | Plastic | 1.534 | 55.9 | −3.48 |
| 16 | | 1.848 (ASP) | 0.400 | | | | |
| 17 | Filter | Plano | 0.110 | Glass | 1.517 | 64.2 | — |
| 18 | | Plano | 0.160 | | | | |
| 19 | Image | Plano | — | | | | |

Note:
Reference wavelength is 587.6 nm (d-line).
An effective radius of the stop 201 (Surface 8) is 1.170 mm.

TABLE 4

Aspheric Coefficients

| Surface # | | | | |
|---|---|---|---|---|
| 2 | 3 | 4 | 5 | 6 |
| k = −4.6616E−01 | 2.4222E−09 | 1.1124E+01 | 9.0000E+01 | 2.8957E+00 |
| A4 = 4.9139E−03 | 2.5138E−02 | 6.2870E−02 | 3.6768E−02 | −5.9311E−03 |
| A6 = 2.5334E−03 | −1.5072E−02 | −4.7098E−02 | −5.9874E−02 | −2.4273E−02 |
| A8 = 1.5204E−04 | −2.9640E−03 | 1.1827E−02 | 3.5846E−02 | 2.0901E−02 |
| A10 = −2.6821E−03 | 4.2044E−03 | 1.1822E−02 | 2.2576E−03 | 2.2538E−03 |
| A12 = 2.1207E−03 | −1.4300E−03 | −5.6865E−03 | — | — |
| A14 = −8.2097E−04 | — | 7.1836E−04 | — | — |

| Surface # | | | | |
|---|---|---|---|---|
| 7 | 9 | 10 | 11 | 12 |
| k = −8.7757E+01 | 2.7272E+01 | 4.5699E+01 | −4.5741E+01 | −4.9961E+01 |
| A4 = 1.9714E−02 | −8.8871E−02 | −9.6573E−02 | −1.4898E−01 | −1.4175E−01 |
| A6 = 1.9243E−02 | 6.6172E−02 | 6.2336E−02 | 1.1114E−01 | 9.1484E−02 |
| A8 = −6.2369E−03 | −1.7808E−01 | −9.1785E−02 | −2.6465E−02 | −9.7591E−03 |
| A10 = 8.3496E−02 | 1.9856E−01 | 5.3611E−02 | −3.5465E−02 | −3.2908E−02 |
| A12 = −5.3203E−02 | −1.3214E−01 | −2.3120E−02 | 2.7034E−02 | 2.3949E−02 |
| A14 = 1.3488E−02 | 3.5821E−02 | 6.1863E−03 | −5.4322E−03 | −6.6370E−03 |
| A16 = — | — | — | — | 6.6047E−04 |

| Surface # | | | |
|---|---|---|---|
| 13 | 14 | 15 | 16 |
| k = −9.0849E+00 | −9.0000E+01 | 9.0000E+01 | −1.0619E+01 |
| A4 = −5.2677E−02 | −3.4311E−02 | −2.3920E−01 | −9.5447E−02 |
| A6 = 1.5678E−02 | 2.0914E−02 | 1.5797E−01 | 5.5118E−02 |
| A8 = −1.8410E−03 | −8.6061E−03 | −7.0194E−02 | −2.1073E−02 |
| A10 = −8.7650E−04 | 3.4142E−03 | 2.1744E−02 | 5.4252E−03 |
| A12 = −4.0713E−04 | −1.2114E−03 | −4.4388E−03 | −9.5402E−04 |
| A14 = 3.2442E−04 | 2.9167E−04 | 5.7595E−04 | 1.1152E−04 |
| A16 = −6.7682E−05 | −4.2249E−05 | −4.5535E−05 | −8.1897E−06 |
| A18 = 5.9764E−06 | 3.3158E−06 | 1.9991E−06 | 3.3888E−07 |
| A20 = −1.9572E−07 | −1.0811E−07 | −3.7385E−08 | −5.9877E−09 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.02 | (R10 − R11)/(R10 + R11) | 0.08 |
| Fno | 1.73 | (R13 + R14)/(R13 − R14) | 1.01 |
| HFOV [deg.] | 38.6 | \|f/fi\|min | 0.12 |
| Vmin | 17.2 | f/f1 | 1.32 |
| V5 | 19.4 | f/f3 | −0.30 |
| V2 + V4 + V5 | 92.4 | f/f7 | −1.44 |
| CT1/CT2 | 2.61 | f7/f5 | 0.15 |
| (CT2 + CT3 + CT4 + CT5)/CT6 | 1.08 | TL/f | 1.19 |
| BL/CTmax | 0.64 | TL/EPD | 2.07 |
| T34/T45 | 1.05 | TL/ImgH | 1.46 |
| T45/T56 | 0.69 | f/ImgH | 1.22 |
| T67/T56 | 1.59 | f/EPD | 1.73 |
| f/R8 | 0.44 | SD/TD | 0.90 |
| f/R10 | 0.90 | (TL/ImgH) + (f/EPD) | 3.19 |
| f/R11 | 1.05 | (Y32 + TL)/ImgH | 1.74 |
| R3/R4 | 0.09 | Yc21/CT2 | 3.33 |
| R1/R14 | 1.12 | Yc52/f | 0.12 |
| (R3 + R4)/(R3 − R4) | −1.20 | Yc71/f | 0.59 |
| (R5 + R6)/(R5 − R6) | 2.03 | Yc72/Y72 | 0.42 |

3rd Embodiment

Figure 5:
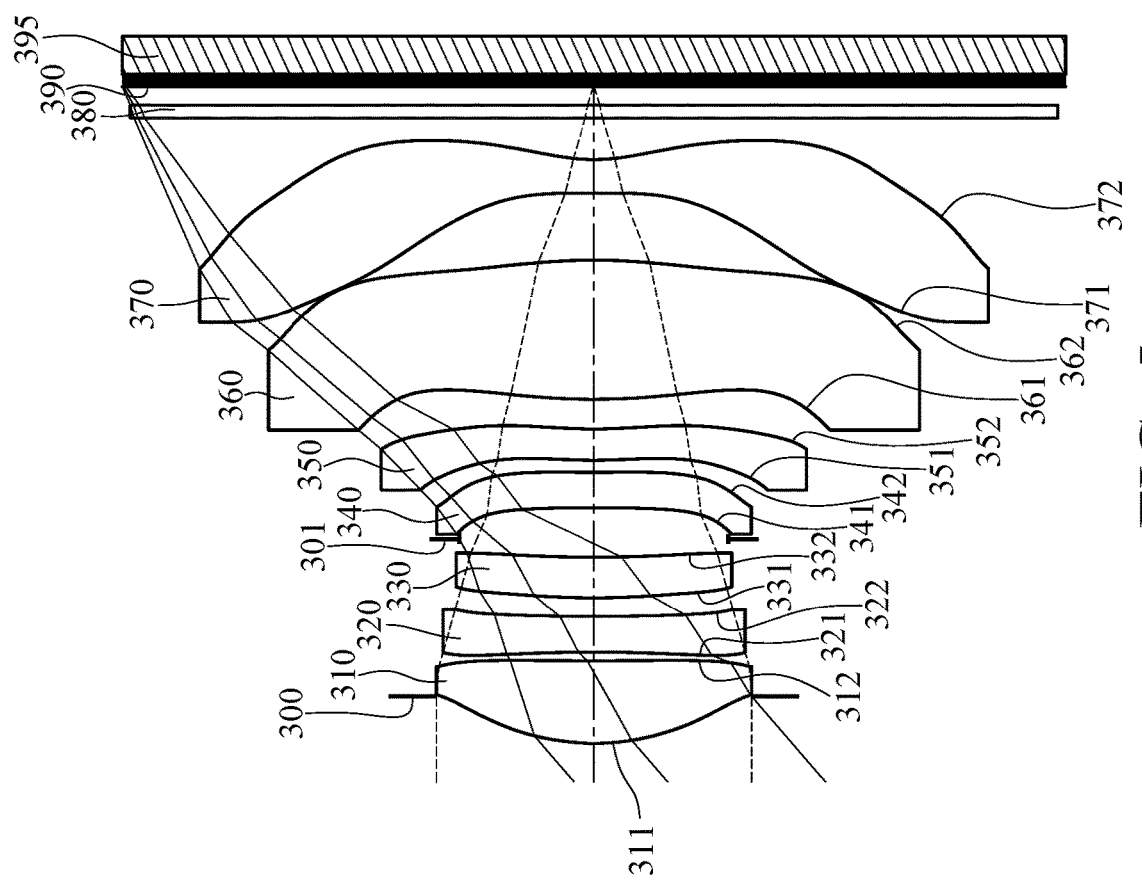
FIG. 5 is a schematic view of an image capturing unit according to the 3rd embodiment of the present disclosure.
Figure 6:
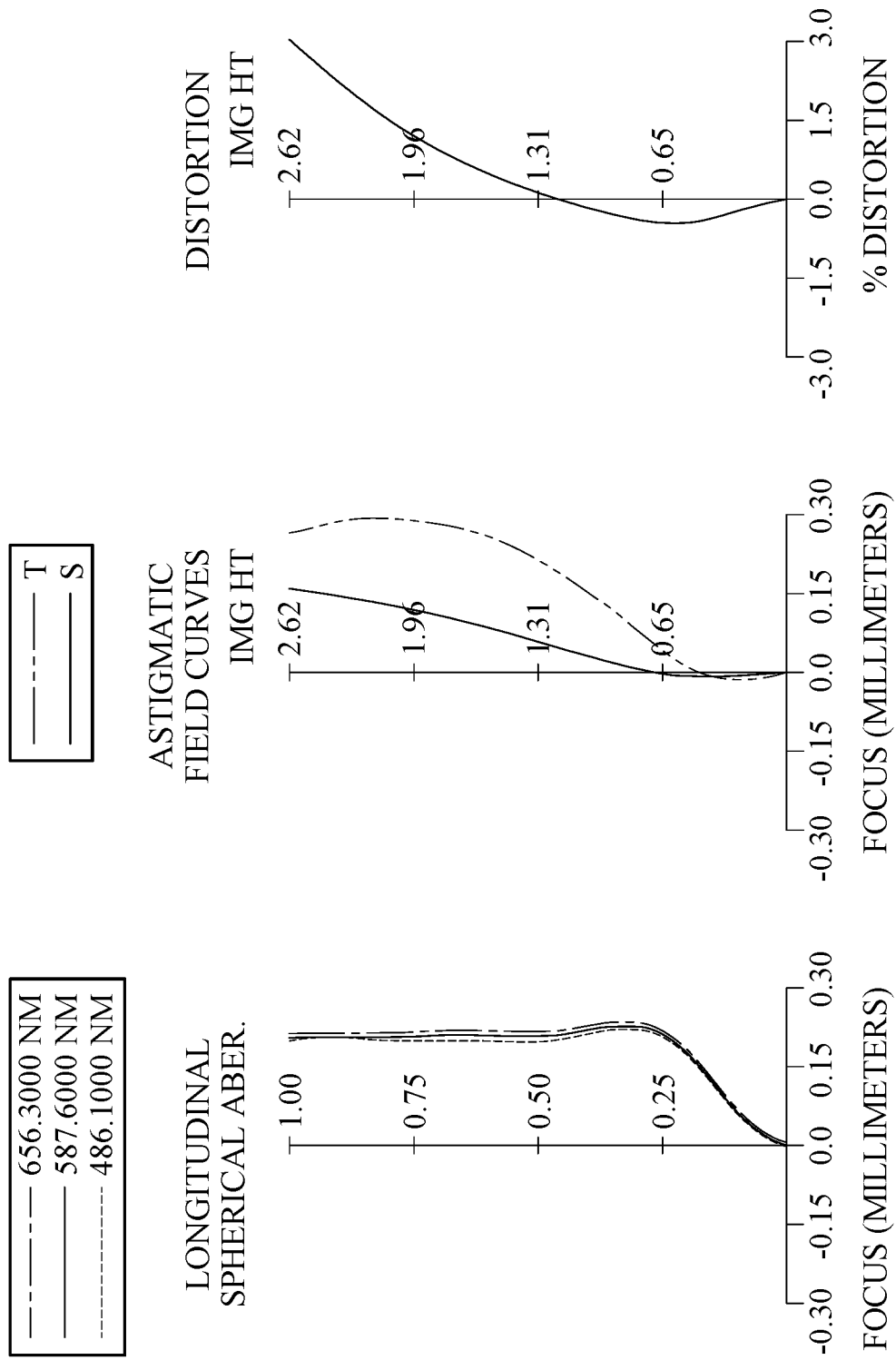
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging lens system (its reference numeral is omitted) of the present disclosure and an image sensor 395. The imaging lens system includes, in order from an object side to an image side, an aperture stop 300, a first lens element 310, a second lens element 320, a third lens element 330, a stop 301, a fourth lens element 340, a fifth lens element 350, a sixth lens element 360, a seventh lens element 370, a filter 380 and an image surface 390. The imaging lens system includes seven lens elements (310, 320, 330, 340, 350, 360 and 370) with no additional lens element disposed between each of the adjacent seven lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric. The object-side 321 of the second lens element 320 has a convex critical point in an off-axis region thereof.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of plastic material and has the object-side surface 341 and the image-side surface 342 being both aspheric.

The fifth lens element 350 with positive refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The image-side 352 of the fifth lens element 350 has a convex critical point in an off-axis region thereof.

The sixth lens element 360 with positive refractive power has an object-side surface 361 being convex in a paraxial region thereof and an image-side surface 362 being convex in a paraxial region thereof. The sixth lens element 360 is made of plastic material and has the object-side surface 361 and the image-side surface 362 being both aspheric.

The seventh lens element 370 with negative refractive power has an object-side surface 371 being concave in a paraxial region thereof and an image-side surface 372 being concave in a paraxial region thereof. The seventh lens element 370 is made of plastic material and has the object-side surface 371 and the image-side surface 372 being both aspheric. The image-side surface 372 of the seventh lens element 370 has a convex critical point in an off-axis region thereof. The image-side 372 of the seventh lens element 370 has at least one inflection point in an off-axis region thereof.

The filter 380 is made of glass material and located between the seventh lens element 370 and the image surface 390, and will not affect the focal length of the imaging lens system. The image sensor 395 is disposed on or near the image surface 390 of the imaging lens system.

In this embodiment, there are three lens elements (the second lens element 320, the fourth lens element 340 and the fifth lens element 350) each have an Abbe number ranging from 10.0 to 32.0.

The detailed optical data of the 3rd embodiment are shown in Table 5 and the aspheric surface data are shown in Table 6 below.

TABLE 5

3rd Embodiment
f = 4.45 mm, Fno = 1.68, HFOV = 40.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.394 | | | | |
| 2 | Lens 1 | 1.987 (ASP) | 0.694 | Plastic | 1.545 | 56.1 | 3.70 |
| 3 | | 121.677 (ASP) | 0.074 | | | | |
| 4 | Lens 2 | −9.603 (ASP) | 0.300 | Plastic | 1.669 | 19.5 | −10.88 |
| 5 | | 30.410 (ASP) | 0.160 | | | | |
| 6 | Lens 3 | 7.159 (ASP) | 0.342 | Plastic | 1.534 | 55.9 | 33.21 |
| 7 | | 11.807 (ASP) | 0.149 | | | | |
| 8 | Stop | Plano | 0.265 | | | | |
| 9 | Lens 4 | −23.739 (ASP) | 0.298 | Plastic | 1.614 | 26.0 | −14.18 |
| 10 | | 13.808 (ASP) | 0.100 | | | | |
| 11 | Lens 5 | 4.283 (ASP) | 0.264 | Plastic | 1.669 | 19.5 | 118.30 |
| 12 | | 4.416 (ASP) | 0.249 | | | | |
| 13 | Lens 6 | 5.852 (ASP) | 1.174 | Plastic | 1.544 | 56.0 | 4.72 |
| 14 | | −4.247 (ASP) | 0.561 | | | | |
| 15 | Lens 7 | −59.169 (ASP) | 0.280 | Plastic | 1.534 | 55.9 | −2.60 |
| 16 | | 1.423 (ASP) | 0.350 | | | | |
| 17 | Filter | Plano | 0.110 | Glass | 1.517 | 64.2 | — |
| 18 | | Plano | 0.153 | | | | |
| 19 | Image | Plano | — | | | | |

Note:
Reference wavelength is 587.6 nm (d-line).
An effective radius of the stop 301 (Surface 8) is 1.130 mm.

TABLE 6

Aspheric Coefficients

| Surface # | | | | | |
|---|---|---|---|---|---|
| | 2 | 3 | 4 | 5 | 6 |
| k = | -8.0689E-01 | 8.8926E-09 | 2.6476E+01 | 8.9999E+01 | 2.8957E+00 |
| A4 = | -3.2611E-04 | 1.2103E-02 | 5.2817E-02 | 3.3096E-02 | 1.0576E-03 |
| A6 = | 3.1289E-02 | -2.5074E-02 | -5.6781E-02 | -5.3845E-02 | -4.5101E-02 |
| A8 = | -6.3468E-02 | 1.1675E-03 | 4.5925E-02 | 3.8583E-02 | 2.5540E-02 |
| A10 = | 6.2396E-02 | 4.5233E-03 | -2.4093E-02 | -4.3627E-03 | 4.4202E-03 |
| A12 = | -3.2346E-02 | -1.6753E-03 | 1.3133E-02 | — | — |
| A14 = | 5.7937E-03 | — | -3.0099E-03 | — | — |

| Surface # | | | | | |
|---|---|---|---|---|---|
| | 7 | 9 | 10 | 11 | 12 |
| k = | -9.0000E+01 | -9.0000E+01 | -9.0000E+01 | -9.0000E+01 | -3.1614E+01 |
| A4 = | 1.8576E-02 | -4.6969E-02 | -1.9799E-01 | -1.5263E-01 | -8.6348E-02 |
| A6 = | -3.9872E-02 | 3.1922E-02 | 2.7702E-01 | 6.8409E-02 | -1.3552E-02 |
| A8 = | 3.7392E-02 | -1.2871E-01 | -3.8039E-01 | -1.8072E-01 | 4.8735E-02 |
| A10 = | -4.0806E-02 | 1.3183E-01 | 2.8466E-01 | -8.5314E-03 | -2.5181E-02 |
| A12 = | 2.9518E-02 | -9.4387E-02 | -1.2615E-01 | 1.0108E-02 | 5.2587E-03 |
| A14 = | -8.4668E-03 | 2.5756E-02 | 2.5765E-02 | -2.6778E-03 | -3.2915E-04 |
| A16 = | — | — | — | — | -2.1153E-05 |

| Surface # | | | | |
|---|---|---|---|---|
| | 13 | 14 | 15 | 16 |
| k = | -1.2782E+01 | -5.3074E+01 | 9.0000E+01 | -1.1726E+01 |
| A4 = | 1.7446E-02 | 5.9538E-03 | -2.5331E-01 | -9.0783E-02 |
| A6 = | -4.8449E-02 | -1.7938E-03 | 1.7007E-01 | 5.0948E-02 |
| A8 = | 2.9337E-02 | 3.6364E-03 | -7.8029E-02 | -2.0349E-02 |
| A10 = | -9.0016E-03 | -2.5460E-03 | 2.4927E-02 | 5.7618E-03 |
| A12 = | 3.0948E-04 | 7.1554E-04 | -5.2066E-03 | -1.1852E-03 |
| A14 = | 4.7868E-04 | -9.0294E-05 | 6.8665E-04 | 1.6604E-04 |
| A16 = | -1.1548E-04 | 2.5272E-06 | -5.4929E-05 | -1.4443E-05 |
| A18 = | 1.0769E-05 | 4.4885E-07 | 2.4330E-06 | 6.9064E-07 |
| A20 = | -3.6886E-07 | -3.0101E-08 | -4.5818E-08 | -1.3774E-08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.45 | (R10 − R11)/(R10 + R11) | -0.14 |
| Fno | 1.68 | (R13 + R14)/(R13 − R14) | 0.95 |
| HFOV [deg.] | 40.8 | |f/fi|min | 0.04 |
| Vmin | 19.5 | f/f1 | 1.20 |
| V5 | 19.5 | f/f3 | 0.13 |
| V2 + V4 + V5 | 65.0 | f/f7 | -1.71 |
| CT1/CT2 | 2.31 | f7/f5 | -0.02 |
| (CT2 + CT3 + CT4 + CT5)/CT6 | 1.03 | TL/f | 1.24 |
| BL/CTmax | 0.52 | TL/EPD | 2.08 |
| T34/T45 | 4.14 | TL/ImgH | 1.40 |
| T45/T56 | 0.40 | f/ImgH | 1.13 |
| T67/T56 | 2.25 | f/EPD | 1.68 |
| f/R8 | 0.32 | SD/TD | 0.92 |
| f/R10 | 1.01 | (TL/ImgH) + (f/EPD) | 3.08 |
| f/R11 | 0.76 | (Y32 + TL)/ImgH | 1.69 |
| R3/R4 | -0.32 | Yc21/CT2 | 3.43 |
| R1/R14 | 1.40 | Yc52/f | 0.17 |

| 3rd Embodiment | | | |
|---|---|---|---|
| (R3 + R4)/(R3 − R4) | -0.52 | Yc71/f | — |
| (R5 + R6)/(R5 − R6) | -4.08 | Yc72/Y72 | 0.41 |

4th Embodiment

Figure 7:
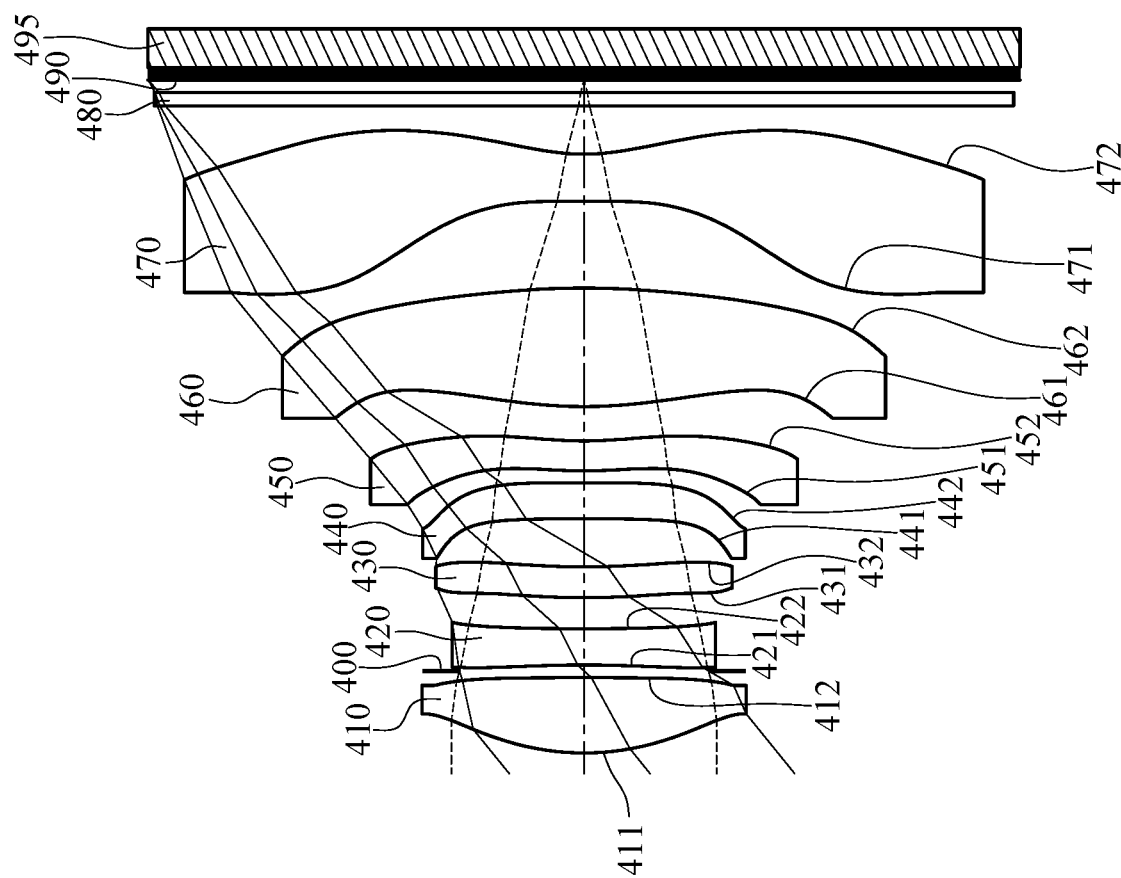
FIG. 7 is a schematic view of an image capturing unit according to the 4th embodiment of the present disclosure.
Figure 8:
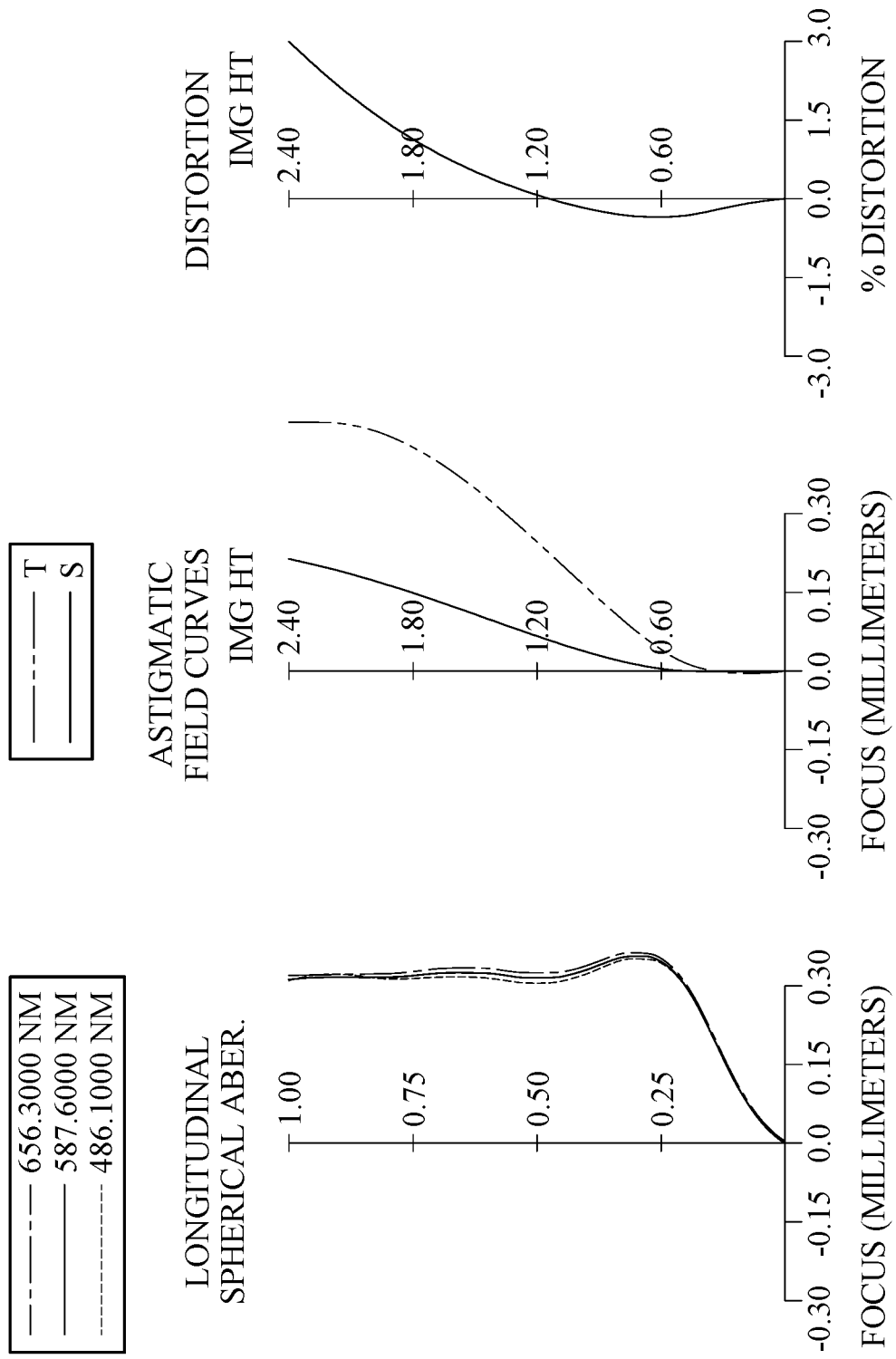
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging lens system (its reference numeral is omitted) of the present disclosure and an image sensor 495. The imaging lens system includes, in order from an object side to an image side, a first lens element 410, an aperture stop 400, a second lens element 420, a third lens element 430, a fourth lens element 440, a fifth lens element 450, a sixth lens element 460, a seventh lens element 470, a filter 480 and an image surface 490. The imaging lens system includes seven lens elements (410, 420, 430, 440, 450, 460 and 470) with no additional lens element disposed between each of the adjacent seven lens elements.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric. The object-side 421 of the second lens element 420 has a convex critical point in an off-axis region thereof.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being concave in a paraxial region thereof. The fourth lens element 440 is made of plastic material and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The image-side 452 of the fifth lens element 450 has a convex critical point in an off-axis region thereof.

The sixth lens element 460 with positive refractive power has an object-side surface 461 being convex in a paraxial region thereof and an image-side surface 462 being convex in a paraxial region thereof. The sixth lens element 460 is made of plastic material and has the object-side surface 461 and the image-side surface 462 being both aspheric.

The seventh lens element 470 with negative refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. Each of the object-side surface 471 and the image-side surface 472 of the seventh lens element 470 has a convex critical point in an off-axis region thereof. The image-side 472 of the seventh lens element 470 has at least one inflection point in an off-axis region thereof.

The filter 480 is made of glass material and located between the seventh lens element 470 and the image surface 490, and will not affect the focal length of the imaging lens system. The image sensor 495 is disposed on or near the image surface 490 of the imaging lens system.

In this embodiment, there are three lens elements (the second lens element 420, the fourth lens element 440 and the fifth lens element 450) each have an Abbe number ranging from 10.0 to 32.0.

The detailed optical data of the 4th embodiment are shown in Table 7 and the aspheric surface data are shown in Table 8 below.

TABLE 7

4th Embodiment f = 4.32 mm, Fno = 1.97, HFOV = 39.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.114 (ASP) | 0.623 | Plastic | 1.545 | 56.1 | 3.77 |
| 2 | | -62.363 (ASP) | 0.056 | | | | |
| 3 | Ape. Stop | Plano | 0.049 | | | | |
| 4 | Lens 2 | -8.809 (ASP) | 0.300 | Plastic | 1.669 | 19.5 | -10.82 |
| 5 | | 41.024 (ASP) | 0.256 | | | | |
| 6 | Lens 3 | 6.357 (ASP) | 0.255 | Plastic | 1.534 | 55.9 | 114.94 |
| 7 | | 6.993 (ASP) | 0.398 | | | | |
| 8 | Lens 4 | -38.082 (ASP) | 0.295 | Plastic | 1.614 | 26.0 | -16.69 |
| 9 | | 14.049 (ASP) | 0.100 | | | | |
| 10 | Lens 5 | 3.404 (ASP) | 0.248 | Plastic | 1.660 | 20.4 | -298.95 |
| 11 | | 3.250 (ASP) | 0.284 | | | | |
| 12 | Lens 6 | 3.830 (ASP) | 0.980 | Plastic | 1.544 | 56.0 | 4.61 |
| 13 | | -6.607 (ASP) | 0.717 | | | | |
| 14 | Lens 7 | 37.846 (ASP) | 0.390 | Plastic | 1.534 | 55.9 | -3.42 |
| 15 | | 1.737 (ASP) | 0.400 | | | | |
| 16 | Filter | Plano | 0.110 | Glass | 1.517 | 64.2 | — |
| 17 | | Plano | 0.103 | | | | |
| 18 | Image | Plano | — | | | | |

Note:

Reference wavelength is 587.6 nm (d-line).

TABLE 8

Aspheric Coefficients

| Surface # | | | | |
|---|---|---|---|---|
| 1 | 2 | 4 | 5 | 6 |
| k = -1.2321E+00 | -4.9270E-09 | -2.4088E+00 | 8.9999E+01 | 2.8895E+00 |
| A4 = 4.3951E-03 | -4.6671E-03 | 4.1735E-02 | 4.1193E-02 | -1.4909E-02 |
| A6 = 7.5587E-03 | -1.3907E-02 | -1.0131E-02 | -5.1491E-02 | -4.9526E-02 |
| A8 = -3.1619E-02 | 6.8571E-03 | -1.9458E-02 | 5.1859E-02 | 5.4315E-03 |
| A10 = 3.4151E-02 | -6.0423E-03 | 4.0897E-02 | -3.0835E-02 | 1.7905E-02 |
| A12 = -2.2505E-02 | 1.5964E-03 | -2.2671E-02 | 1.2612E-02 | — |
| A14 = 4.9354E-03 | — | 5.0278E-03 | — | — |

| Surface # | | | | |
|---|---|---|---|---|
| 7 | 8 | 9 | 10 | 11 |
| k = -8.6726E+01 | 9.0000E+01 | -9.0000E+01 | -8.5963E+01 | -2.6148E+01 |
| A4 = 3.8122E-02 | -7.3663E-02 | -2.7074E-01 | -1.4452E-01 | -1.1107E-01 |
| A6 = -9.2475E-02 | 1.7509E-01 | 4.8156E-01 | 3.2336E-02 | 3.6501E-02 |
| A8 = 7.5348E-02 | -4.5631E-01 | -7.6440E-01 | 3.0855E-02 | 8.3033E-03 |
| A10 = -7.4708E-02 | 5.3384E-01 | 6.7499E-01 | -5.5917E-02 | -1.0915E-02 |
| A12 = 5.2463E-02 | -3.4443E-01 | -3.3088E-01 | 3.3623E-02 | 3.2628E-03 |
| A14 = -1.5031E-02 | 8.3857E-02 | 6.7935E-02 | -6.9572E-03 | -3.1039E-04 |
| A16 = — | — | — | — | -1.1408E-05 |

| Surface # | | | |
|---|---|---|---|
| 12 | 13 | 14 | 15 |
| k = -1.3025E+01 | -6.7259E+01 | 9.0000E+01 | -8.1397E+00 |
| A4 = -7.2971E-03 | -2.4055E-02 | -2.4784E-01 | -8.4646E-02 |
| A6 = -6.1124E-03 | 4.4332E-02 | 1.7466E-01 | 4.7781E-02 |
| A8 = -2.7649E-03 | -4.4949E-02 | -9.4680E-02 | -1.9179E-02 |
| A10 = 5.9519E-03 | 2.5105E-02 | 3.5865E-02 | 5.0780E-03 |
| A12 = -3.4883E-03 | -8.4989E-03 | -8.6254E-03 | -8.8543E-04 |
| A14 = 9.5005E-04 | 1.8029E-03 | 1.2899E-03 | 1.0080E-04 |
| A16 = -1.3330E-04 | -2.3584E-04 | -1.1666E-04 | -7.1931E-06 |
| A18 = 9.3971E-06 | 1.7409E-05 | 5.8571E-06 | 2.9129E-07 |
| A20 = -2.6455E-07 | -5.5358E-07 | -1.2557E-07 | -5.0997E-09 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.32 | (R10 − R11)/(R10 + R11) | −0.08 |
| Fno | 1.97 | (R13 + R14)/(R13 − R14) | 1.10 |
| HFOV [deg.] | 39.0 | |f/fi|min | 0.01 |
| Vmin | 19.5 | f/f1 | 1.15 |
| V5 | 20.4 | f/f3 | 0.04 |
| V2 + V4 + V5 | 65.9 | f/f7 | −1.26 |
| CT1/CT2 | 2.08 | f7/f5 | 0.01 |
| (CT2 + CT3 + CT4 + CT5)/CT6 | 1.12 | TL/f | 1.29 |
| BL/CTmax | 0.63 | TL/EPD | 2.54 |
| T34/T45 | 3.98 | TL/ImgH | 1.55 |
| T45/T56 | 0.35 | f/ImgH | 1.20 |
| T67/T56 | 2.52 | f/EPD | 1.97 |
| f/R8 | 0.31 | SD/TD | 0.86 |
| f/R10 | 1.33 | (TL/ImgH) + (f/EPD) | 3.52 |
| f/R11 | 1.13 | (Y32 + TL)/ImgH | 1.89 |
| R3/R4 | −0.21 | Yc21/CT2 | 2.98 |
| R1/R14 | 1.22 | Yc52/f | 0.19 |

-continued

| 4th Embodiment | | | |
|---|---|---|---|
| (R3 + R4)/(R3 − R4) | −0.65 | Yc71/f | 0.60 |
| (R5 + R6)/(R5 − R6) | −21.00 | Yc72/Y72 | 0.47 |

5th Embodiment

Figure 9:
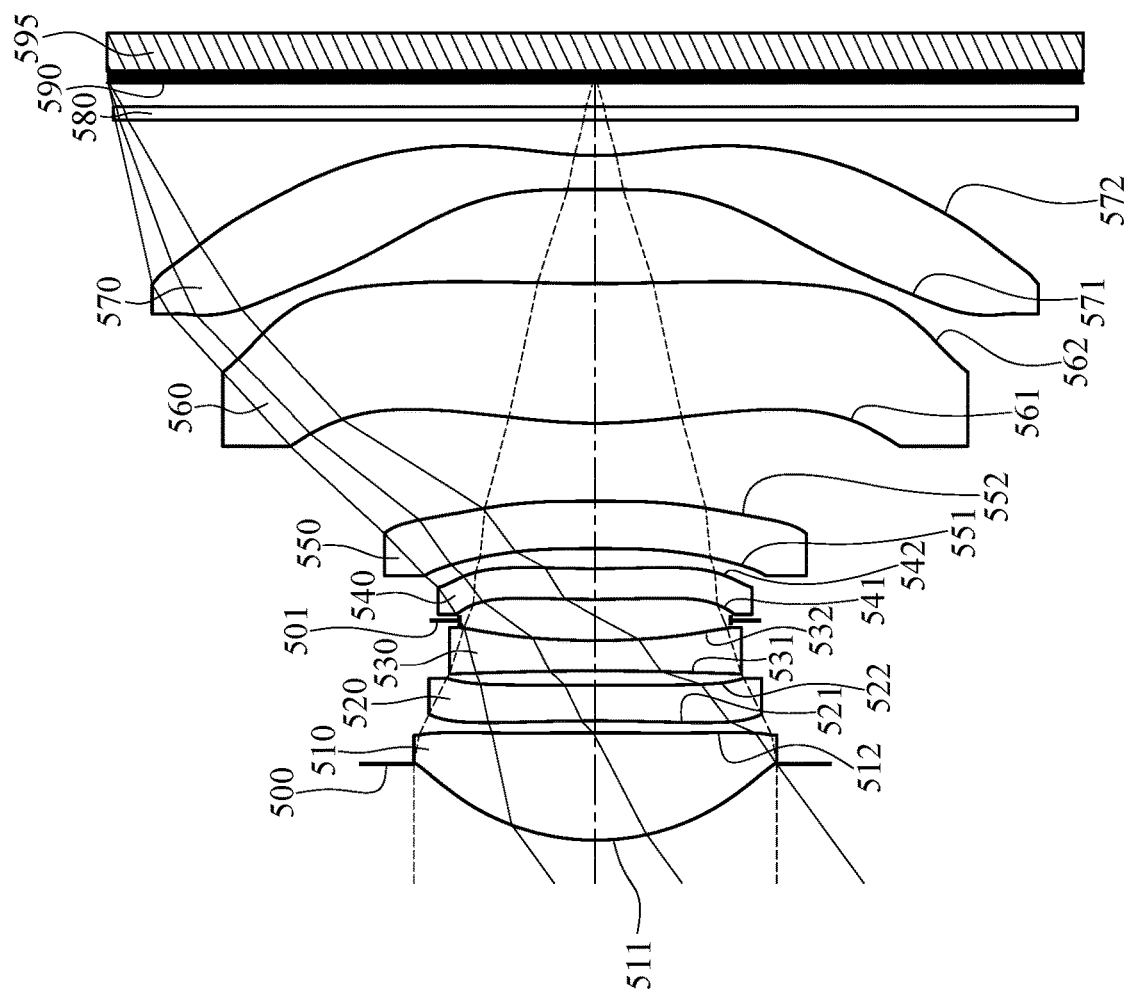
FIG. 9 is a schematic view of an image capturing unit according to the 5th embodiment of the present disclosure.
Figure 10:
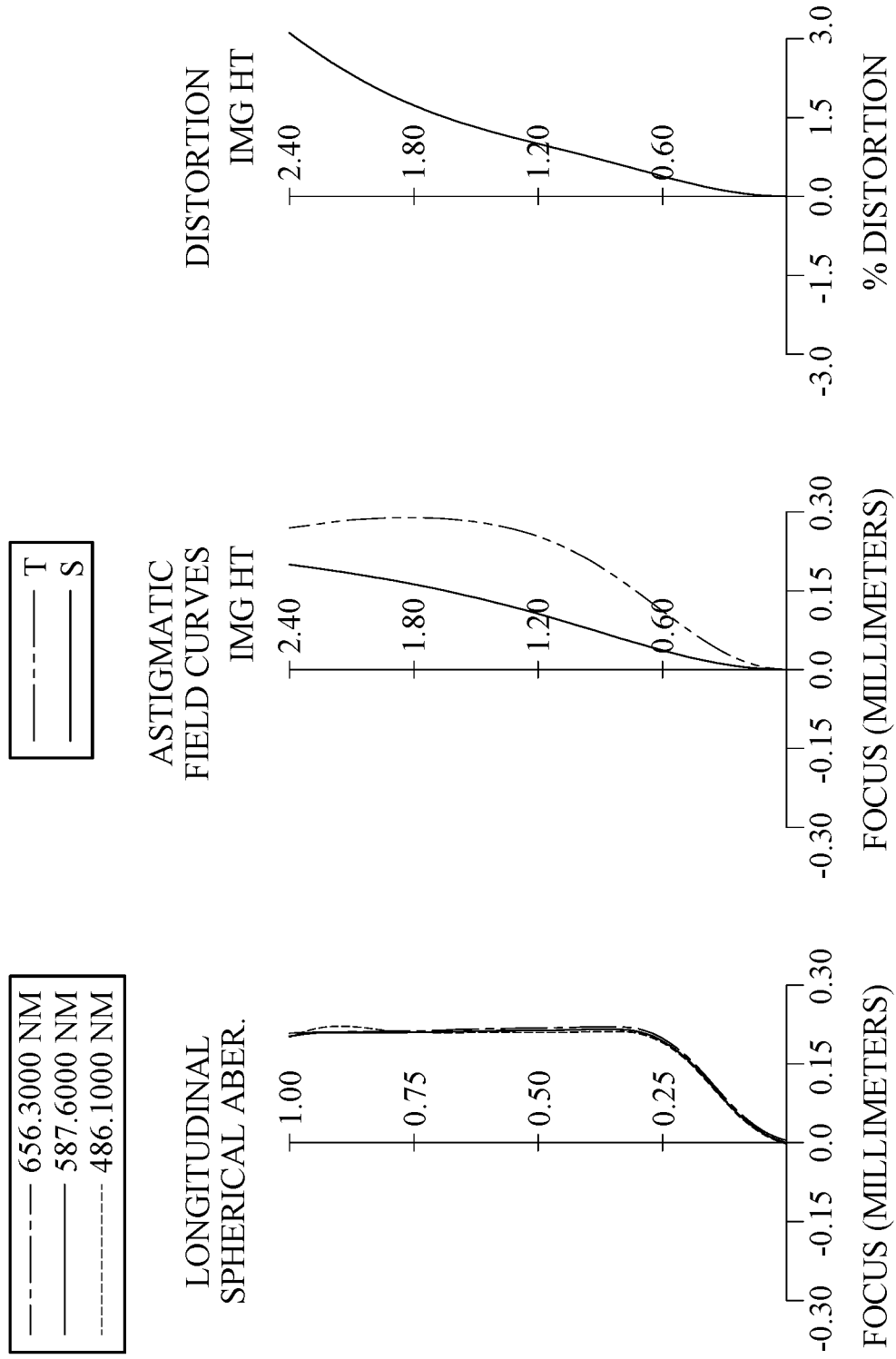
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging lens system (its reference numeral is omitted) of the present disclosure and an image sensor 595. The imaging lens system includes, in order from an object side to an image side, an aperture stop 500, a first lens element 510, a second lens element 520, a third lens element 530, a stop 501, a fourth lens element 540, a fifth lens element 550, a sixth lens element 560, a seventh lens element 570, a filter 580 and an image surface 590. The imaging lens system includes seven lens elements (510, 520, 530, 540, 550, 560 and 570) with no additional lens element disposed between each of the adjacent seven lens elements.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric.

The second lens element 520 with negative refractive power has an object-side surface 521 being concave in a paraxial region thereof and an image-side surface 522 being planar in a paraxial region thereof. The second lens element 520 is made of plastic material and has the object-side surface 521 and the image-side surface 522 being both aspheric. The object-side 521 of the second lens element 520 has a convex critical point in an off-axis region thereof.

The third lens element 530 with negative refractive power has an object-side surface 531 being concave in a paraxial region thereof and an image-side surface 532 being concave in a paraxial region thereof. The third lens element 530 is made of plastic material and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with positive refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric.

The seventh lens element 570 with negative refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. Each of the object-side surface 571 and the image-side surface 572 of the seventh lens element 570 has a convex critical point in an off-axis region thereof. The image-side 572 of the seventh lens element 570 has at least one inflection point in an off-axis region thereof.

The filter 580 is made of glass material and located between the seventh lens element 570 and the image surface 590, and will not affect the focal length of the imaging lens system. The image sensor 595 is disposed on or near the image surface 590 of the imaging lens system.

In this embodiment, there are four lens elements (the second lens element 520, the third lens element 530, the fourth lens element 540 and the fifth lens element 550) each have an Abbe number ranging from 10.0 to 32.0.

The detailed optical data of the 5th embodiment are shown in Table 9 and the aspheric surface data are shown in Table 10 below.

TABLE 9

5th Embodiment
f = 5.46 mm, Fno = 1.79, HFOV = 36.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.640 | | | | |
| 2 | Lens 1 | 2.003 (ASP) | 0.904 | Plastic | 1.545 | 56.1 | 3.58 |
| 3 | | −62.263 (ASP) | 0.100 | | | | |
| 4 | Lens 2 | −13.759 (ASP) | 0.300 | Plastic | 1.650 | 21.5 | −21.16 |
| 5 | | ∞ (ASP) | 0.120 | | | | |
| 6 | Lens 3 | −26.424 (ASP) | 0.260 | Plastic | 1.634 | 23.8 | −8.32 |
| 7 | | 6.614 (ASP) | 0.171 | | | | |
| 8 | Stop | Plano | 0.175 | | | | |
| 9 | Lens 4 | 9.079 (ASP) | 0.259 | Plastic | 1.614 | 26.0 | −210.95 |
| 10 | | 8.392 (ASP) | 0.170 | | | | |
| 11 | Lens 5 | −35.007 (ASP) | 0.397 | Plastic | 1.614 | 26.0 | −233.66 |
| 12 | | −46.512 (ASP) | 0.655 | | | | |
| 13 | Lens 6 | 4.151 (ASP) | 1.181 | Plastic | 1.544 | 56.0 | 9.76 |
| 14 | | 17.090 (ASP) | 0.789 | | | | |
| 15 | Lens 7 | 305.522 (ASP) | 0.286 | Plastic | 1.534 | 55.9 | −5.28 |
| 16 | | 2.794 (ASP) | 0.300 | | | | |
| 17 | Filter | Plano | 0.110 | Glass | 1.517 | 64.2 | — |
| 18 | | Plano | 0.202 | | | | |
| 19 | Image | Plano | — | | | | |

Note:

Reference wavelength is 587.6 nm (d-line).

An effective radius of the stop 501 (Surface 8) is 1.140 mm.

TABLE 10

Aspheric Coefficients

| Surface # | | | | | |
|---|---|---|---|---|---|
| | 2 | 3 | 4 | 5 | 6 |
| k = | −4.0240E−01 | −9.0000E+01 | 5.6625E+01 | −8.9673E+01 | 8.6446E+01 |
| A4 = | 6.6901E−03 | 1.0874E−02 | 2.0164E−02 | 2.7466E−03 | −2.6789E−03 |
| A6 = | −1.0856E−04 | 1.6989E−03 | 1.2060E−02 | 4.9774E−03 | 3.6449E−03 |
| A8 = | 6.9430E−03 | −6.5398E−03 | −2.1549E−02 | 2.9501E−03 | 2.0751E−03 |
| A10 = | −8.4841E−03 | 3.4987E−03 | 2.0793E−02 | 1.6414E−03 | −1.7236E−03 |
| A12 = | 4.7086E−03 | −8.9004E−04 | −8.4736E−03 | — | — |
| A14 = | −1.0739E−03 | — | 1.5531E−03 | — | — |

| Surface # | | | | | |
|---|---|---|---|---|---|
| | 7 | 9 | 10 | 11 | 12 |
| k = | −8.1532E+01 | 4.8247E+01 | 3.2666E+01 | −9.0000E+01 | −9.0000E+01 |
| A4 = | 5.0360E−02 | −9.4499E−02 | −1.3917E−01 | −1.6257E−01 | −1.2681E−01 |
| A6 = | −4.1633E−02 | 9.4039E−02 | 1.6259E−01 | 1.7379E−01 | 1.0917E−01 |
| A8 = | 5.5872E−02 | −2.3146E−01 | −2.3605E−01 | −1.1078E−01 | −6.6229E−02 |
| A10 = | −5.5901E−02 | 2.3066E−01 | 1.7260E−01 | 3.0315E−02 | 3.4898E−02 |
| A12 = | 2.9556E−02 | −1.3042E−01 | −7.4892E−02 | 1.9665E−03 | −1.2920E−02 |
| A14 = | −7.5092E−03 | 2.9483E−02 | 1.5552E−02 | −1.9845E−03 | 2.6314E−03 |
| A16 = | — | — | — | — | −2.2395E−04 |

| Surface # | | | |
|---|---|---|---|
| | 13 | 14 | 15 | 16 |
| k = | −7.7591E−01 | −3.5813E+01 | 9.0000E+01 | −1.6265E+01 |
| A4 = | −5.4432E−02 | −1.4367E−02 | −1.6031E−01 | −7.6535E−02 |
| A6 = | 2.3385E−02 | 2.0621E−03 | 7.8135E−02 | 3.0466E−02 |
| A8 = | −1.2143E−02 | −5.3644E−04 | −2.5667E−02 | −8.6330E−03 |
| A10 = | 5.2551E−03 | 3.4332E−04 | 6.1994E−03 | 1.7305E−03 |
| A12 = | −1.6662E−03 | −1.3056E−04 | −1.0266E−03 | −2.5029E−04 |
| A14 = | 3.4613E−04 | 2.6793E−05 | 1.0959E−04 | 2.5660E−05 |
| A16 = | −4.3747E−05 | −3.2208E−06 | −7.1400E−06 | −1.7347E−06 |
| A18 = | 3.0339E−06 | 2.1190E−07 | 2.5772E−07 | 6.7763E−08 |
| A20 = | −8.8117E−08 | −5.7796E−09 | −3.9519E−09 | −1.1403E−09 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 5.46 | (R10 − R11)/(R10 + R11) | 1.20 |
| Fno | 1.79 | (R13 + R14)/(R13 − R14) | 1.02 |
| HFOV [deg.] | 36.1 | \|f/fi\|min | 0.02 |
| Vmin | 21.5 | f/f1 | 1.53 |
| V5 | 26.0 | f/f3 | −0.66 |
| V2 + V4 + V5 | 73.5 | f/f7 | −1.03 |
| CT1/CT2 | 3.01 | f7/f5 | 0.02 |
| (CT2 + CT3 + CT4 + CT5)/CT6 | 1.03 | TL/f | 1.17 |
| BL/CTmax | 0.52 | TL/EPD | 2.09 |
| T34/T45 | 2.04 | TL/ImgH | 1.56 |
| T45/T56 | 0.26 | f/ImgH | 1.33 |
| T67/T56 | 1.20 | f/EPD | 1.79 |
| f/R8 | 0.65 | SD/TD | 0.89 |
| f/R10 | −0.12 | (TL/ImgH) + (f/EPD) | 3.35 |
| f/R11 | 1.32 | (Y32 + TL)/ImgH | 1.83 |
| R3/R4 | 0.00 | Yc21/CT2 | 3.03 |
| R1/R14 | 0.72 | Yc52/f | — |

-continued

| 5th Embodiment | | | |
|---|---|---|---|
| (R3 + R4)/(R3 − R4) | −1.00 | Yc71/f | 0.60 |
| (R5 + R6)/(R5 − R6) | 0.60 | Yc72/Y72 | 0.30 |

6th Embodiment

Figure 11:
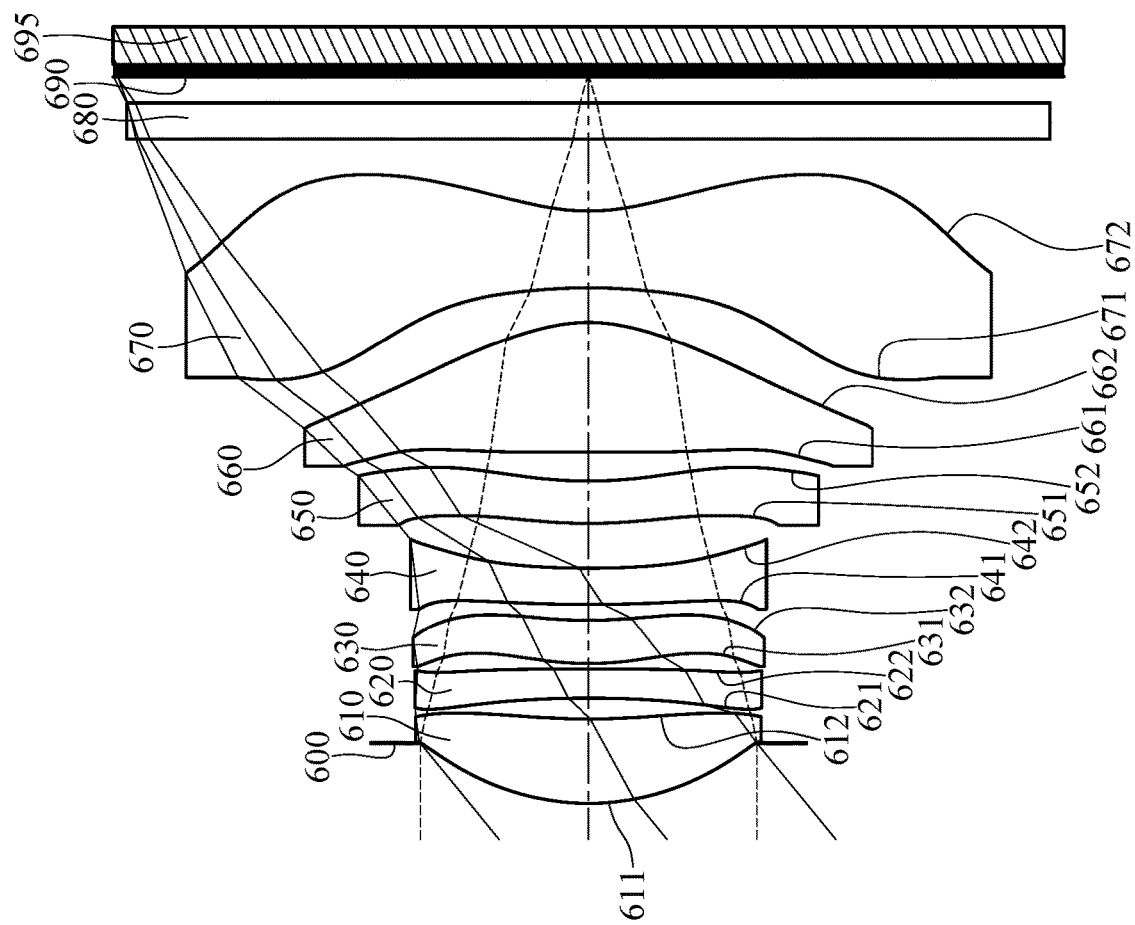
FIG. 11 is a schematic view of an image capturing unit according to the 6th embodiment of the present disclosure.
Figure 12:
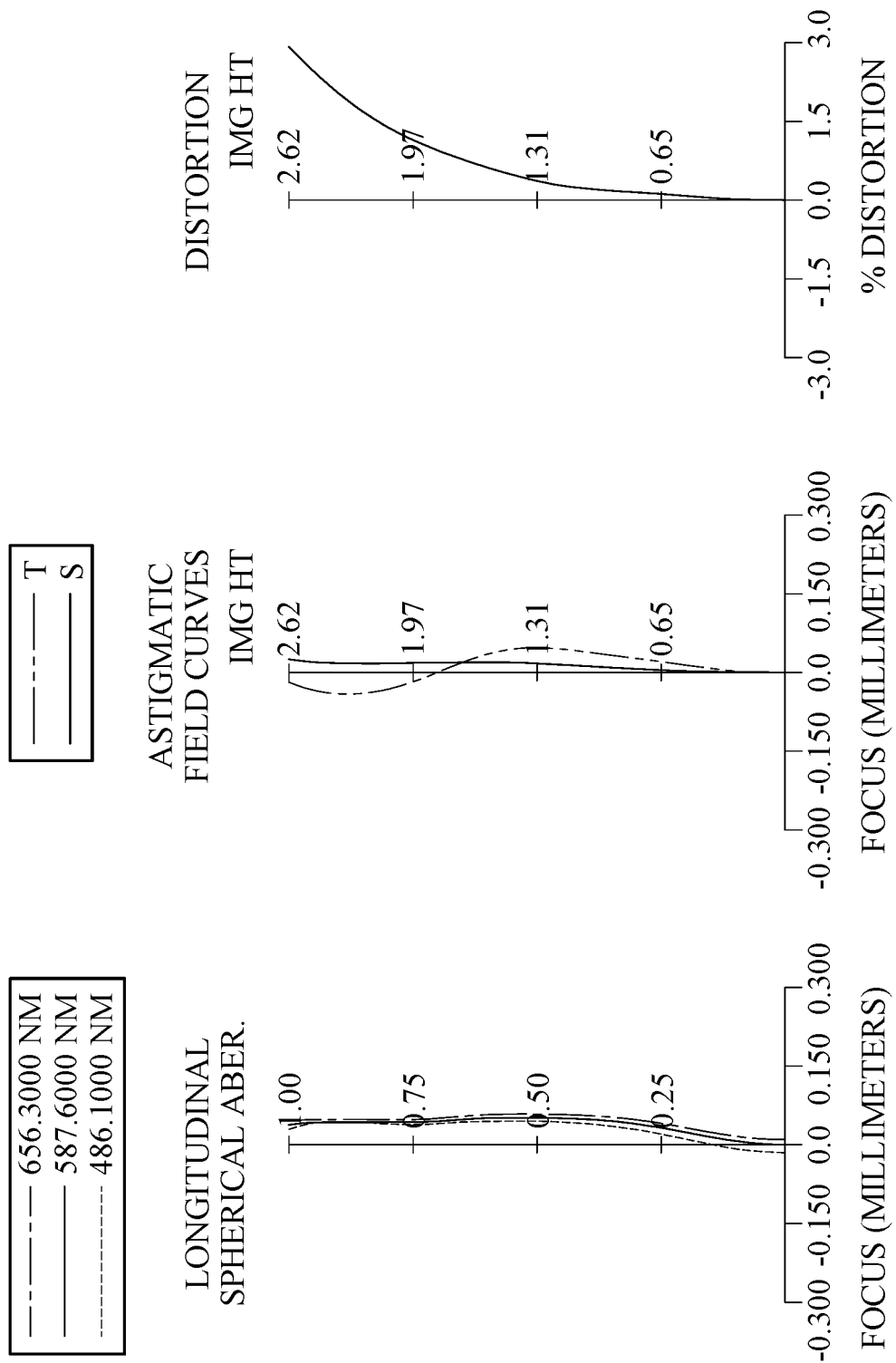
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging lens system (its reference numeral is omitted) of the present disclosure and an image sensor 695. The imaging lens system includes, in order from an object side to an image side, an aperture stop 600, a first lens element 610, a second lens element 620, a third lens element 630, a fourth lens element 640, a fifth lens element 650, a sixth lens element 660, a seventh lens element 670, a filter 680 and an image surface 690. The imaging lens system includes seven lens elements (610, 620, 630, 640, 650, 660 and 670) with no additional lens element disposed between each of the adjacent seven lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric. The object-side 621 of the second lens element 620 has a convex critical point in an off-axis region thereof.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric.

The fifth lens element 650 with negative refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The image-side 652 of the fifth lens element 650 has a convex critical point in an off-axis region thereof.

The sixth lens element 660 with positive refractive power has an object-side surface 661 being concave in a paraxial region thereof and an image-side surface 662 being convex in a paraxial region thereof. The sixth lens element 660 is made of plastic material and has the object-side surface 661 and the image-side surface 662 being both aspheric.

The seventh lens element 670 with negative refractive power has an object-side surface 671 being concave in a paraxial region thereof and an image-side surface 672 being concave in a paraxial region thereof. The seventh lens element 670 is made of plastic material and has the object-side surface 671 and the image-side surface 672 being both aspheric. Each of the object-side surface 671 and the image-side surface 672 of the seventh lens element 670 has a convex critical point in an off-axis region thereof. The image-side 672 of the seventh lens element 670 has at least one inflection point in an off-axis region thereof.

The filter 680 is made of glass material and located between the seventh lens element 670 and the image surface 690, and will not affect the focal length of the imaging lens system. The image sensor 695 is disposed on or near the image surface 690 of the imaging lens system.

In this embodiment, there are three lens elements (the second lens element 620, the fourth lens element 640 and the fifth lens element 650) each have an Abbe number ranging from 10.0 to 32.0.

The detailed optical data of the 6th embodiment are shown in Table 11 and the aspheric surface data are shown in Table 12 below.

TABLE 11

6th Embodiment
f = 4.68 mm, Fno = 1.67, HFOV = 39.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.501 | | | | |
| 2 | Lens 1 | 2.088 (ASP) | 0.703 | Plastic | 1.544 | 55.9 | 5.56 |
| 3 | | 5.947 (ASP) | 0.173 | | | | |
| 4 | Lens 2 | −8.356 (ASP) | 0.240 | Plastic | 1.680 | 18.4 | −12.17 |
| 5 | | 854.663 (ASP) | 0.046 | | | | |
| 6 | Lens 3 | 2.458 (ASP) | 0.366 | Plastic | 1.544 | 55.9 | 10.67 |
| 7 | | 4.040 (ASP) | 0.132 | | | | |
| 8 | Lens 4 | 15.091 (ASP) | 0.300 | Plastic | 1.634 | 23.8 | −30.26 |
| 9 | | 8.382 (ASP) | 0.373 | | | | |
| 10 | Lens 5 | 4.235 (ASP) | 0.353 | Plastic | 1.639 | 23.5 | −75.28 |
| 11 | | 3.766 (ASP) | 0.241 | | | | |
| 12 | Lens 6 | −23.137 (ASP) | 1.081 | Plastic | 1.544 | 55.9 | 2.67 |
| 13 | | −1.390 (ASP) | 0.289 | | | | |
| 14 | Lens 7 | −4.686 (ASP) | 0.637 | Plastic | 1.544 | 55.9 | −2.21 |
| 15 | | 1.695 (ASP) | 0.600 | | | | |
| 16 | Filter | Plano | 0.300 | Glass | 1.517 | 64.2 | — |
| 17 | | Plano | 0.216 | | | | |
| 18 | Image | Plano | — | | | | |

Note:
Reference wavelength is 587.6 nm (d-line).

TABLE 12

Aspheric Coefficients

| | Surface # | | | | |
|---|---|---|---|---|---|
| | 2 | 3 | 4 | 5 | 6 |
| k = | 4.2701E−01 | 9.0590E+00 | −6.6140E+00 | −1.0000E+00 | −1.8306E+01 |
| A4 = | −9.4868E−03 | −3.5392E−02 | 1.3899E−02 | −2.7285E−02 | 2.3143E−02 |
| A6 = | 2.3836E−03 | −2.1352E−02 | −5.4743E−02 | −2.3561E−03 | −1.4478E−01 |

TABLE 12-continued

| Aspheric Coefficients | | | | | |
|---|---|---|---|---|---|
| A8 = | −8.5959E−03 | 2.4939E−02 | 6.2681E−02 | 2.4339E−02 | 1.3059E−01 |
| A10 = | 1.0695E−02 | −2.0289E−02 | −3.0772E−02 | −1.7337E−02 | −1.1561E−01 |
| A12 = | −9.6081E−03 | 1.3594E−02 | 6.1228E−03 | 4.3210E−03 | 8.0642E−02 |
| A14 = | 4.6600E−03 | −5.6846E−03 | — | — | −3.0804E−02 |
| A16 = | −1.0013E−03 | 9.3851E−04 | — | — | 4.7272E−03 |

| | Surface # | | | | |
|---|---|---|---|---|---|
| | 7 | 8 | 9 | 10 | 11 |
| k = | −9.2599E+00 | −5.0000E+01 | −2.1703E+01 | −2.1252E+00 | 1.4374E+00 |
| A4 = | −3.1245E−02 | 1.8818E−02 | 4.3639E−02 | −3.1810E−02 | 1.0870E−02 |
| A6 = | −5.2772E−02 | −1.8724E−02 | −4.4436E−02 | −7.5424E−02 | −1.2323E−01 |
| A8 = | −5.9469E−02 | −2.9433E−02 | 1.0678E−01 | 9.6087E−02 | 1.2148E−01 |
| A10 = | 1.2496E−01 | 5.7957E−02 | −1.1956E−01 | −5.4547E−02 | −6.7432E−02 |
| A12 = | −7.5150E−02 | −3.8771E−02 | 6.6842E−02 | 1.4272E−02 | 2.1297E−02 |
| A14 = | 1.8788E−02 | 9.8899E−03 | −1.9485E−02 | −6.3726E−04 | −3.5034E−03 |
| A16 = | −1.6205E−03 | −7.7154E−04 | 2.4236E−03 | −2.9218E−04 | 2.3139E−04 |

| | Surface # | | | |
|---|---|---|---|---|
| | 12 | 13 | 14 | 15 |
| k = | −4.5332E+01 | −3.5471E+00 | 8.8483E−01 | −7.8717E+00 |
| A4 = | 7.2109E−02 | 4.0408E−02 | 3.0456E−02 | −2.5657E−02 |
| A6 = | −5.6733E−02 | −3.1065E−02 | −4.6742E−02 | 5.1107E−03 |
| A8 = | 2.0146E−02 | 7.9877E−03 | 1.7816E−02 | −1.2856E−03 |
| A10 = | −7.0233E−04 | 1.2954E−03 | −3.0627E−03 | 2.5232E−04 |
| A12 = | −2.5331E−03 | −1.0448E−03 | 2.7565E−04 | −3.3353E−05 |
| A14 = | 8.3055E−04 | 1.8893E−04 | −1.2575E−05 | 2.3505E−06 |
| A16 = | −7.9612E−05 | −1.1440E−05 | 2.2723E−07 | −6.4204E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.68 | (R10 − R11)/(R10 + R11) | −1.39 |
| Fno | 1.67 | (R13 + R14)/(R13 − R14) | 0.47 |
| HFOV [deg.] | 39.3 | \|f/f1\|min | 0.06 |
| Vmin | 18.4 | f/f1 | 0.84 |
| V5 | 23.5 | f/f3 | 0.44 |
| V2 + V4 + V5 | 65.7 | f/f7 | −2.12 |
| CT1/CT2 | 2.93 | f7/f5 | 0.03 |
| (CT2 + CT3 + CT4 + CT5)/CT6 | 1.16 | TL/f | 1.29 |
| BL/CTmax | 1.03 | TL/EPD | 2.16 |
| T34/T45 | 0.36 | TL/ImgH | 1.53 |
| T45/T56 | 1.55 | f/ImgH | 1.18 |
| T67/T56 | 1.20 | f/EPD | 1.67 |
| f/R8 | 0.56 | SD/TD | 0.90 |
| f/R10 | 1.24 | (TL/ImgH) + (f/EPD) | 3.20 |
| f/R11 | −0.20 | (Y32 + TL)/ImgH | 1.90 |
| R3/R4 | −0.01 | Yc21/CT2 | 5.56 |
| R1/R14 | 1.23 | Yc52/f | 0.27 |
| (R3 + R4)/(R3 − R4) | −0.98 | Yc71/f | 0.56 |
| (R5 + R6)/(R5 − R6) | −4.11 | Yc72/Y72 | 0.55 |

7th Embodiment

Figure 13:
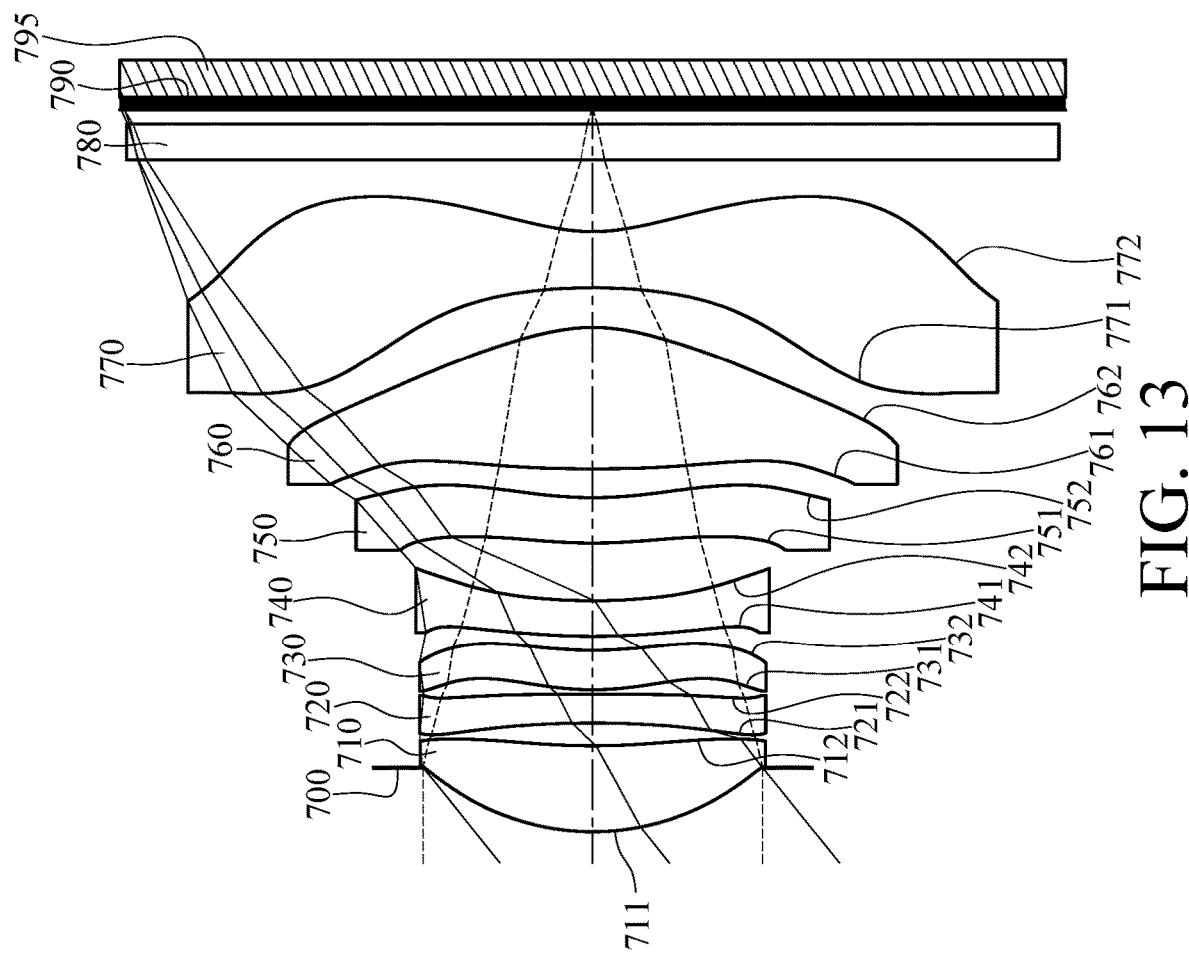
FIG. 13 is a schematic view of an image capturing unit according to the 7th embodiment of the present disclosure.
Figure 14:
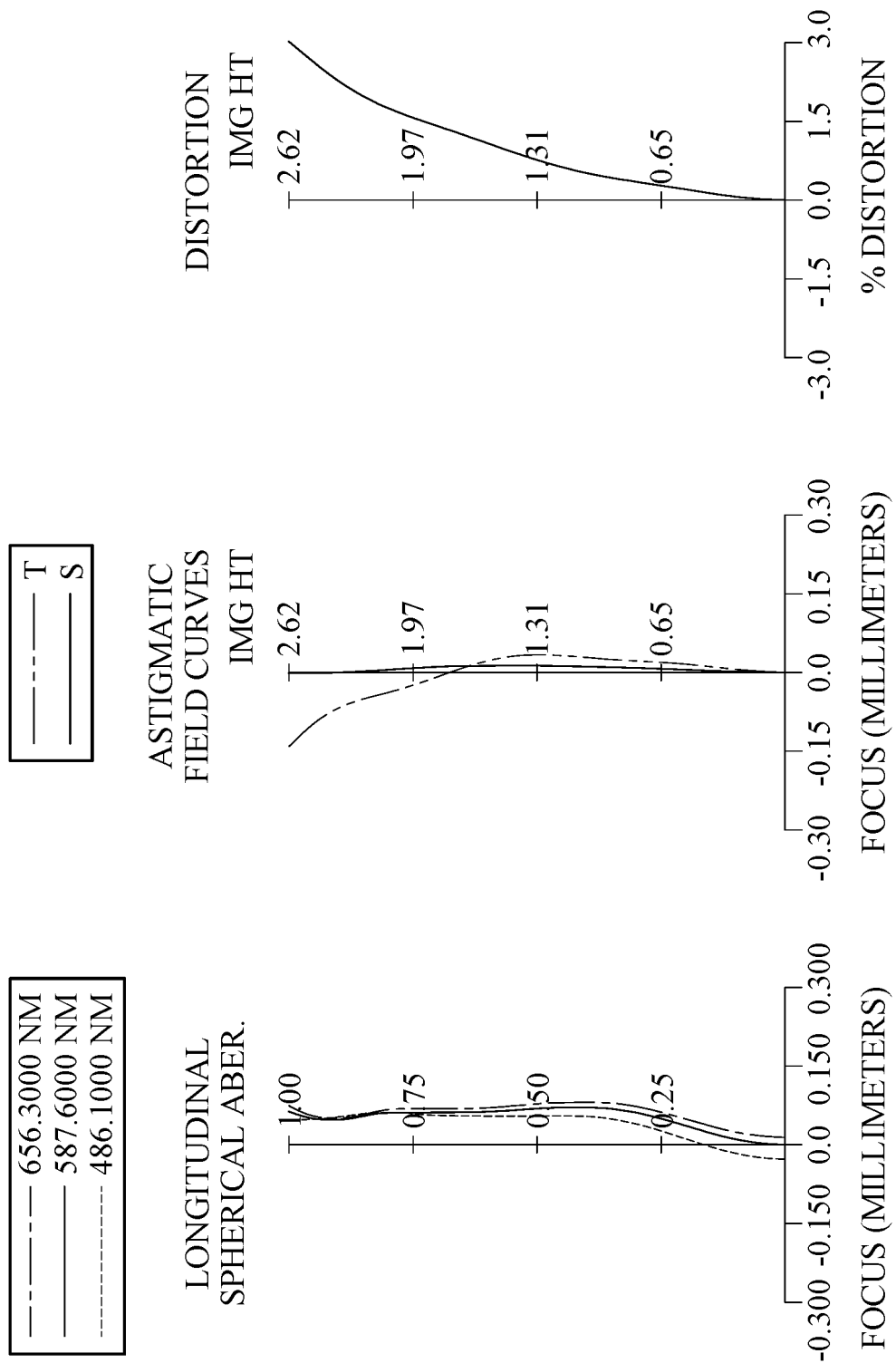
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging lens system (its reference numeral is omitted) of the present disclosure and an image sensor 795. The imaging lens system includes, in order from an object side to an image side, an aperture stop 700, a first lens element 710, a second lens element 720, a third lens element 730, a fourth lens element 740, a fifth lens element 750, a sixth lens element 760, a seventh lens element 770, a filter 780 and an image surface 790. The imaging lens system includes seven single and non-cemented lens elements (710, 720, 730, 740, 750, 760 and 770) with no additional lens element disposed between each of the adjacent seven lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being convex in a paraxial region thereof. The second lens element 720 is made of plastic material and has the object-side surface 721 and the image-side surface 722 being both aspheric. The object-side 721 of the second lens element 720 has a convex critical point in an off-axis region thereof.

The third lens element 730 with positive refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with negative refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The image-side 752 of the fifth lens element 750 has a convex critical point in an off-axis region thereof.

The sixth lens element 760 with positive refractive power has an object-side surface 761 being convex in a paraxial region thereof and an image-side surface 762 being convex in a paraxial region thereof. The sixth lens element 760 is made of plastic material and has the object-side surface 761 and the image-side surface 762 being both aspheric.

The seventh lens element 770 with negative refractive power has an object-side surface 771 being concave in a paraxial region thereof and an image-side surface 772 being concave in a paraxial region thereof. The seventh lens element 770 is made of plastic material and has the object-side surface 771 and the image-side surface 772 being both aspheric. Each of the object-side surface 771 and the image-side surface 772 of the seventh lens element 770 has a convex critical point in an off-axis region thereof. The image-side 772 of the seventh lens element 770 has at least one inflection point in an off-axis region thereof.

The filter 780 is made of glass material and located between the seventh lens element 770 and the image surface 790, and will not affect the focal length of the imaging lens system. The image sensor 795 is disposed on or near the image surface 790 of the imaging lens system.

In this embodiment, there are three lens elements (the second lens element 720, the fourth lens element 740 and the fifth lens element 750) each have an Abbe number ranging from 10.0 to 32.0.

The detailed optical data of the 7th embodiment are shown in Table 13 and the aspheric surface data are shown in Table 14 below.

TABLE 13

7th Embodiment
f = 4.75 mm, Fno = 1.67, HFOV = 38.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.539 | | | | |
| 2 | Lens 1 | 2.073 | (ASP) | 0.720 | Plastic | 1.544 | 55.9 | 5.52 |
| 3 | | 5.877 | (ASP) | 0.191 | | | | |
| 4 | Lens 2 | −7.866 | (ASP) | 0.240 | Plastic | 1.680 | 18.4 | −11.82 |
| 5 | | −372.902 | (ASP) | 0.038 | | | | |
| 6 | Lens 3 | 2.422 | (ASP) | 0.333 | Plastic | 1.544 | 55.9 | 12.99 |
| 7 | | 3.505 | (ASP) | 0.118 | | | | |
| 8 | Lens 4 | 5.866 | (ASP) | 0.300 | Plastic | 1.650 | 21.5 | −69.45 |
| 9 | | 5.087 | (ASP) | 0.482 | | | | |
| 10 | Lens 5 | 4.502 | (ASP) | 0.381 | Plastic | 1.639 | 23.5 | −31.58 |
| 11 | | 3.559 | (ASP) | 0.238 | | | | |
| 12 | Lens 6 | 18.011 | (ASP) | 1.190 | Plastic | 1.544 | 55.9 | 2.62 |
| 13 | | −1.514 | (ASP) | 0.332 | | | | |
| 14 | Lens 7 | −4.430 | (ASP) | 0.470 | Plastic | 1.534 | 55.9 | −2.09 |
| 15 | | 1.547 | (ASP) | 0.600 | | | | |
| 16 | Filter | Plano | | 0.300 | Glass | 1.517 | 64.2 | — |
| 17 | | Plano | | 0.117 | | | | |
| 18 | Image | Plano | | — | | | | |

Note:
Reference wavelength is 587.6 nm (d-line).

TABLE 14

Aspheric Coefficients

| | Surface # | | | | |
|---|---|---|---|---|---|
| | 2 | 3 | 4 | 5 | 6 |
| k = | 4.5411E−01 | 9.6634E+00 | −1.4180E+01 | −1.0000E+00 | −1.7097E+01 |
| A4 = | −1.1325E−02 | −3.5322E−02 | 1.6329E−02 | −4.4048E−03 | 4.3657E−02 |
| A6 = | 1.2660E−02 | −9.9311E−03 | −7.4414E−02 | −7.3547E−02 | −1.7472E−01 |
| A8 = | −3.0089E−02 | 8.2312E−04 | 9.1183E−02 | 1.1958E−01 | 1.4342E−01 |
| A10 = | 3.6435E−02 | 7.6181E−03 | −4.7122E−02 | −8.0417E−02 | −1.0276E−01 |
| A12 = | −2.6803E−02 | −3.1221E−03 | 9.3616E−03 | 2.3655E−02 | 5.7891E−02 |
| A14 = | 1.0649E−02 | −9.3683E−04 | — | −1.9981E−03 | −1.8800E−02 |
| A16 = | −1.8152E−03 | 4.5297E−04 | — | — | 2.6353E−03 |

TABLE 14-continued

Aspheric Coefficients

| Surface # | | | | |
|---|---|---|---|---|
| 7 | 8 | 9 | 10 | 11 |
| k = −8.4023E+00 | −4.8146E+01 | −2.6395E+01 | −3.7367E+00 | 1.1875E+00 |
| A4 = −6.2539E−02 | −1.8236E−02 | 1.8417E−02 | −5.3905E−02 | −2.4839E−02 |
| A6 = 3.5853E−02 | 4.2106E−02 | 1.8647E−03 | −2.4911E−02 | −7.8176E−02 |
| A8 = −1.6386E−01 | −5.0953E−02 | 5.9536E−02 | 4.0593E−02 | 8.0186E−02 |
| A10 = 1.9672E−01 | 4.3890E−02 | −8.8239E−02 | −1.6250E−02 | −4.1508E−02 |
| A12 = −1.0696E−01 | −2.4959E−02 | 5.4620E−02 | −2.2959E−03 | 1.1543E−02 |
| A14 = 2.7651E−02 | 6.9008E−03 | −1.7074E−02 | 3.1199E−03 | −1.6099E−03 |
| A16 = −2.7837E−03 | −9.3143E−04 | 2.2348E−03 | −5.9714E−04 | 8.7295E−05 |

| Surface # | | | |
|---|---|---|---|
| 12 | 13 | 14 | 15 |
| k = −5.0000E+01 | −5.4958E+00 | 7.3191E−01 | −8.9183E+00 |
| A4 = 5.8368E−02 | 1.9929E−02 | 4.4612E−03 | −2.9543E−02 |
| A6 = −6.6423E−02 | −1.7221E−02 | −2.5931E−02 | 7.7656E−03 |
| A8 = 3.6037E−02 | 5.8638E−03 | 1.0194E−02 | −2.1265E−03 |
| A10 = −1.1289E−02 | −8.5213E−04 | −1.5740E−03 | 4.0920E−04 |
| A12 = 1.6624E−03 | 1.6039E−05 | 1.1584E−04 | −4.9955E−05 |
| A14 = −5.7543E−05 | 8.8741E−06 | −3.7096E−06 | 3.2449E−06 |
| A16 = −5.5443E−06 | −7.3057E−07 | 3.0114E−08 | −8.3017E−08 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.75 | (R10 − R11)/(R10 + R11) | −0.67 |
| Fno | 1.67 | (R13 + R14)/(R13 − R14) | 0.48 |
| HFOV [deg.] | 38.8 | |f/fi|min | 0.07 |
| Vmin | 18.4 | f/f1 | 0.86 |
| V5 | 23.5 | f/f3 | 0.37 |
| V2 + V4 + V5 | 63.4 | f/f7 | −2.27 |
| CT1/CT2 | 3.00 | f7/f5 | 0.07 |
| (CT2 + CT3 + CT4 + CT5)/CT6 | 1.05 | TL/f | 1.27 |
| BL/CTmax | 0.85 | TL/EPD | 2.13 |
| T34/T45 | 0.24 | TL/ImgH | 1.53 |
| T45/T56 | 2.02 | f/ImgH | 1.20 |
| T67/T56 | 1.40 | f/EPD | 1.67 |
| f/R8 | 0.93 | SD/TD | 0.89 |
| f/R10 | 1.33 | (TL/ImgH) + (f/EPD) | 3.20 |
| f/R11 | 0.26 | (Y32 + TL)/ImgH | 1.90 |
| R3/R4 | 0.02 | Yc21/CT2 | 5.60 |
| R1/R14 | 1.34 | Yc52/f | 0.26 |
| (R3 + R4)/(R3 − R4) | −1.04 | Yc71/f | 0.60 |
| (R5 + R6)/(R5 − R6) | −5.47 | Yc72/Y72 | 0.53 |

8th Embodiment

Figure 15:
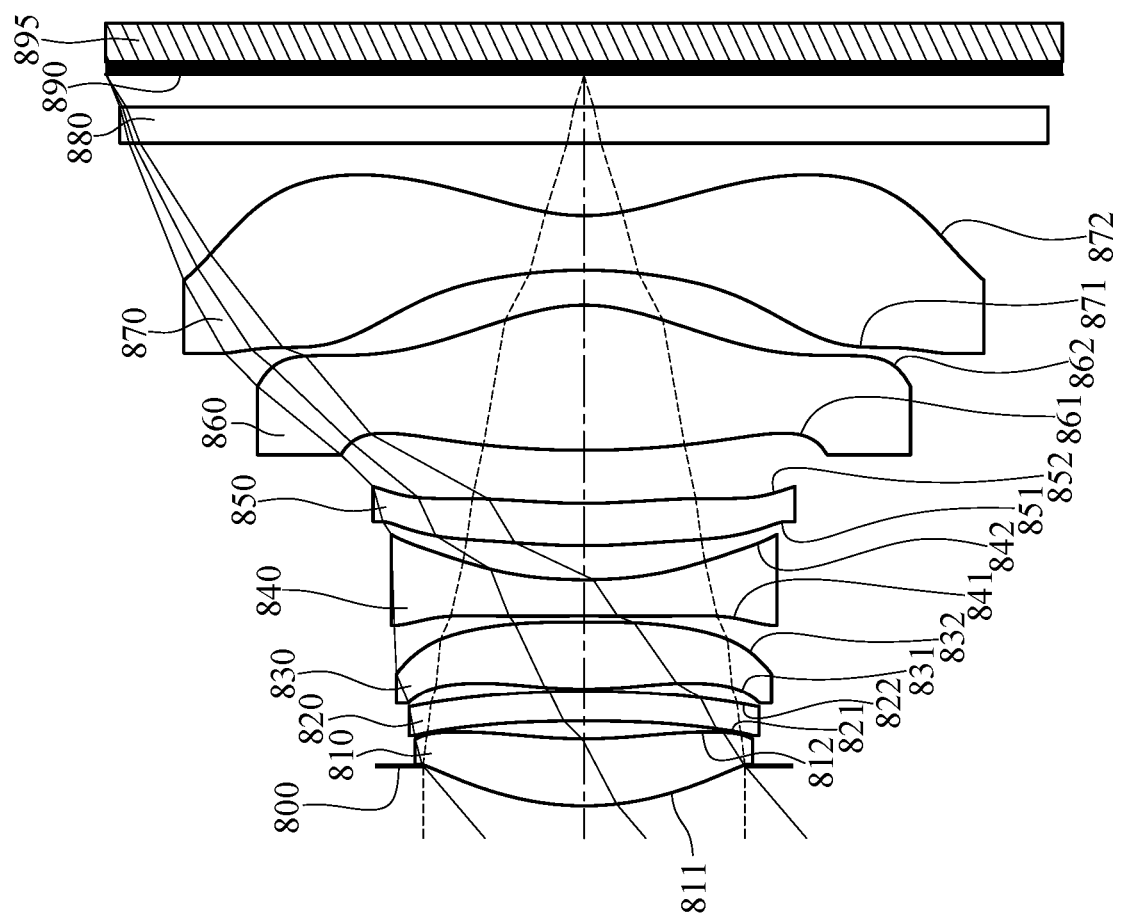
FIG. 15 is a schematic view of an image capturing unit according to the 8th embodiment of the present disclosure.
Figure 16:
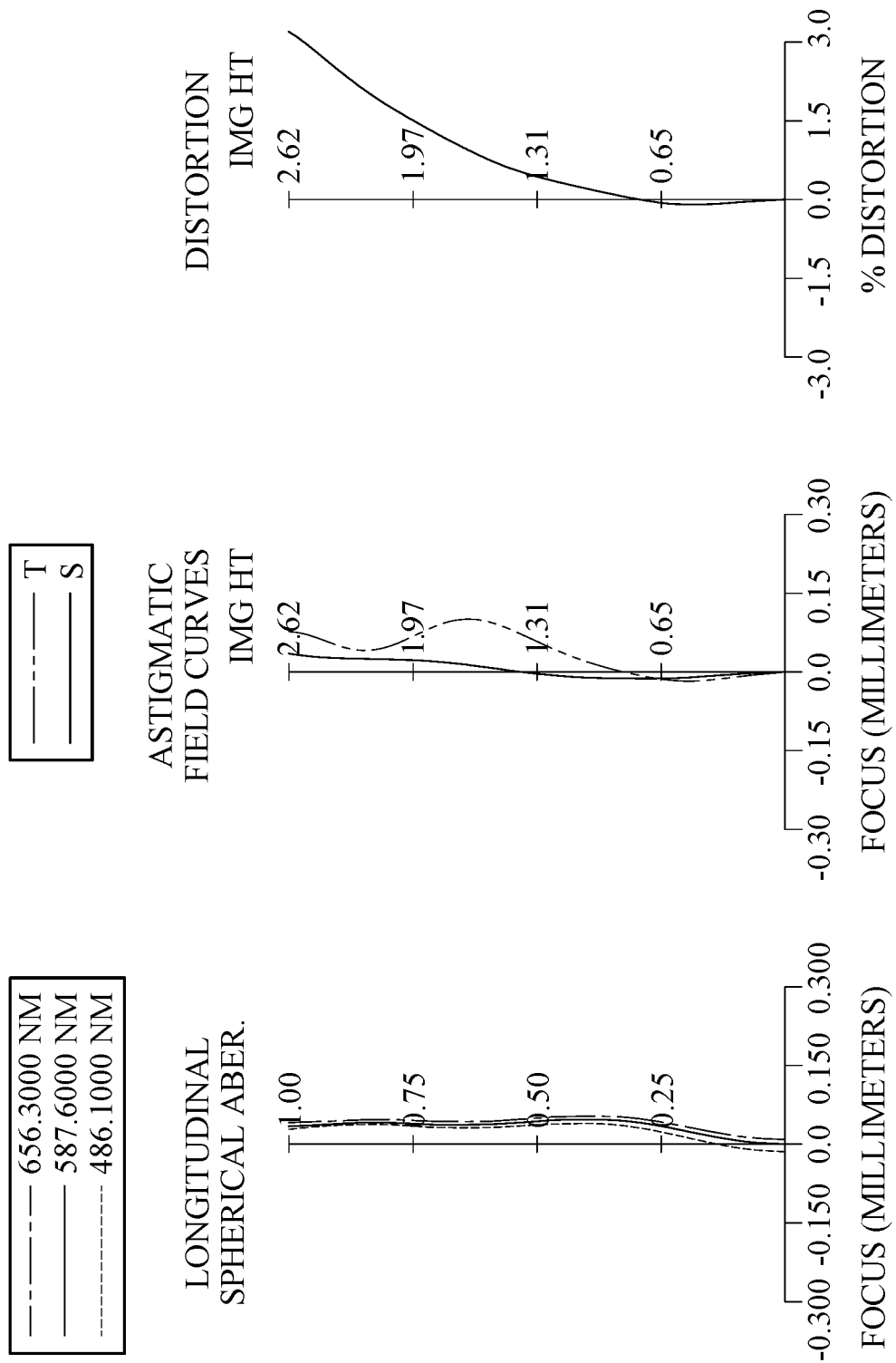
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging lens system (its reference numeral is omitted) of the present disclosure and an image sensor 895. The imaging lens system includes, in order from an object side to an image side, an aperture stop 800, a first lens element 810, a second lens element 820, a third lens element 830, a fourth lens element 840, a fifth lens element 850, a sixth lens element 860, a seventh lens element 870, a filter 880 and an image surface 890. The imaging lens system includes seven lens elements (810, 820, 830, 840, 850, 860 and 870) with no additional lens element disposed between each of the adjacent seven lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being concave in a paraxial region thereof and an image-side surface 822 being convex in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being concave in a paraxial region thereof and an image-side surface 842 being concave in a paraxial region thereof. The fourth lens element 840 is made of plastic material and has the object-side surface 841 and the image-side surface 842 being both aspheric.

The fifth lens element 850 with positive refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The image-side 852 of the fifth lens element 850 has a convex critical point and a concave critical point in an off-axis region thereof.

The sixth lens element 860 with positive refractive power has an object-side surface 861 being convex in a paraxial region thereof and an image-side surface 862 being convex in a paraxial region thereof. The sixth lens element 860 is made of plastic material and has the object-side surface 861 and the image-side surface 862 being both aspheric.

The seventh lens element 870 with negative refractive power has an object-side surface 871 being concave in a paraxial region thereof and an image-side surface 872 being concave in a paraxial region thereof. The seventh lens element 870 is made of plastic material and has the object-side surface 871 and the image-side surface 872 being both aspheric. The image-side surface 872 of the seventh lens element 870 has a convex critical point in an off-axis region thereof. The image-side 872 of the seventh lens element 870 has at least one inflection point in an off-axis region thereof.

The filter 880 is made of glass material and located between the seventh lens element 870 and the image surface 890, and will not affect the focal length of the imaging lens system. The image sensor 895 is disposed on or near the image surface 890 of the imaging lens system.

In this embodiment, there are three lens elements (the second lens element 820, the fourth lens element 840 and the fifth lens element 850) each have an Abbe number ranging from 10.0 to 32.0.

The detailed optical data of the 8th embodiment are shown in Table 15 and the aspheric surface data are shown in Table 16 below.

TABLE 15

8th Embodiment
f = 4.44 mm, Fno = 1.67, HFOV = 40.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.331 | | | | |
| 2 | Lens 1 | 2.365 | (ASP) | 0.555 | Plastic | 1.544 | 55.9 | 9.15 |
| 3 | | 4.132 | (ASP) | 0.149 | | | | |
| 4 | Lens 2 | −13.972 | (ASP) | 0.245 | Plastic | 1.650 | 21.5 | 56.78 |
| 5 | | −10.207 | (ASP) | 0.020 | | | | |
| 6 | Lens 3 | 3.791 | (ASP) | 0.556 | Plastic | 1.544 | 55.9 | 6.14 |
| 7 | | −26.772 | (ASP) | 0.050 | | | | |
| 8 | Lens 4 | −106.221 | (ASP) | 0.300 | Plastic | 1.650 | 21.5 | −6.00 |
| 9 | | 4.059 | (ASP) | 0.282 | | | | |
| 10 | Lens 5 | 5.165 | (ASP) | 0.350 | Plastic | 1.639 | 23.5 | 443.66 |
| 11 | | 5.122 | (ASP) | 0.438 | | | | |
| 12 | Lens 6 | 7.656 | (ASP) | 1.200 | Plastic | 1.544 | 55.9 | 2.29 |
| 13 | | −1.406 | (ASP) | 0.290 | | | | |
| 14 | Lens 7 | −3.636 | (ASP) | 0.450 | Plastic | 1.544 | 55.9 | −1.92 |
| 15 | | 1.532 | (ASP) | 0.600 | | | | |
| 16 | Filter | Plano | | 0.300 | Glass | 1.517 | 64.2 | — |
| 17 | | Plano | | 0.267 | | | | |
| 18 | Image | Plano | | — | | | | |

Note:
Reference wavelength is 587.6 nm (d-line).

TABLE 16

Aspheric Coefficients

| | Surface # | | | | |
|---|---|---|---|---|---|
| | 2 | 3 | 4 | 5 | 6 |
| k = | 1.6141E−01 | 5.8480E−02 | 1.9477E+01 | 2.0000E+01 | −3.0003E+01 |
| A4 = | −1.7641E−02 | −7.6299E−02 | −2.1971E−02 | −6.0478E−03 | −1.4400E−02 |
| A6 = | 1.0944E−03 | 5.2233E−03 | 1.7945E−04 | 1.2778E−03 | −1.0421E−01 |
| A8 = | −6.7837E−03 | 4.9781E−03 | 9.4123E−03 | 7.0496E−04 | 1.1510E−01 |
| A10 = | 6.4382E−03 | 2.3533E−03 | −3.6133E−03 | −2.6266E−04 | −7.7166E−02 |
| A12 = | −2.4068E−03 | −2.3831E−03 | — | — | 4.1654E−02 |
| A14 = | −8.6683E−07 | −1.6407E−05 | — | — | −1.6160E−02 |
| A16 = | −3.2431E−06 | −1.0857E−05 | — | — | 2.6355E−03 |

| | Surface # | | | | |
|---|---|---|---|---|---|
| | 7 | 8 | 9 | 10 | 11 |
| k = | −8.8733E+00 | −5.0000E+01 | 2.2111E+00 | 6.6873E+00 | 4.9263E+00 |
| A4 = | −1.1903E−01 | −1.0964E−02 | 4.2613E−02 | −1.0364E−01 | −9.4835E−02 |
| A6 = | 6.9031E−02 | 5.5972E−02 | −6.4623E−03 | 1.0931E−01 | 3.9827E−02 |
| A8 = | 1.5879E−02 | −3.3604E−02 | −2.6807E−02 | −1.1589E−01 | −3.0208E−03 |
| A10 = | −5.7571E−02 | −1.7803E−02 | 1.5837E−02 | 9.1632E−02 | −1.7035E−02 |
| A12 = | 3.4978E−02 | 1.6615E−02 | −3.0447E−03 | −4.1401E−02 | 1.4675E−02 |

TABLE 16-continued

| Aspheric Coefficients | | | | |
|---|---|---|---|---|
| A14 = | −9.8851E−03 | −3.5288E−03 | −1.1805E−05 | 9.7191E−03 | −4.5306E−03 |
| A16 = | 1.1373E−03 | 1.8177E−04 | 6.1978E−05 | −9.4578E−04 | 4.7776E−04 |

| Surface # | | | | |
|---|---|---|---|---|
| | 12 | 13 | 14 | 15 |
| k = | 8.2493E+00 | −4.3211E+00 | −1.3032E+00 | −7.3430E+00 |
| A4 = | −9.9054E−03 | 5.1800E−02 | 4.5562E−02 | −2.4644E−02 |
| A6 = | 1.6058E−02 | −3.0749E−02 | −4.9161E−02 | 5.7955E−03 |
| A8 = | −1.5870E−02 | 1.5811E−02 | 1.6154E−02 | −2.1502E−03 |
| A10 = | 8.7742E−03 | −4.6013E−03 | −2.1013E−03 | 5.3922E−04 |
| A12 = | −3.1684E−03 | 7.2986E−04 | 8.6797E−05 | −7.6488E−05 |
| A14 = | 6.2848E−04 | −5.9472E−05 | 3.3464E−06 | 5.3771E−06 |
| A16 = | −5.2774E−05 | 1.9066E−06 | −2.6495E−07 | −1.4471E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.44 | (R10 − R11)/(R10 + R11) | −0.20 |
| Fno | 1.67 | (R13 + R14)/(R13 − R14) | 0.41 |
| HFOV [deg.] | 40.4 | |f/f|min | 0.01 |
| Vmin | 21.5 | f/f1 | 0.49 |
| V5 | 23.5 | f/f3 | 0.72 |
| V2 + V4 + V5 | 66.5 | f/f7 | −2.31 |
| CT1/CT2 | 2.26 | f7/f5 | 0.00 |
| (CT2 + CT3 + CT4 + CT5)/CT6 | 1.21 | TL/f | 1.36 |
| BL/CTmax | 0.97 | TL/EPD | 2.28 |
| T34/T45 | 0.18 | TL/ImgH | 1.53 |
| T45/T56 | 0.64 | f/ImgH | 1.12 |
| T67/T56 | 0.66 | f/EPD | 1.67 |
| f/R8 | 1.09 | SD/TD | 0.93 |
| f/R10 | 0.87 | (TL/ImgH) + (f/EPD) | 3.20 |
| f/R11 | 0.58 | (Y32 + TL)/ImgH | 1.92 |
| R3/R4 | 1.37 | Yc21/CT2 | — |
| R1/R14 | 1.54 | Yc52/f | 0.24/0.26 |
| (R3 + R4)/(R3 − R4) | 6.42 | Yc71/f | — |
| (R5 + R6)/(R5 − R6) | −0.75 | Yc72/Y72 | 0.56 |

9th Embodiment

Figure 17:
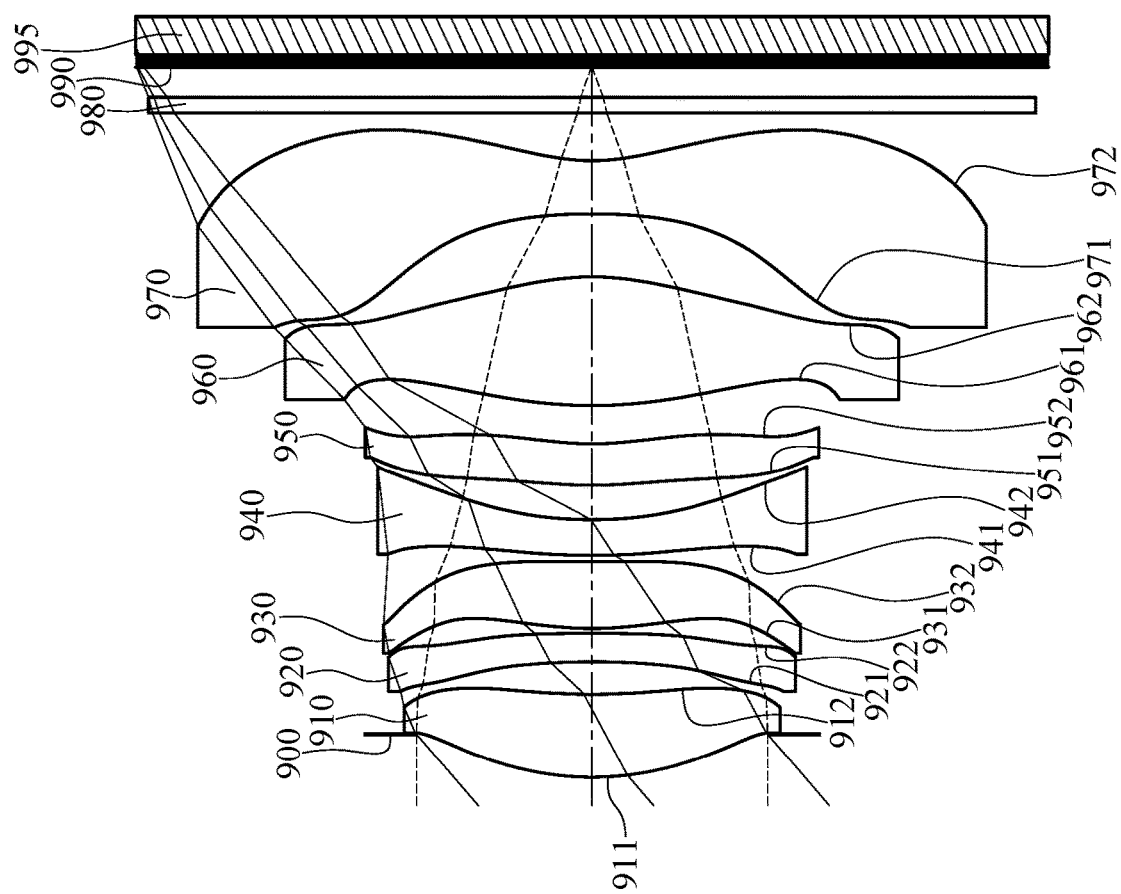
FIG. 17 is a schematic view of an image capturing unit according to the 9th embodiment of the present disclosure.
Figure 18:
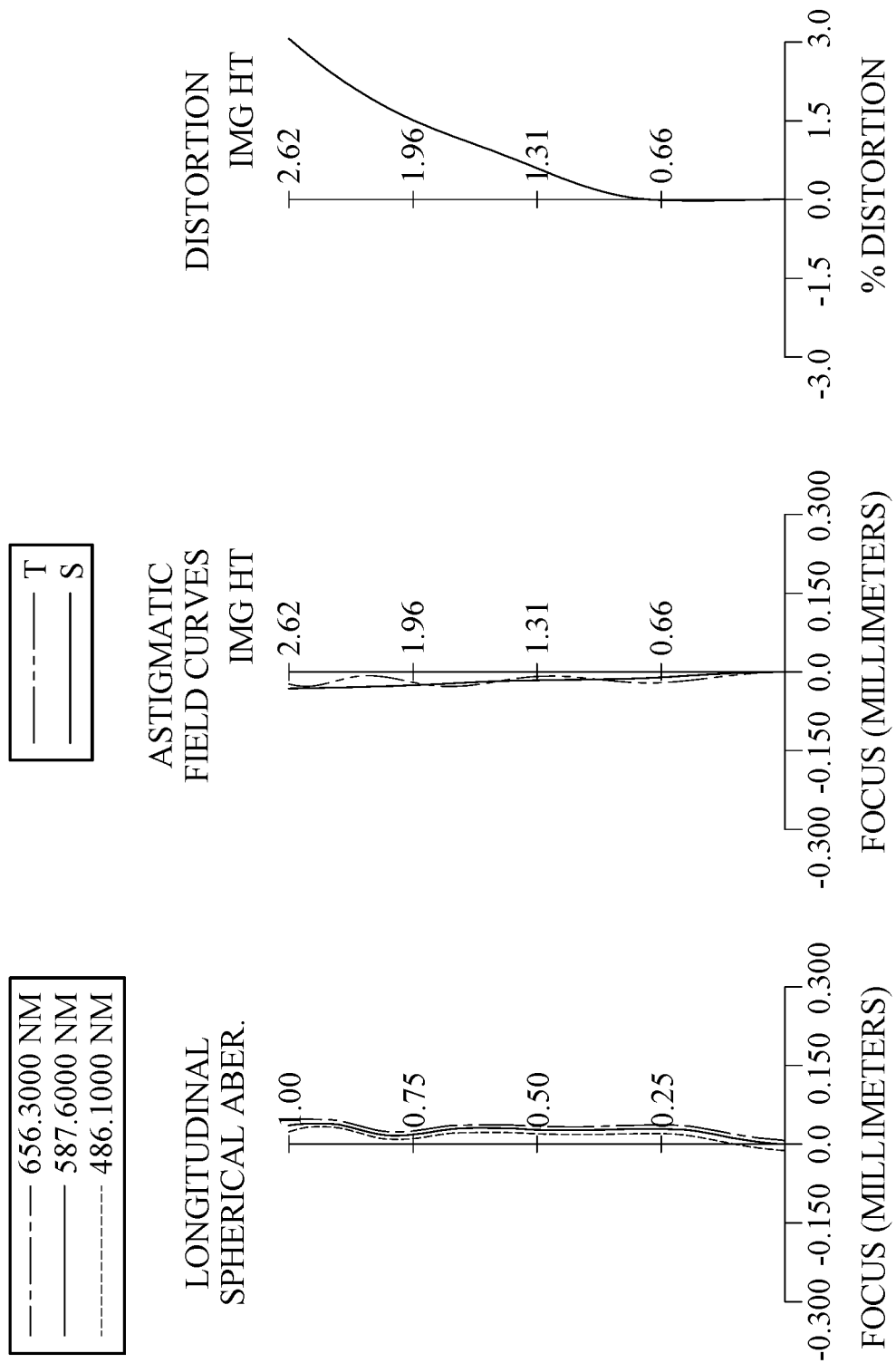
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging lens system (its reference numeral is omitted) of the present disclosure and an image sensor 995. The imaging lens system includes, in order from an object side to an image side, an aperture stop 900, a first lens element 910, a second lens element 920, a third lens element 930, a fourth lens element 940, a fifth lens element 950, a sixth lens element 960, a seventh lens element 970, a filter 980 and an image surface 990. The imaging lens system includes seven lens elements (910, 920, 930, 940, 950, 960 and 970) with no additional lens element disposed between each of the adjacent seven lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with negative refractive power has an object-side surface 921 being concave in a paraxial region thereof and an image-side surface 922 being convex in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with negative refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The image-side 952 of the fifth lens element 950 has a convex critical point and a concave critical point in an off-axis region thereof.

The sixth lens element 960 with positive refractive power has an object-side surface 961 being convex in a paraxial region thereof and an image-side surface 962 being convex in a paraxial region thereof. The sixth lens element 960 is made of plastic material and has the object-side surface 961 and the image-side surface 962 being both aspheric.

The seventh lens element 970 with negative refractive power has an object-side surface 971 being concave in a paraxial region thereof and an image-side surface 972 being concave in a paraxial region thereof. The seventh lens element 970 is made of plastic material and has the object-side surface 971 and the image-side surface 972 being both aspheric. The image-side surface 972 of the seventh lens element 970 has a convex critical point in an off-axis region thereof. The image-side 972 of the seventh lens element 970 has at least one inflection point in an off-axis region thereof.

The filter 980 is made of glass material and located between the seventh lens element 970 and the image surface 990, and will not affect the focal length of the imaging lens system. The image sensor 995 is disposed on or near the image surface 990 of the imaging lens system.

In this embodiment, there are three lens elements (the second lens element 920, the fourth lens element 940 and the fifth lens element 950) each have an Abbe number ranging from 10.0 to 32.0.

The detailed optical data of the 9th embodiment are shown in Table 17 and the aspheric surface data are shown in Table 18 below.

TABLE 17

9th Embodiment
f = 4.29 mm, Fno = 1.46, HFOV = 40.7 deg.

| Surface # |           | Curvature Radius | Thickness | Material | Index | Abbe # | Focal Length |
|-----------|-----------|------------------|-----------|----------|-------|--------|--------------|
| 0         | Object    | Plano            | Infinity  |          |       |        |              |
| 1         | Ape. Stop | Plano            | −0.362    |          |       |        |              |
| 2         | Lens 1    | 2.470 (ASP)      | 0.698     | Plastic  | 1.544 | 55.9   | 7.72         |
| 3         |           | 5.398 (ASP)      | 0.271     |          |       |        |              |
| 4         | Lens 2    | −6.247 (ASP)     | 0.240     | Plastic  | 1.660 | 20.4   | −14.94       |
| 5         |           | −17.310 (ASP)    | 0.040     |          |       |        |              |
| 6         | Lens 3    | 3.122 (ASP)      | 0.559     | Plastic  | 1.544 | 55.9   | 6.04         |
| 7         |           | 59.109 (ASP)     | 0.050     |          |       |        |              |
| 8         | Lens 4    | 6.810 (ASP)      | 0.300     | Plastic  | 1.650 | 21.5   | −14.14       |
| 9         |           | 3.845 (ASP)      | 0.288     |          |       |        |              |
| 10        | Lens 5    | 3.636 (ASP)      | 0.350     | Plastic  | 1.639 | 23.5   | −15.25       |
| 11        |           | 2.548 (ASP)      | 0.322     |          |       |        |              |
| 12        | Lens 6    | 3.882 (ASP)      | 1.075     | Plastic  | 1.544 | 55.9   | 2.74         |
| 13        |           | −2.179 (ASP)     | 0.526     |          |       |        |              |
| 14        | Lens 7    | −5.211 (ASP)     | 0.450     | Plastic  | 1.544 | 55.9   | −2.30        |
| 15        |           | 1.694 (ASP)      | 0.400     |          |       |        |              |
| 16        | Filter    | Plano            | 0.130     | Glass    | 1.517 | 64.2   | —            |
| 17        |           | Plano            | 0.255     |          |       |        |              |
| 18        | Image     | Plano            | —         |          |       |        |              |

Note:
Reference wavelength is 587.6 nm (d-line).

TABLE 18

Aspheric Coefficients

| Surface # | | | | |
|---|---|---|---|---|
| 2 | 3 | 4 | 5 | 6 |
| k = 4.7658E−01 | 4.4939E+00 | 1.0254E+01 | −6.3362E+00 | −2.8332E+01 |
| A4 = −1.4842E−02 | −2.2300E−02 | 2.4091E−02 | −1.4601E−02 | 4.0369E−02 |
| A6 = 1.3943E−02 | −4.0378E−02 | −8.2773E−02 | −5.1195E−02 | −1.3987E−01 |
| A8 = −3.6181E−02 | 4.2262E−02 | 5.8122E−02 | 4.4588E−02 | 1.6059E−01 |
| A10 = 3.9178E−02 | −4.5255E−02 | −1.1278E−02 | −9.2810E−03 | −1.4109E−01 |
| A12 = −2.3860E−02 | 2.9079E−02 | — | — | 6.9827E−02 |
| A14 = 7.3443E−03 | −9.1000E−03 | — | — | −1.7072E−02 |
| A16 = −9.6199E−04 | 1.0525E−03 | — | — | 1.6241E−03 |

| Surface # | | | | |
|---|---|---|---|---|
| 7 | 8 | 9 | 10 | 11 |
| k = −5.0000E+01 | 1.9394E−01 | 8.3333E−01 | −3.5538E+01 | −2.5011E+01 |
| A4 = −3.1543E−02 | 6.2806E−02 | 7.1087E−02 | −8.8227E−02 | −5.1346E−02 |
| A6 = −9.9530E−02 | −2.0751E−01 | −1.1034E−01 | 9.9316E−02 | −1.3363E−02 |
| A8 = 1.6173E−01 | 2.5284E−01 | 9.5005E−02 | −8.1049E−02 | 3.7505E−02 |
| A10 = −1.4333E−01 | −1.7455E−01 | −5.1090E−02 | 4.5549E−02 | −2.8428E−02 |
| A12 = 6.8294E−02 | 6.8554E−02 | 1.6101E−02 | −1.4685E−02 | 1.1270E−02 |
| A14 = −1.6471E−02 | −1.4282E−02 | −2.7311E−03 | 2.4799E−03 | −2.1747E−03 |
| A16 = 1.5835E−03 | 1.2201E−03 | 1.9452E−04 | −1.7255E−04 | 1.6062E−04 |

| Surface # | | | |
|---|---|---|---|
| 12 | 13 | 14 | 15 |
| k = −2.7304E+01 | −3.8490E+00 | 1.6730E+00 | −8.2555E+00 |
| A4 = 3.5136E−02 | 6.8037E−02 | −6.2014E−02 | −4.5278E−02 |

TABLE 18-continued

| Aspheric Coefficients | | | | |
|---|---|---|---|---|
| A6 = | −2.1916E−02 | −3.2403E−02 | 3.1594E−02 | 1.8181E−02 |
| A8 = | −5.7314E−04 | 7.5927E−03 | −2.3344E−02 | −5.6984E−03 |
| A10 = | 6.1825E−03 | −1.1015E−03 | 9.0053E−03 | 1.0403E−03 |
| A12 = | −3.1136E−03 | 1.8390E−04 | −1.5958E−03 | −1.0557E−04 |
| A14 = | 6.5180E−04 | −2.5565E−05 | 1.3157E−04 | 5.5397E−06 |
| A16 = | −5.1953E−05 | 1.3623E−06 | −4.1271E−06 | −1.1835E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 4.29 | (R10 − R11)/(R10 + R11) | −0.21 |
| Fno | 1.46 | (R13 + R14)/(R13 − R14) | 0.51 |
| HFOV [deg.] | 40.7 | |f/fi|min | 0.28 |
| Vmin | 20.4 | f/f1 | 0.56 |
| V5 | 23.5 | f/f3 | 0.71 |
| V2 + V4 + V5 | 65.4 | f/f7 | −1.87 |
| CT1/CT2 | 2.91 | f7/f5 | 0.15 |
| (CT2 + CT3 + CT4 + CT5)/CT6 | 1.35 | TL/f | 1.39 |
| BL/CTmax | 0.73 | TL/EPD | 2.03 |
| T34/T45 | 0.17 | TL/ImgH | 1.57 |
| T45/T56 | 0.89 | f/ImgH | 1.13 |
| T67/T56 | 1.63 | f/EPD | 1.46 |
| f/R8 | 1.11 | SD/TD | 0.93 |
| f/R10 | 1.68 | (TL/ImgH) + (f/EPD) | 3.03 |
| f/R11 | 1.10 | (Y32 + TL)/ImgH | 2.03 |
| R3/R4 | 0.36 | Yc21/CT2 | — |
| R1/R14 | 1.46 | Yc52/f | 0.25/0.36 |
| (R3 + R4)/(R3 − R4) | −2.13 | Yc71/f | — |
| (R5 + R6)/(R5 − R6) | −1.11 | Yc72/Y72 | 0.52 |

10th Embodiment

Figure 19:
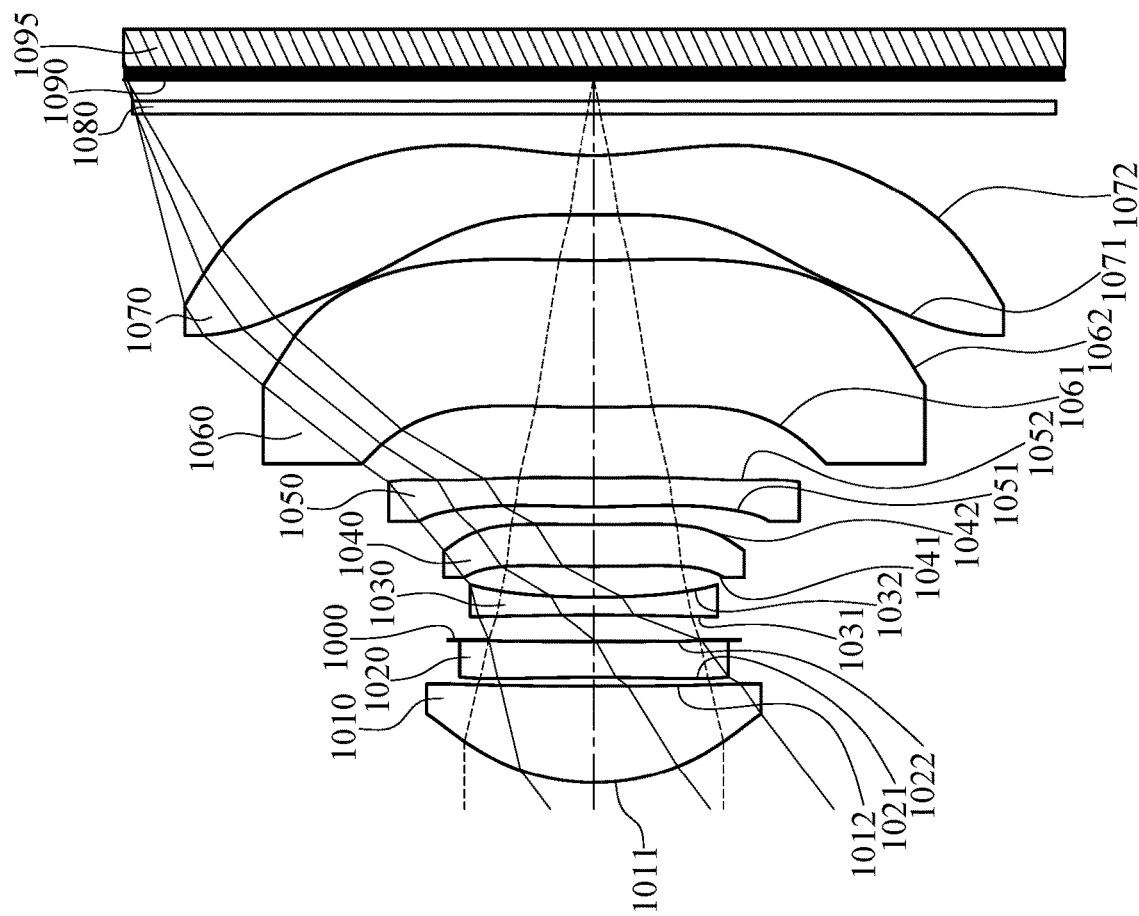
FIG. 19 is a schematic view of an image capturing unit according to the 10th embodiment of the present disclosure.
Figure 20:
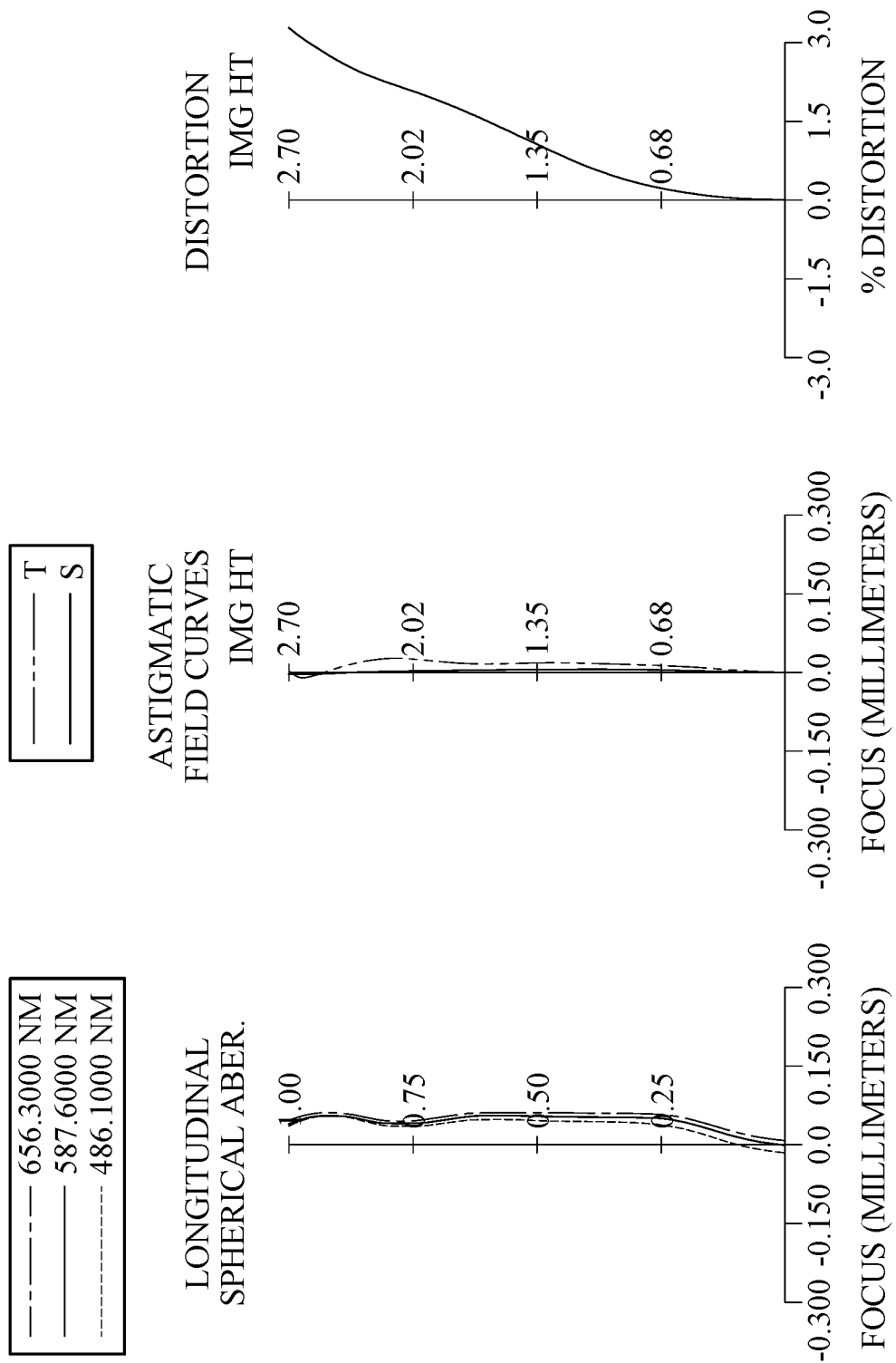
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the imaging lens system (its reference numeral is omitted) of the present disclosure and an image sensor 1095. The imaging lens system includes, in order from an object side to an image side, a first lens element 1010, a second lens element 1020, an aperture stop 1000, a third lens element 1030, a fourth lens element 1040, a fifth lens element 1050, a sixth lens element 1060, a seventh lens element 1070, a filter 1080 and an image surface 1090. The imaging lens system includes seven lens elements (1010, 1020, 1030, 1040, 1050, 1060 and 1070) with no additional lens element disposed between each of the adjacent seven lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with negative refractive power has an object-side surface 1021 being concave in a paraxial region thereof and an image-side surface 1022 being concave in a paraxial region thereof. The second lens element 1020 is made of plastic material and has the object-side surface 1021 and the image-side surface 1022 being both aspheric. The object-side 1021 of the second lens element 1020 has a convex critical point in an off-axis region thereof.

The third lens element 1030 with negative refractive power has an object-side surface 1031 being concave in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with negative refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric.

The fifth lens element 1050 with positive refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric. The image-side surface 1052 of the fifth lens element 1050 has two convex critical points and a concave critical point in an off-axis region thereof.

The sixth lens element 1060 with positive refractive power has an object-side surface 1061 being convex in a paraxial region thereof and an image-side surface 1062 being concave in a paraxial region thereof. The sixth lens element 1060 is made of plastic material and has the object-side surface 1061 and the image-side surface 1062 being both aspheric.

The seventh lens element 1070 with negative refractive power has an object-side surface 1071 being convex in a paraxial region thereof and an image-side surface 1072 being concave in a paraxial region thereof. The seventh lens element 1070 is made of plastic material and has the object-side surface 1071 and the image-side surface 1072 being both aspheric. The image-side surface 1072 of the seventh lens element 1070 has a convex critical point in an off-axis region thereof. The image-side 1072 of the seventh lens element 1070 has at least one inflection point in an off-axis region thereof.

The filter 1080 is made of glass material and located between the seventh lens element 1070 and the image surface 1090, and will not affect the focal length of the imaging lens system. The image sensor 1095 is disposed on or near the image surface 1090 of the imaging lens system.

In this embodiment, there are four lens elements (the second lens element 1020, the third lens element 1030, the fourth lens element 1040 and the fifth lens element 1050) each have an Abbe number ranging from 10.0 to 32.0.

The detailed optical data of the 10th embodiment are shown in Table 19 and the aspheric surface data are shown in Table 20 below.

TABLE 19

10th Embodiment
f = 5.17 mm, Fno = 2.40, HFOV = 37.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.866 (ASP) | 0.815 | Plastic | 1.545 | 56.1 | 3.52 |
| 2 | | 59.306 (ASP) | 0.074 | | | | |
| 3 | Lens 2 | −17.193 (ASP) | 0.300 | Plastic | 1.660 | 20.4 | −24.74 |
| 4 | | 326.607 (ASP) | 0.015 | | | | |
| 5 | Ape. Stop | Plano | 0.207 | | | | |
| 6 | Lens 3 | −22.245 (ASP) | 0.150 | Plastic | 1.660 | 20.4 | −8.34 |
| 7 | | 7.336 (ASP) | 0.258 | | | | |
| 8 | Lens 4 | 12.746 (ASP) | 0.350 | Plastic | 1.614 | 26.0 | −149.22 |
| 9 | | 11.072 (ASP) | 0.150 | | | | |
| 10 | Lens 5 | 6.407 (ASP) | 0.248 | Plastic | 1.614 | 26.0 | 18.73 |
| 11 | | 14.254 (ASP) | 0.591 | | | | |
| 12 | Lens 6 | 9.264 (ASP) | 1.236 | Plastic | 1.544 | 56.0 | 51.81 |
| 13 | | 13.151 (ASP) | 0.382 | | | | |
| 14 | Lens 7 | 32.316 (ASP) | 0.501 | Plastic | 1.534 | 55.9 | −5.89 |
| 15 | | 2.849 (ASP) | 0.350 | | | | |
| 16 | Filter | Plano | 0.110 | Glass | 1.517 | 64.2 | — |
| 17 | | Plano | 0.177 | | | | |
| 18 | Image | Plano | — | | | | |

Note:
Reference wavelength is 587.6 nm (d-line).

TABLE 20

Aspheric Coefficients

| Surface # | 1 | 2 | 3 | 4 | 6 |
|---|---|---|---|---|---|
| k = | −4.7394E−01 | 9.0000E+01 | 7.7578E+01 | −9.0000E+01 | −5.5749E+01 |
| A4 = | 8.2870E−03 | 5.9570E−03 | 1.5241E−02 | 2.2362E−03 | −1.0182E−02 |
| A6 = | 2.9265E−03 | −4.0396E−03 | 9.9047E−03 | 1.1253E−02 | 4.1973E−02 |
| A8 = | 3.8547E−05 | 1.9225E−03 | −1.8480E−02 | 7.2672E−04 | −3.9344E−02 |
| A10 = | −2.3813E−03 | −4.6077E−04 | 3.2793E−02 | −6.7630E−04 | 1.2568E−02 |
| A12 = | 2.2708E−03 | 2.9828E−06 | −2.3295E−02 | — | — |
| A14 = | −9.7065E−04 | — | 6.9121E−03 | — | — |

| Surface # | 7 | 8 | 9 | 10 | 11 |
|---|---|---|---|---|---|
| k = | −7.1713E+01 | 5.9345E+01 | 1.3668E+01 | −2.7724E+01 | −2.3751E+00 |
| A4 = | 2.8723E−02 | −7.7660E−02 | −1.3256E−01 | −1.5243E−01 | −1.1819E−01 |
| A6 = | 3.4845E−02 | 6.0336E−02 | 1.1629E−01 | 1.4934E−01 | 9.4006E−02 |
| A8 = | −4.7935E−02 | −1.8870E−01 | −1.8371E−01 | −9.6662E−02 | −3.3007E−02 |
| A10 = | 3.7229E−02 | 2.3843E−01 | 1.3824E−01 | 2.5527E−02 | 8.3388E−03 |
| A12 = | −2.2406E−02 | −1.8335E−01 | −6.5182E−02 | 3.0350E−03 | −2.7457E−03 |
| A14 = | 8.7868E−03 | 5.6788E−02 | 1.5413E−02 | −2.0653E−03 | 6.7593E−04 |
| A16 = | — | — | — | — | −6.8913E−05 |

| Surface # | 12 | 13 | 14 | 15 |
|---|---|---|---|---|
| k = | −3.1259E+01 | −6.1736E+01 | 9.0000E+01 | −1.3696E+01 |
| A4 = | −5.8466E−02 | −4.5933E−02 | −1.6226E−01 | −7.4736E−02 |
| A6 = | 2.2325E−02 | 2.2362E−02 | 7.3333E−02 | 3.3276E−02 |
| A8 = | −2.0923E−02 | −1.1562E−02 | −2.3175E−02 | −1.2834E−02 |
| A10 = | 1.3543E−02 | 4.1002E−03 | 5.9489E−03 | 3.5979E−03 |

TABLE 20-continued

| Aspheric Coefficients | | | | |
|---|---|---|---|---|
| A12 = | −5.7407E−03 | −9.7575E−04 | −1.1183E−03 | −6.7635E−04 |
| A14 = | 1.5013E−03 | 1.5808E−04 | 1.3813E−04 | 8.2022E−05 |
| A16 = | −2.2967E−04 | −1.7106E−05 | −1.0416E−05 | −6.1211E−06 |
| A18 = | 1.8786E−05 | 1.0949E−06 | 4.3350E−07 | 2.5428E−07 |
| A20 = | −6.3377E−07 | −3.0296E−08 | −7.6354E−09 | −4.4815E−09 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 5.17 | (R10 − R11)/(R10 + R11) | 0.21 |
| Fno | 2.40 | (R13 + R14)/(R13 − R14) | 1.19 |
| HFOV [deg.] | 37.1 | \|f/fi\|min | 0.03 |
| Vmin | 20.4 | f/f1 | 1.47 |
| V5 | 26.0 | f/f3 | −0.62 |
| V2 + V4 + V5 | 72.4 | f/f7 | −0.88 |
| CT1/CT2 | 2.72 | f7/f5 | −0.31 |
| (CT2 + CT3 + CT4 + CT5)/CT6 | 0.85 | TL/f | 1.14 |
| BL/CTmax | 0.52 | TL/EPD | 2.75 |
| T34/T45 | 1.72 | TL/ImgH | 1.50 |
| T45/T56 | 0.25 | f/ImgH | 1.31 |
| T67/T56 | 0.65 | f/EPD | 2.40 |
| f/R8 | 0.47 | SD/TD | 0.77 |
| f/R10 | 0.36 | (TL/ImgH) + (f/EPD) | 3.90 |
| f/R11 | 0.56 | (Y32 + TL)/ImgH | 1.76 |
| R3/R4 | −0.05 | Yc21/CT2 | 2.78 |
| R1/R14 | 0.66 | Yc52/f | 0.08/0.24/0.29 |
| (R3 + R4)/(R3 − R4) | −0.90 | Yc71/f | — |
| (R5 + R6)/(R5 − R6) | 0.50 | Yc72/Y72 | 0.33 |

11th Embodiment

Figure 21:
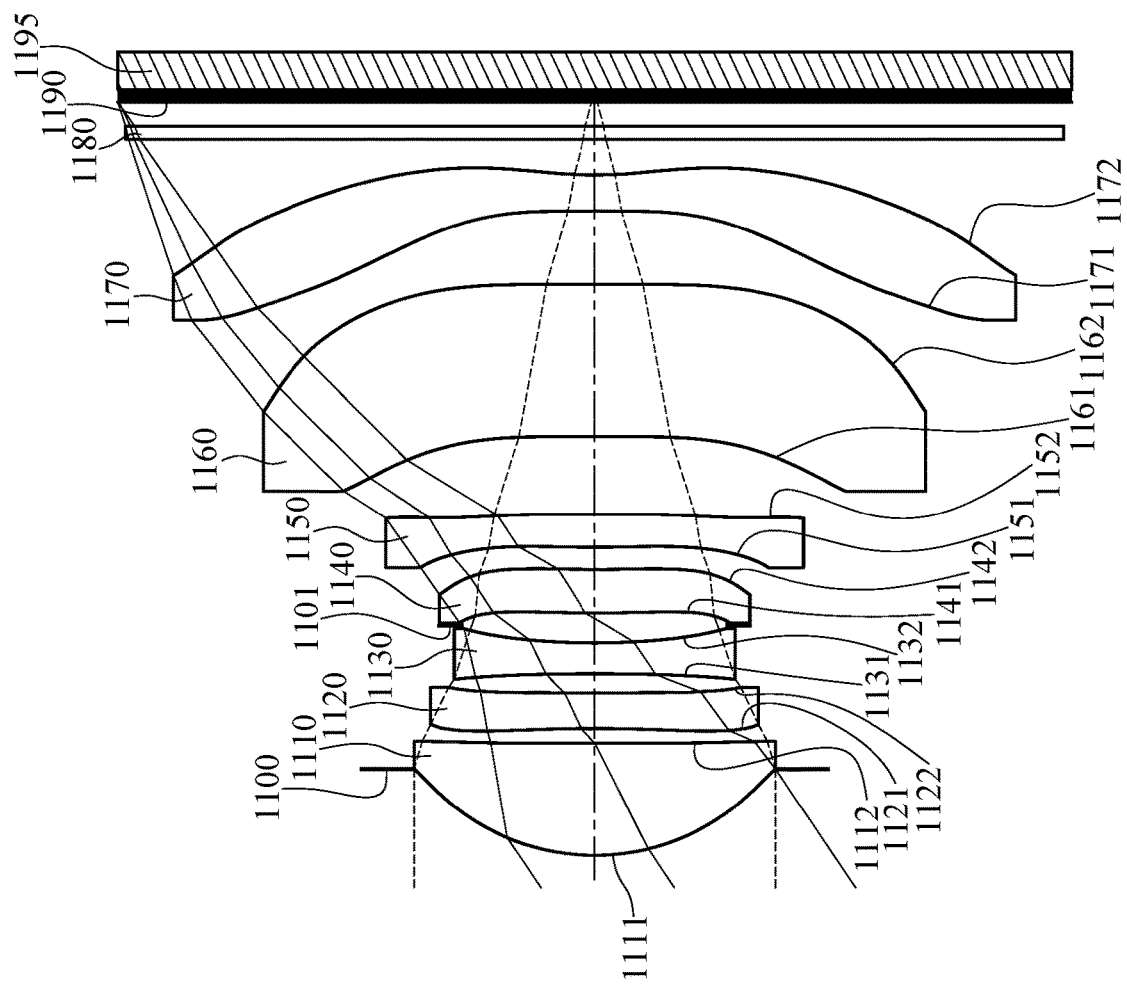
FIG. 21 is a schematic view of an image capturing unit according to the 11th embodiment of the present disclosure.
Figure 22:
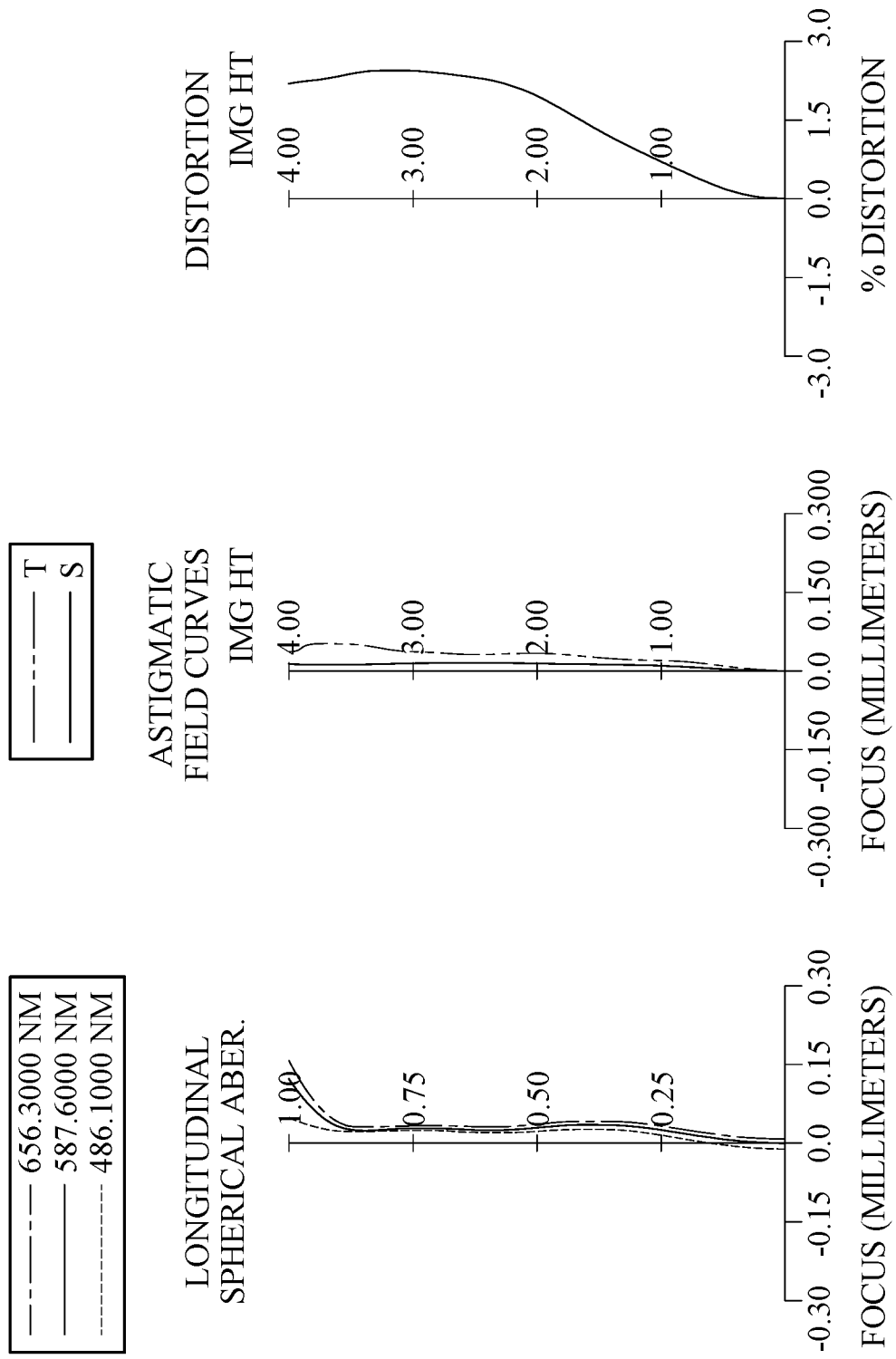
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the imaging lens system (its reference numeral is omitted) of the present disclosure and an image sensor 1195. The imaging lens system includes, in order from an object side to an image side, an aperture stop 1100, a first lens element 1110, a second lens element 1120, a third lens element 1130, a stop 1101, a fourth lens element 1140, a fifth lens element 1150, a sixth lens element 1160, a seventh lens element 1170, a filter 1180 and an image surface 1190. The imaging lens system includes seven lens elements (1110, 1120, 1130, 1140, 1150, 1160 and 1170) with no additional lens element disposed between each of the adjacent seven lens elements.

The first lens element 1110 with positive refractive power has an object-side surface 1111 being convex in a paraxial region thereof and an image-side surface 1112 being concave in a paraxial region thereof. The first lens element 1110 is made of plastic material and has the object-side surface 1111 and the image-side surface 1112 being both aspheric.

The second lens element 1120 with negative refractive power has an object-side surface 1121 being concave in a paraxial region thereof and an image-side surface 1122 being concave in a paraxial region thereof. The second lens element 1120 is made of plastic material and has the object-side surface 1121 and the image-side surface 1122 being both aspheric. The object-side 1121 of the second lens element 1120 has a convex critical point in an off-axis region thereof.

The third lens element 1130 with negative refractive power has an object-side surface 1131 being concave in a paraxial region thereof and an image-side surface 1132 being concave in a paraxial region thereof. The third lens element 1130 is made of plastic material and has the object-side surface 1131 and the image-side surface 1132 being both aspheric.

The fourth lens element 1140 with positive refractive power has an object-side surface 1141 being convex in a paraxial region thereof and an image-side surface 1142 being concave in a paraxial region thereof. The fourth lens element 1140 is made of plastic material and has the object-side surface 1141 and the image-side surface 1142 being both aspheric.

The fifth lens element 1150 with positive refractive power has an object-side surface 1151 being convex in a paraxial region thereof and an image-side surface 1152 being concave in a paraxial region thereof. The fifth lens element 1150 is made of plastic material and has the object-side surface 1151 and the image-side surface 1152 being both aspheric. The image-side 1152 of the fifth lens element 1150 has two convex critical points and a concave critical point in an off-axis region thereof.

The sixth lens element 1160 with negative refractive power has an object-side surface 1161 being convex in a paraxial region thereof and an image-side surface 1162 being concave in a paraxial region thereof. The sixth lens element 1160 is made of plastic material and has the object-side surface 1161 and the image-side surface 1162 being both aspheric.

The seventh lens element 1170 with negative refractive power has an object-side surface 1171 being convex in a paraxial region thereof and an image-side surface 1172 being concave in a paraxial region thereof. The seventh lens element 1170 is made of plastic material and has the object-side surface 1171 and the image-side surface 1172 being both aspheric. Each of the object-side surface 1171 and the image-side surface 1172 of the seventh lens element 1170 has a convex critical point in an off-axis region thereof. The image-side 1172 of the seventh lens element 1170 has at least one inflection point in an off-axis region thereof.

The filter 1180 is made of glass material and located between the seventh lens element 1170 and the image surface 1190, and will not affect the focal length of the imaging lens system. The image sensor 1195 is disposed on or near the image surface 1190 of the imaging lens system.

In this embodiment, there are four lens elements (the second lens element 1120, the third lens element 1130, the fourth lens element 1140 and the fifth lens element 1150) each have an Abbe number ranging from 10.0 to 32.0.

The detailed optical data of the 11th embodiment are shown in Table 21 and the aspheric surface data are shown in Table 22 below.

TABLE 21

11th Embodiment
f = 5.80 mm, Fno = 1.91, HFOV = 33.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.728 | | | | |
| 2 | Lens 1 | 1.889 (ASP) | 0.945 | Plastic | 1.545 | 56.1 | 3.50 |
| 3 | | 162.353 (ASP) | 0.126 | | | | |
| 4 | Lens 2 | −12.721 (ASP) | 0.300 | Plastic | 1.650 | 21.5 | −16.98 |
| 5 | | 84.597 (ASP) | 0.160 | | | | |
| 6 | Lens 3 | −24.956 (ASP) | 0.260 | Plastic | 1.634 | 23.8 | −8.08 |
| 7 | | 6.470 (ASP) | 0.146 | | | | |
| 8 | Stop | Plano | 0.104 | | | | |
| 9 | Lens 4 | 9.485 (ASP) | 0.367 | Plastic | 1.614 | 26.0 | 707.75 |
| 10 | | 9.555 (ASP) | 0.186 | | | | |
| 11 | Lens 5 | 9.678 (ASP) | 0.277 | Plastic | 1.614 | 26.0 | 21.26 |
| 12 | | 37.085 (ASP) | 0.657 | | | | |
| 13 | Lens 6 | 126.966 (ASP) | 1.280 | Plastic | 1.566 | 37.4 | −295.07 |
| 14 | | 71.870 (ASP) | 0.619 | | | | |
| 15 | Lens 7 | 35.697 (ASP) | 0.305 | Plastic | 1.534 | 55.9 | −6.64 |
| 16 | | 3.213 (ASP) | 0.300 | | | | |
| 17 | Filter | Plano | 0.110 | Glass | 1.517 | 64.2 | — |
| 18 | | Plano | 0.203 | | | | |
| 19 | Image | Plano | — | | | | |

Note:
Reference wavelength is 587.6 nm (d-line).
An effective radius of the stop 1101 (Surface 8) is 1.120 mm.

TABLE 22

Aspheric Coefficients

| | Surface # | | | | |
|---|---|---|---|---|---|
| | 2 | 3 | 4 | 5 | 6 |
| k = | −3.2631E−01 | 8.1291E+01 | 6.3443E+01 | 6.4475E+01 | 9.0000E+01 |
| A4 = | 5.7853E−03 | −1.5725E−03 | 2.8327E−03 | −1.0876E−02 | −1.9154E−02 |
| A6 = | −2.2777E−04 | 9.2872E−03 | 3.9149E−02 | 3.3327E−02 | 2.0865E−02 |
| A8 = | 7.4122E−03 | −5.6263E−03 | −3.6829E−02 | −1.7502E−02 | −1.5251E−02 |
| A10 = | −8.6940E−03 | 1.3218E−03 | 2.5610E−02 | 4.7812E−03 | 4.0325E−03 |
| A12 = | 4.6917E−03 | −1.6604E−04 | −1.0192E−02 | — | — |
| A14 = | −9.8916E−04 | — | 2.0236E−03 | — | — |

| | Surface # | | | | |
|---|---|---|---|---|---|
| | 7 | 9 | 10 | 11 | 12 |
| k = | −6.9939E+01 | 4.9175E+01 | 3.1348E+01 | −9.0000E+01 | −3.6425E−14 |
| A4 = | 3.7760E−02 | −8.2156E−02 | −1.2091E−01 | −9.4177E−02 | −5.7983E−02 |
| A6 = | −6.4812E−03 | 4.7407E−02 | 6.2355E−02 | 2.6760E−02 | 1.0237E−02 |
| A8 = | −6.7069E−03 | −1.0124E−01 | −8.3052E−02 | 2.0413E−02 | 3.4518E−02 |
| A10 = | 2.2660E−02 | 8.8388E−02 | 5.6095E−02 | −3.0516E−02 | −2.5947E−02 |
| A12 = | −2.2834E−02 | −5.1805E−02 | −2.5648E−02 | 1.4324E−02 | 7.9600E−03 |
| A14 = | 8.6777E−03 | 1.1353E−02 | 5.8000E−03 | −2.5160E−03 | −1.1705E−03 |
| A16 = | — | — | — | — | 6.7450E−05 |

| | Surface # | | | |
|---|---|---|---|---|
| | 13 | 14 | 15 | 16 |
| k = | 4.8609E+01 | −2.0650E+01 | 9.0000E+01 | −2.1074E+01 |
| A4 = | −4.3669E−02 | −1.9943E−02 | −1.3329E−01 | −7.6201E−02 |
| A6 = | 6.9923E−03 | −4.8507E−03 | 6.3054E−02 | 2.8517E−02 |
| A8 = | −8.1727E−03 | 4.6158E−03 | −2.0704E−02 | −6.8439E−03 |
| A10 = | 7.9093E−03 | −2.2299E−03 | 4.8797E−03 | 1.0811E−03 |
| A12 = | −3.8542E−03 | 6.8427E−04 | −7.6995E−04 | −1.1490E−04 |
| A14 = | 1.0577E−03 | −1.2935E−04 | 7.7623E−05 | 8.5075E−06 |

TABLE 22-continued

| Aspheric Coefficients | | | |
|---|---|---|---|
| A16 = | −1.6406E−04 | 1.4432E−05 | −4.7733E−06 | −4.4998E−07 |
| A18 = | 1.3322E−05 | −8.8042E−07 | 1.6303E−07 | 1.5780E−08 |
| A20 = | −4.3870E−07 | 2.2972E−08 | −2.3731E−09 | −2.6633E−10 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 5.80 | (R10 − R11)/(R10 + R11) | −0.55 |
| Fno | 1.91 | (R13 + R14)/(R13 − R14) | 1.20 |
| HFOV [deg.] | 33.9 | |f/f1|min | 0.01 |
| Vmin | 21.5 | f/f1 | 1.66 |
| V5 | 26.0 | f/f3 | −0.72 |
| V2 + V4 + V5 | 73.5 | f/f7 | −0.87 |
| CT1/CT2 | 3.15 | f7/f5 | −0.31 |
| (CT2 + CT3 + CT4 + CT5)/CT6 | 0.94 | TL/f | 1.09 |
| BL/CTmax | 0.48 | TL/EPD | 2.09 |
| T34/T45 | 1.34 | TL/ImgH | 1.59 |
| T45/T56 | 0.28 | f/ImgH | 1.45 |
| T67/T56 | 0.94 | f/EPD | 1.91 |
| f/R8 | 0.61 | SD/TD | 0.87 |
| f/R10 | 0.16 | (TL/ImgH) + (f/EPD) | 3.50 |
| f/R11 | 0.05 | (Y32 + TL)/ImgH | 1.86 |
| R3/R4 | −0.15 | Yc21/CT2 | 3.18 |
| R1/R14 | 0.59 | Yc52/f | 0.06/0.22/0.27 |
| (R3 + R4)/(R3 − R4) | −0.74 | Yc71/f | 0.57 |
| (R5 + R6)/(R5 − R6) | 0.59 | Yc72/Y72 | 0.29 |

12th Embodiment

Figure 23:
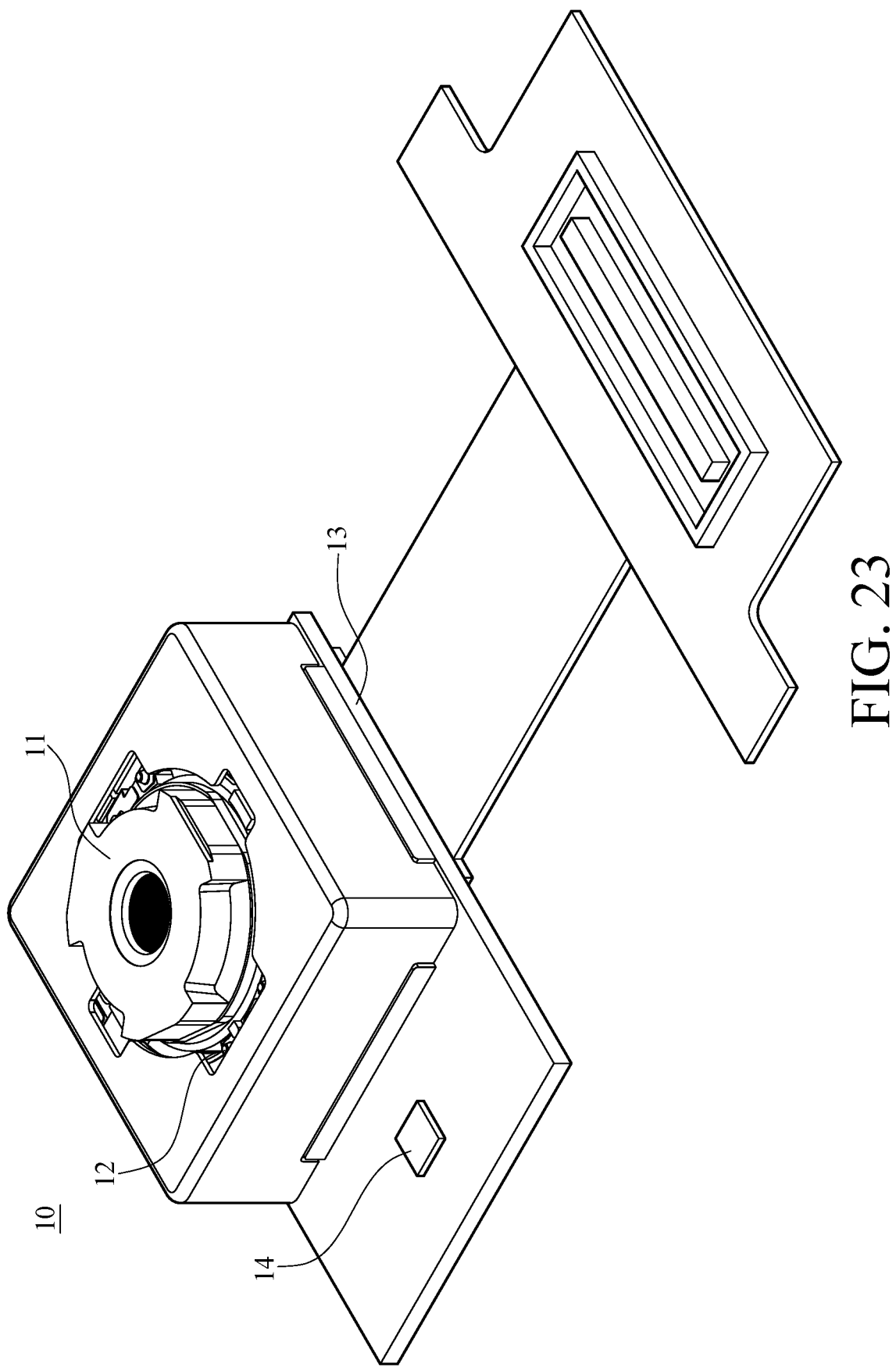
FIG. 23 is a perspective view of an image capturing unit according to the 12th embodiment of the present disclosure.

FIG. 23 is a perspective view of an image capturing unit according to the 12th embodiment of the present disclosure. In this embodiment, an image capturing unit 10 is a camera module including a lens unit 11, a driving device 12, an image sensor 13 and an image stabilizer 14. The lens unit 11 includes the imaging lens system disclosed in the 1st embodiment, a barrel and a holder member (their reference numerals are omitted) for holding the imaging lens system. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging lens system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

13th Embodiment

Figure 24:
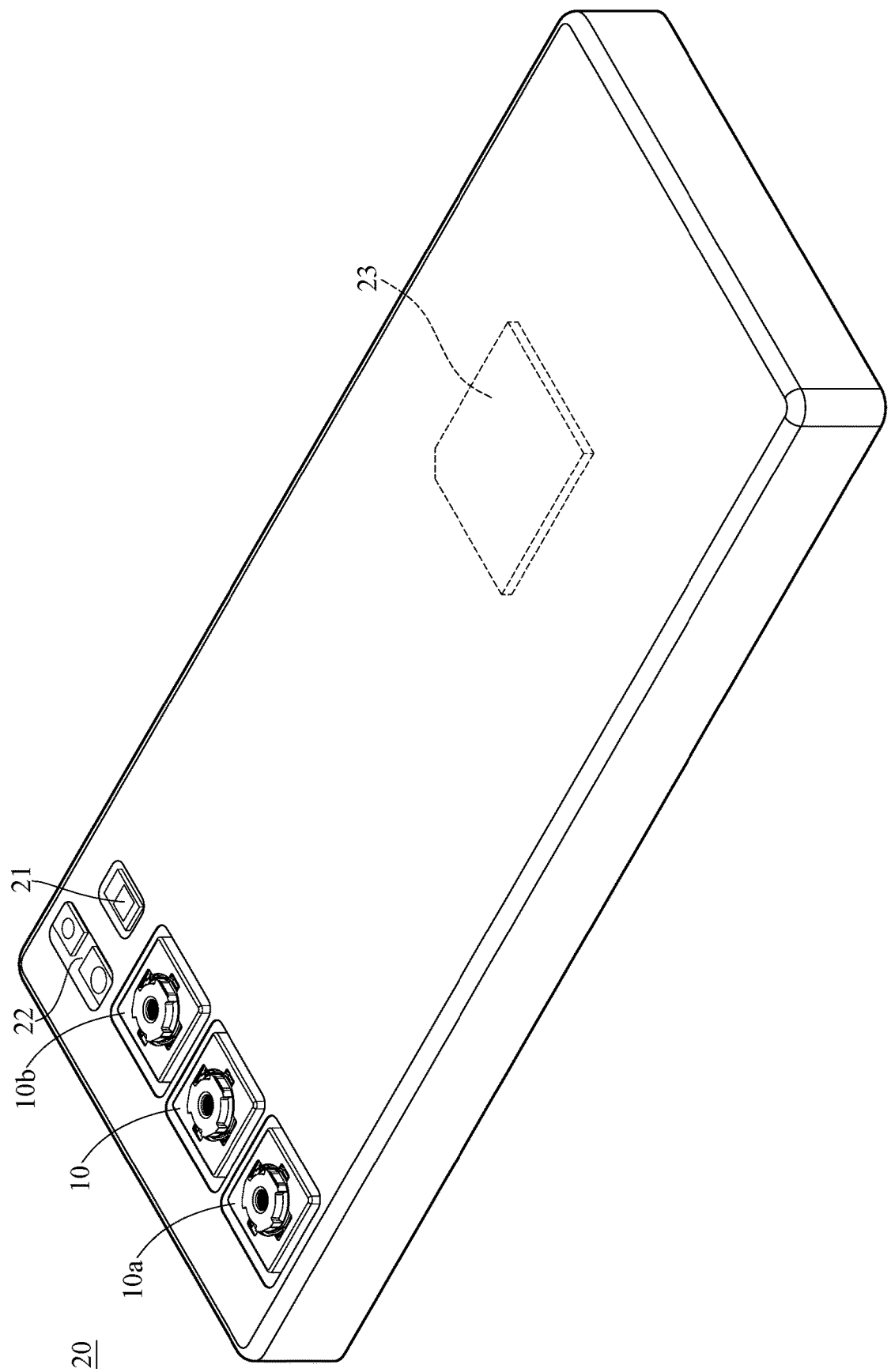
FIG. 24 is one perspective view of an electronic device according to the 13th embodiment of the present disclosure.
Figure 25:
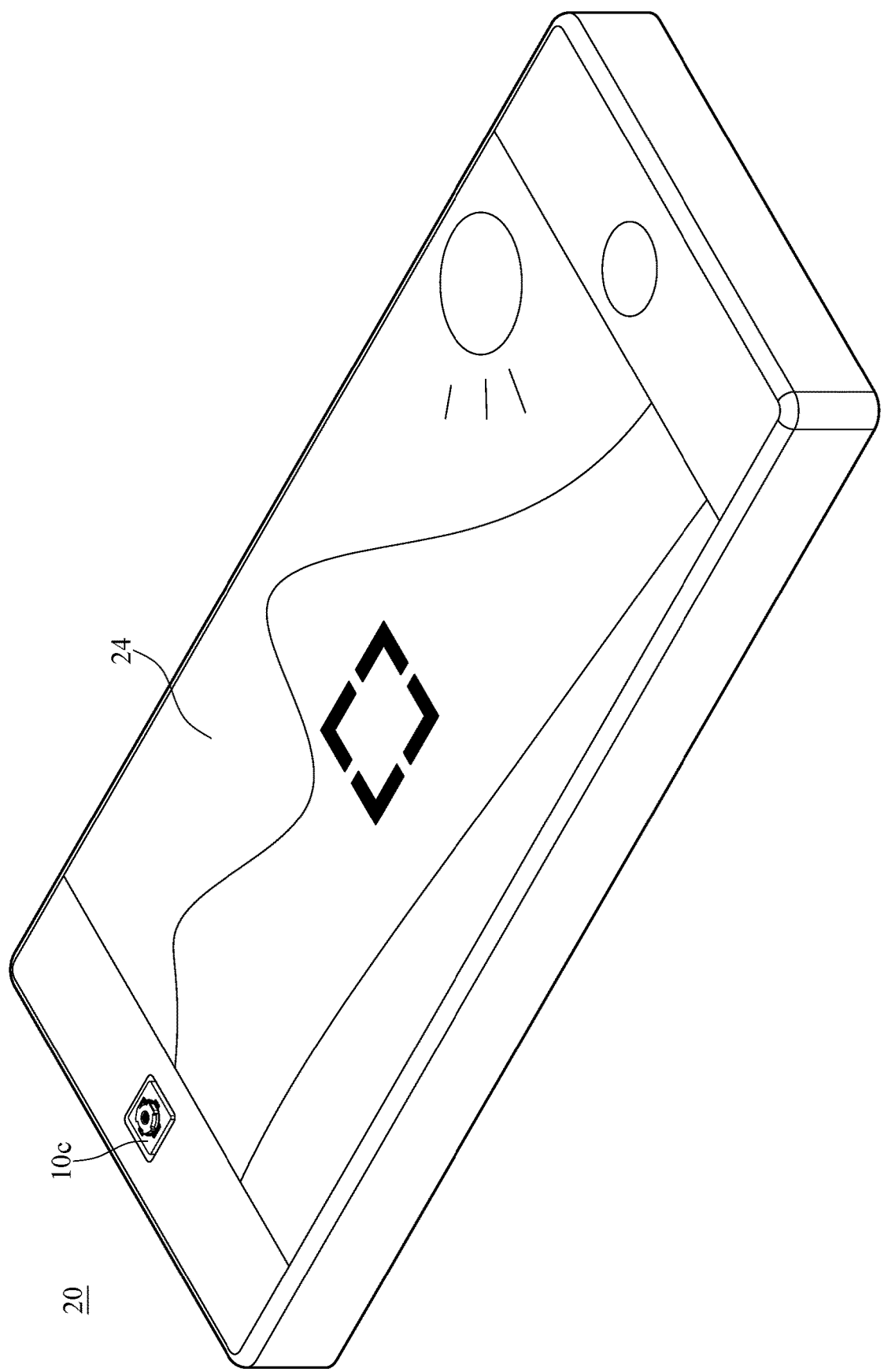
FIG. 25 is another perspective view of the electronic device in FIG. 24.
Figure 26:
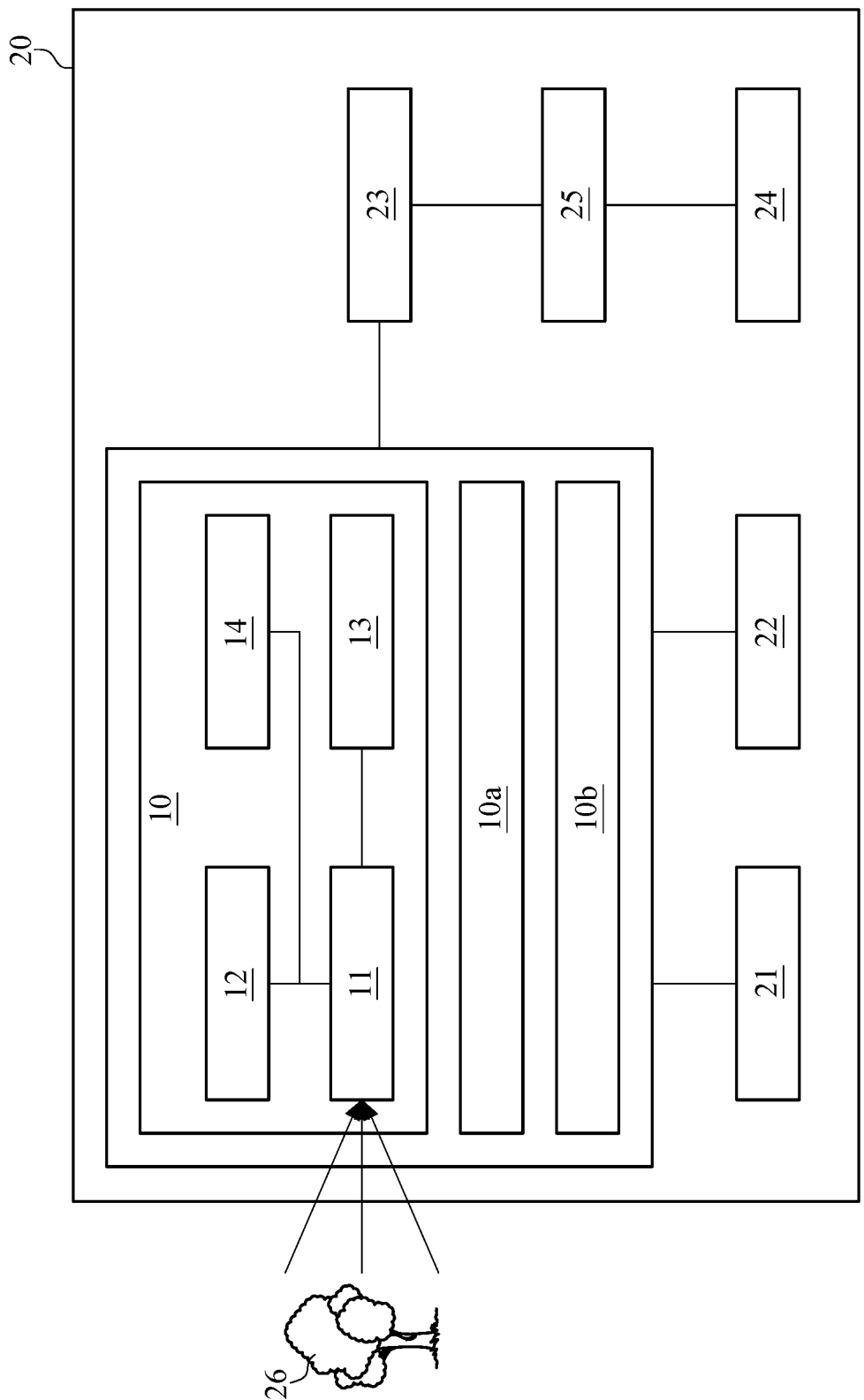
FIG. 26 is a block diagram of the electronic device in FIG. 24.

FIG. 24 is one perspective view of an electronic device according to the 13th embodiment of the present disclosure. FIG. 25 is another perspective view of the electronic device in FIG. 24. FIG. 26 is a block diagram of the electronic device in FIG. 24.

In this embodiment, an electronic device 20 is a smartphone including the image capturing unit 10 disclosed in the 12th embodiment, an image capturing unit 10a, an image capturing unit 10b, an image capturing unit 10c, a flash module 21, a focus assist module 22, an image signal processor 23, a user interface 24 and an image software processor 25. The image capturing unit 10, the image capturing unit 10a and the image capturing unit 10b all face the same direction, and the image capturing unit 10c faces the opposite direction. Each of the image capturing units 10, 10a and 10b has a single focal point. Furthermore, each of the image capturing unit 10a, the image capturing unit 10b and the image capturing unit 10c has a configuration similar to that of the image capturing unit 10. In detail, each of the image capturing unit 10a, the image capturing unit 10b and the image capturing unit 10c includes a lens unit, a driving device, an image sensor and an image stabilizer, and the lens unit includes a lens system, a barrel and a holder member for holding the lens system. The lens system of the lens unit of the image capturing unit 10c is, for example, the imaging lens system disclosed in the 1st embodiment, but the present disclosure is not limited thereto.

In this embodiment, the image capturing units 10, 10a, 10b have different fields of view (e.g., the image capturing unit 10 is a standard image capturing unit, the image capturing unit 10a is a wide-angle image capturing unit, and the image capturing unit 10b is a telephoto image capturing unit, and the field of view of the image capturing unit 10 ranges between that of the image capturing unit 10a and the image capturing unit 10b), such that the electronic device 20 has various magnification ratios so as to meet the requirement of optical zoom functionality. In addition, the image capturing unit 10c is, for example, a standard image capturing unit. In this embodiment, the electronic device 20 includes multiple image capturing units 10, 10a, 10b and 10c, but the present disclosure is not limited to the number of image capturing units.

When a user captures images of an object 26, the light rays converge in the image capturing unit 10, the image capturing unit 10a or the image capturing unit 10b to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the imaging lens system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system comprising seven lens elements, the seven lens elements being, in order from an object side to an image side, a first lens element, a second lens element, a third lens element, a fourth lens element, a fifth lens element, a sixth lens element and a seventh lens element; each of the seven lens elements having an object-side surface facing toward the object side and an image-side surface facing toward the image side;
   wherein the first lens element has positive refractive power, the object-side surface of the first lens element is convex in a paraxial region thereof, the second lens element has negative refractive power, the object-side surface of the second lens element is concave in a paraxial region thereof, the object-side surface of the fourth lens element is convex in a paraxial region thereof, the sixth lens element has positive refractive power, the image-side surface of the seventh lens element is concave in a paraxial region thereof, and the image-side surface of the seventh lens element has at least one inflection point in an off-axis region thereof;
   wherein a curvature radius of the object-side surface of the first lens element is R1, a curvature radius of the object-side surface of the second lens element is R3, a curvature radius of the image-side surface of the second lens element is R4, a curvature radius of the image-side surface of the seventh lens element is R14, an axial distance between the third lens element and the fourth lens element is T34, an axial distance between the fourth lens element and the fifth lens element is T45, and the following conditions are satisfied:

$(R3+R4)/(R3-R4)<0$;

$0<T34/T45<10.0$; and $0.45<R1/R14<5.0$.

2. The imaging lens system of claim 1, wherein a focal length of the imaging lens system is f, a curvature radius of the image-side surface of the fourth lens element is R8, and the following condition is satisfied:

$0 \leq f/R8<10.0$.

3. The imaging lens system of claim 1, wherein a minimum value among Abbe numbers of all lens elements of the imaging lens system is Vmin, and the following condition is satisfied:

$10.0<V\min<22.0$.

4. The imaging lens system of claim 1, wherein the object-side surface of the second lens element has at least one convex critical point in an off-axis region thereof, a vertical distance between a critical point on the object-side surface of the second lens element and an optical axis is Yc21, a central thickness of the second lens element is CT2, and the following condition is satisfied:

$0.50<Yc21/CT2<8.50$.

5. The imaging lens system of claim 1, wherein an Abbe number of the second lens element is V2, an Abbe number of the fourth lens element is V4, an Abbe number of the fifth lens element is V5, and the following condition is satisfied:

$30.0<V2+V4+V5<93.0$.

6. The imaging lens system of claim 1, wherein an axial distance between the object-side surface of the first lens element and an image surface is TL, an entrance pupil diameter of the imaging lens system is EPD, and the following condition is satisfied:

$1.0<TL/EPD<2.35$.

7. The imaging lens system of claim 1, wherein a central thickness of the second lens element is CT2, a central thickness of the third lens element is CT3, a central thickness of the fourth lens element is CT4, a central thickness of the fifth lens element is CT5, a central thickness of the sixth lens element is CT6, and the following condition is satisfied:

$0.30<(CT2+CT3+CT4+CT5)/CT6<1.80$.

8. The imaging lens system of claim 1, wherein a focal length of the fifth lens element is f5, a focal length of the seventh lens element is f7, and the following condition is satisfied:

$-0.40<f7/f5<0.40$.

9. An image capturing unit, comprising:
   the imaging lens system of claim 1; and
   an image sensor disposed on an image surface of the imaging lens system.

10. An electronic device, comprising:
    a first image capturing unit, comprising the imaging lens system of claim 1 and a first image sensor, wherein the first image sensor is disposed on an image surface of the imaging lens system; and a second image capturing unit, comprising an optical lens assembly and a second image sensor, wherein the second image sensor is disposed on an image surface of the optical lens assembly.

11. An imaging lens system comprising seven lens elements, the seven lens elements being, in order from an object side to an image side, a first lens element, a second lens element, a third lens element, a fourth lens element, a fifth lens element, a sixth lens element and a seventh lens element; each of the seven lens elements having an object-side surface facing toward the object side and an image-side surface facing toward the image side;

wherein the first lens element has positive refractive power, the second lens element has negative refractive power, the object-side surface of the second lens element is concave in a paraxial region thereof, the object-side surface of the fourth lens element is convex in a paraxial region thereof, the seventh lens element has negative refractive power, the image-side surface of the seventh lens element is concave in a paraxial region thereof, and the image-side surface of the seventh lens element has at least one inflection point in an off-axis region thereof;

wherein a curvature radius of the object-side surface of the second lens element is R3, a curvature radius of the image-side surface of the second lens element is R4, a curvature radius of the image-side surface of the fifth lens element is R10, a curvature radius of the object-side surface of the seventh lens element is R13, a curvature radius of the image-side surface of the seventh lens element is R14, an axial distance between the third lens element and the fourth lens element is T34, an axial distance between the fourth lens element and the fifth lens element is T45, a focal length of the imaging lens system is f, a focal length of the first lens element is f1, and the following conditions are satisfied:

$(R3+R4)/(R3-R4)<0.50;$ $0<T34/T45<10.0;$ $0.15<(R13+R14)/(R13-R14)<2.80;$ $-1.80<f/R10<10.0;$ and $0.30<f/f1<3.50.$ 12. The imaging lens system of claim 11, wherein the focal length of the imaging lens system is f, the curvature radius of the image-side surface of the fifth lens element is R10, and the following condition is satisfied:

$0 \leq f/R10<5.0.$

13. The imaging lens system of claim 11, wherein a maximum effective radius of the image-side surface of the third lens element is Y32, an axial distance between the object-side surface of the first lens element and an image surface is TL, a maximum image height of the imaging lens system is ImgH, and the following condition is satisfied:

$1.0<(Y32+TL)/ImgH<2.0$

14. The imaging lens system of claim 11, wherein the focal length of the imaging lens system is f, the focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the i-th lens element is fi, a minimum absolute value of f/fi is |f/fi|min, and the following condition is satisfied:

$|f/fi|min<0.10,$ wherein $i=1, 2, 3, 4, 5, 6, 7.$

15. The imaging lens system of claim 11, further comprising an aperture stop, wherein an axial distance between the aperture stop and the image-side surface of the seventh lens element is SD, an axial distance between the object-side surface of the first lens element and the image-side surface of the seventh lens element is TD, the focal length of the imaging lens system is f, a curvature radius of the object-side surface of the sixth lens element is R11, and the following conditions are satisfied:

$0.75<SD/TD<1.0;$ and $0 \leq f/R11<2.50.$

16. The imaging lens system of claim 11, wherein the axial distance between the fourth lens element and the fifth lens element is T45, an axial distance between the fifth lens element and the sixth lens element is T56, the focal length of the imaging lens system is f, an entrance pupil diameter of the imaging lens system is EPD, and the following conditions are satisfied:

$0<T45/T56<1.0;$ and $1.0<f/EPD<2.0.$

17. The imaging lens system of claim 11, wherein an axial distance between the object-side surface of the first lens element and an image surface is TL, a maximum image height of the imaging lens system is ImgH, the focal length of the imaging lens system is f, an entrance pupil diameter of the imaging lens system is EPD, and the following condition is satisfied:

$1.50<(TL/ImgH)+(f/EPD)<3.40.$

18. The imaging lens system of claim 11, wherein an axial distance between the fifth lens element and the sixth lens element is T56, an axial distance between the sixth lens element and the seventh lens element is T67, the curvature radius of the image-side surface of the fifth lens element is R10, a curvature radius of the object-side surface of the sixth lens element is R11, and the following conditions are satisfied:

$0.6<T67/T56<2.80;$ and $-0.70<(R10-R11)/(R10+R11)<2.0.$

19. An imaging lens system comprising seven lens elements, the seven lens elements being, in order from an object side to an image side, a first lens element, a second lens element, a third lens element, a fourth lens element, a fifth lens element, a sixth lens element and a seventh lens element; each of the seven lens elements having an object-side surface facing toward the object side and an image-side surface facing toward the image side;

wherein the object-side surface of the second lens element is concave in a paraxial region thereof, the object-side surface of the third lens element is convex in a paraxial region thereof, the object-side surface of the fourth lens element is convex in a paraxial region thereof, the image-side surface of the fifth lens element is concave in a paraxial region thereof, the seventh lens element has negative refractive power, the image-side surface of the seventh lens element is concave in a paraxial region thereof, and the image-side surface of the seventh lens element has at least one inflection point in an off-axis region thereof;

wherein a curvature radius of the object-side surface of the second lens element is R3, a curvature radius of the image-side surface of the second lens element is R4, an axial distance between the third lens element and the fourth lens element is T34, an axial distance between the fourth lens element and the fifth lens element is T45, a focal length of the imaging lens system is f, a focal length of the seventh lens element is f7, a central thickness of the first lens element is CT1, a central thickness of the second lens element is CT2, and the following conditions are satisfied:

$-0.80 < R3/R4;$ $0 < T34/T45 < 10.0;$ $-3.80 < f/f7 < -0.25;$ and $1.35 < CT1/CT2 < 7.0.$ 20. The imaging lens system of claim 19, wherein the object-side surface of the sixth lens element is convex in a paraxial region thereof, and the object-side surface and the image-side surface of the third lens element are both aspheric.

21. The imaging lens system of claim 19, wherein the object-side surface of the seventh lens element has at least one convex critical point in an off-axis region thereof, a vertical distance between a critical point on the object-side surface of the seventh lens element and an optical axis is Yc71, the focal length of the imaging lens system is f, and the following condition is satisfied:

$0.20 < Yc71/f < 1.0.$

22. The imaging lens system of claim 19, wherein the object-side surface of the second lens element has at least one convex critical point in an off-axis region thereof, a vertical distance between a critical point on the object-side surface of the second lens element and an optical axis is Yc21, the central thickness of the second lens element is CT2, and the following condition is satisfied:

$0.50 < Yc21/CT2 < 8.50.$

23. The imaging lens system of claim 19, wherein an Abbe number of the second lens element is V2, an Abbe number of the fourth lens element is V4, an Abbe number of the fifth lens element is V5, and the following condition is satisfied:

$30.0 < V2 + V4 + V5 < 93.0.$

24. The imaging lens system of claim 19, wherein an axial distance between the object-side surface of the first lens element and an image surface is TL, an entrance pupil diameter of the imaging lens system is EPD, and the following condition is satisfied:

$1.0 < TL/EPD < 2.35.$

25. The imaging lens system of claim 19, wherein a curvature radius of the object-side surface of the third lens element is R5, a curvature radius of the image-side surface of the third lens element is R6, an axial distance between the object-side surface of the first lens element and an image surface is TL, a maximum image height of the imaging lens system is ImgH, and the following conditions are satisfied:

$-40.0 < (R5+R6)/(R5-R6) < 3.0;$ and $1.0 < TL/ImgH < 1.80.$

26. The imaging lens system of claim 19, wherein the image-side surface of the seventh lens element has at least one convex critical point in an off-axis region thereof, a vertical distance between a critical point on the image-side surface of the seventh lens element and an optical axis is Yc72, a maximum effective radius of the image-side surface of the seventh lens element is Y72, an axial distance between the object-side surface of the first lens element and an image surface is TL, the focal length of the imaging lens system is f, and the following conditions are satisfied:

$0.10 < Yc72/Y72 < 1.0;$ and $0.80 < TL/f < 1.40.$

27. An imaging lens system comprising seven lens elements, the seven lens elements being, in order from an object side to an image side, a first lens element, a second lens element, a third lens element, a fourth lens element, a fifth lens element, a sixth lens element and a seventh lens element; each of the seven lens elements having an object-side surface facing toward the object side and an image-side surface facing toward the image side;

wherein the object-side surface of the second lens element is concave in a paraxial region thereof, the image-side surface of the second lens element is concave in a paraxial region thereof, the image-side surface of the seventh lens element is concave in a paraxial region thereof, and the image-side surface of the seventh lens element has at least one inflection point in an off-axis region thereof;

wherein a curvature radius of the object-side surface of the second lens element is R3, a curvature radius of the image-side surface of the second lens element is R4, a curvature radius of the image-side surface of the fifth lens element is R10, an Abbe number of the fifth lens element is V5, half of a maximum field of view of the imaging lens system is HFOV, a focal length of the imaging lens system is f, a focal length of the third lens element is f3, and the following conditions are satisfied:

$-0.80 < R3/R4;$ $10.0 < V5 < 28.0;$ $30.0\ [\deg.] < HFOV < 55.0\ [\deg.];$ $-0.90 < f/R10 < 10.0;$ and $-3.0 < f/f3 < 1.0.$ 28. The imaging lens system of claim 27, wherein the focal length of the imaging lens system is f, a curvature radius of the image-side surface of the fourth lens element is R8, and following condition is satisfied:

$0 \le f/R8 < 10.0.$

29. The imaging lens system of claim 27, wherein an axial distance between the image-side surface of the seventh lens element and an image surface is BL, a maximum value among central thicknesses of all lens elements of the imaging lens system is CTmax, and the following condition is satisfied:

$0 < BL/CTmax < 1.0.$

30. The imaging lens system of claim 27, wherein a central thickness of the second lens element is CT2, a central thickness of the third lens element is CT3, a central thickness of the fourth lens element is CT4, a central thickness of the fifth lens element is CT5, a central thickness of the sixth lens element is CT6, and the following condition is satisfied:

$$0.50 < (CT2+CT3+CT4+CT5)/CT6 < 1.50.$$

31. The imaging lens system of claim 27, wherein an axial distance between the object-side surface of the first lens element and an image surface is TL, a maximum image height of the imaging lens system is ImgH, the focal length of the imaging lens system is f, an entrance pupil diameter of the imaging lens system is EPD, and the following condition is satisfied:

$$1.50 < (TL/\mathrm{Img}H) + (f/\mathrm{EPD}) < 3.40.$$

32. The imaging lens system of claim 27, wherein the image-side surface of the fifth lens element has at least one critical point in an off-axis region thereof, a vertical distance between a critical point on the image-side surface of the fifth lens element and an optical axis is Yc52, the focal length of the imaging lens system is f, and the following condition is satisfied:

$$0.05 < Yc52/f < 0.80.$$

33. The imaging lens system of claim 27, wherein each of at least three lens elements of the imaging lens system has an Abbe number ranging from 10.0 to 32.0, the focal length of the imaging lens system is f, a maximum image height of the imaging lens system is ImgH, and the following condition is satisfied:

$$0.55 < f/\mathrm{Img}H < 1.50.$$

* * * * *